(12) United States Patent
Hsu et al.

(10) Patent No.: US 12,250,487 B2
(45) Date of Patent: Mar. 11, 2025

(54) IMAGE READOUT DEVICE

(71) Applicant: NOVATEK MICROELECTRONICS CORP., Hsinchu (TW)

(72) Inventors: Pai-Hsiang Hsu, Hsinchu (TW); Chao-Yu Meng, Hsinchu (TW); Yueh-Ru Lee, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 161 days.

(21) Appl. No.: 18/315,579

(22) Filed: May 11, 2023

(65) Prior Publication Data
US 2024/0381003 A1 Nov. 14, 2024

(51) Int. Cl.
*H04N 25/78* (2023.01)
*H04N 25/77* (2023.01)

(52) U.S. Cl.
CPC ............. *H04N 25/78* (2023.01); *H04N 25/77* (2023.01)

(58) Field of Classification Search
CPC .............................. H04N 25/78; H04N 25/77
See application file for complete search history.

(56) References Cited

U.S. PATENT DOCUMENTS

| | | | |
|---|---|---|---|
| 9,252,800 B1* | 2/2016 | Park | H03M 1/20 |
| 2021/0112211 A1* | 4/2021 | Kumagai | H04N 25/57 |
| 2022/0078362 A1* | 3/2022 | Jung | H04N 25/709 |
| 2023/0345151 A1* | 10/2023 | Nakagawa | H04N 25/7795 |

* cited by examiner

Primary Examiner — Mekonnen D Dagnew
(74) Attorney, Agent, or Firm — Rosenberg, Klein & Lee

(57) ABSTRACT

An image readout device includes comparator circuits. Each comparator circuit includes an amplifier, an input capacitor, an auto-zero switch, and a control capacitor. The amplifier compares a pixel signal to a reference signal to generate a comparison signal. The input capacitor receives the pixel signal or the reference signal. The auto-zero switch couples or decouples the input node and the output node of the amplifier. The control capacitor receives a respective control signal. Alternatively, the control capacitor can be replaced with a control switch. The control switch is coupled to the auto-zero switch in parallel. The control switch and the control capacitor can be omitted. Instead, the voltage level of the reference signal is adjusted to change the transition time points of the comparison signal.

22 Claims, 36 Drawing Sheets

IMAGE READOUT DEVICE

BACKGROUND OF THE INVENTION

Field of the Invention

The invention relates to a readout device, particularly to an image readout device.

Description of the Related Art

An image sensor is a device that converts optical images into electrical signals. Image sensors can be classified into a charge coupled device (CCD) type and a complementary metal oxide semiconductor (CMOS) type. The CMOS type image sensor is abbreviated as a CIS (CMOS Image Sensor). The CIS has a plurality of pixels arranged two-dimensionally. Each of the pixels includes a photodiode. Photodiodes are used to convert incident light into electrical signals.

FIG. 1 is a diagram schematically illustrating a conventional CMOS image sensor. FIG. 2 is a diagram schematically illustrating a conventional comparator circuit coupled to an inverter and a counter. Referring to FIG. 1 and FIG. 2, the conventional CMOS image sensor 1 includes a row decoder 10, an image sensor array 11 which is taken as a sensing pixel array, a ramp generator 12, a plurality of comparator circuits 13 which is corresponding to a plurality of sensing pixel columns (depicted in horizontal direction in FIG. 2), a plurality of inverters 14, and a plurality of counters 15. The pixels of the image sensor array 11 transmit pixels signals VPIX to the comparator circuits 13 row by row. Each comparator circuit 13 receives the pixel signal VPIX from the image sensor array 11 and a ramp signal VRMP from the ramp generator 12, so as to generate a comparison signal VCMP. The inverter 14 inverts the comparison signal VCMP to generate an output signal VOUT. FIG. 3 is a diagram schematically illustrating the waveforms of the pixel signal, the ramp signal, the auto-zero control signals of auto-zero switches, the input voltages, the comparison signal, and the output signal corresponding to FIG. 2. Referring to FIG. 2 and FIG. 3, each comparator circuit 13 includes an amplifier 130, two input capacitors 131 and 132, and two auto-zero switches 133. The input capacitors 131 and 132 respectively receive the pixel voltage VPIX and the ramp voltage VRMP. The auto-zero control signals VAZ turn on or off the auto-zero switches 133. When the control signal VAZ has a high-level voltage, the control signal VAZ turns on the auto-zero switches 133. When the control signal VAZ has a low-level voltage, the control signal VAZ turns off the auto-zero switches 133. The amplifier 130 receives and compares the input voltages VIN and VIP to generate the comparison signal VCMP. When all the counters 15 simultaneously perform high-frequency activities within a short period such as 10-20 ns after the inverters 14 transition the levels of the output signals VOUT, a very high IR drop and an unexpectable action may happen. It is difficult for digital delay lines to implement nanosecond-scale delay.

SUMMARY OF THE INVENTION

The invention provides an image readout device, which controls the transition time points of output signals not to occur at the same time to reduce a peak current and an IR drop (voltage drop).

In an embodiment of the invention, an image readout device includes a plurality of comparator circuits. Each of the plurality of comparator circuits includes an amplifier, a first input capacitor, a first auto-zero switch, and at least one first control capacitor. The amplifier has a first input node, a second input node, a first output node, and a second output node. The amplifier is configured to compare a pixel signal received from an image sensor array to a reference signal to generate a comparison signal. The first input capacitor has a first end coupled to the first input node of the amplifier and a second end coupled to the pixel signal or the reference signal. The first auto-zero switch has a first end coupled to the first input node of the amplifier, a second end coupled to the first output node of the amplifier, and a control end coupled to an auto-zero control signal which is configured to couple or decouple the first input node of the amplifier to the first output node of the amplifier. Each of the at least one first control capacitor has a first end coupled to the first input node of the amplifier and a second end coupled to a respective first control signal.

In an embodiment of the invention, an image readout device includes a plurality of comparator circuits. Each of the plurality of comparator circuits includes an amplifier, a first input capacitor, a first auto-zero switch, and at least one first control switch. The amplifier has a first input node, a second input node, a first output node and a second output node. The amplifier is configured to compare a pixel signal received from an image sensor array to a reference signal to generate a comparison signal. The first input capacitor has a first end coupled to the first input node of the amplifier and a second end coupled to the pixel signal or the reference signal. The first auto-zero switch has a first end coupled to the first input node of the amplifier, a second end coupled to the first output node of the amplifier, and a control end coupled to an auto-zero control signal which is configured to couple or decouple the first input node of the amplifier to the first output node of the amplifier. Each of the at least one first control switch has a first end coupled to the first input node of the amplifier, a second end coupled to the first output node of the amplifier, and a control end coupled to a respective first control signal.

In an embodiment of the invention, an image readout device includes a plurality of comparator circuits. Each of the plurality of comparator circuit includes an amplifier, a first input capacitor, a first auto-zero switch, a second auto-zero switch, and a second input capacitor. The amplifier has a first input node, a second input node, a first output node, and a second output node. The amplifier is configured to compare a pixel signal received from an image sensor array to a respective reference signal to generate a comparison signal. The first input capacitor has a first end coupled to the second input node of the amplifier and a second end coupled to the respective reference signal. The first auto-zero switch has a first end coupled to the first input node of the amplifier, a second end coupled to the first output node of the amplifier, and a control end coupled to an auto-zero control signal which is configured to couple or decouple the first input node and the first output node of the amplifier. The second auto-zero switch has a first end coupled to the second input node of the amplifier, a second end coupled to the second output node of the amplifier, and a control end coupled to the auto-zero control signal which is configured to couple or decouple the second input node and the second output node of the amplifier. The second input capacitor has a first end coupled to the first input node of the amplifier and a second end coupled to the pixel signal. The plurality of comparator circuits are divided into a plurality of groups. The transition time points of the comparison signals respectively corresponding to the plurality of groups differ from each other when the respective reference signals are respectively coupled to the plurality of groups have different level.

To sum up, the image readout device employs the control capacitor and the control switch or controls the levels of the reference signals to control the transition time points of output signals not to occur at the same time, thereby reducing the peak current and the IR drop (voltage drop).

Below, the embodiments are described in detail in cooperation with the drawings to make easily understood the technical contents, characteristics and accomplishments of the invention.

DETAILED DESCRIPTION OF THE INVENTION

Figure 1:
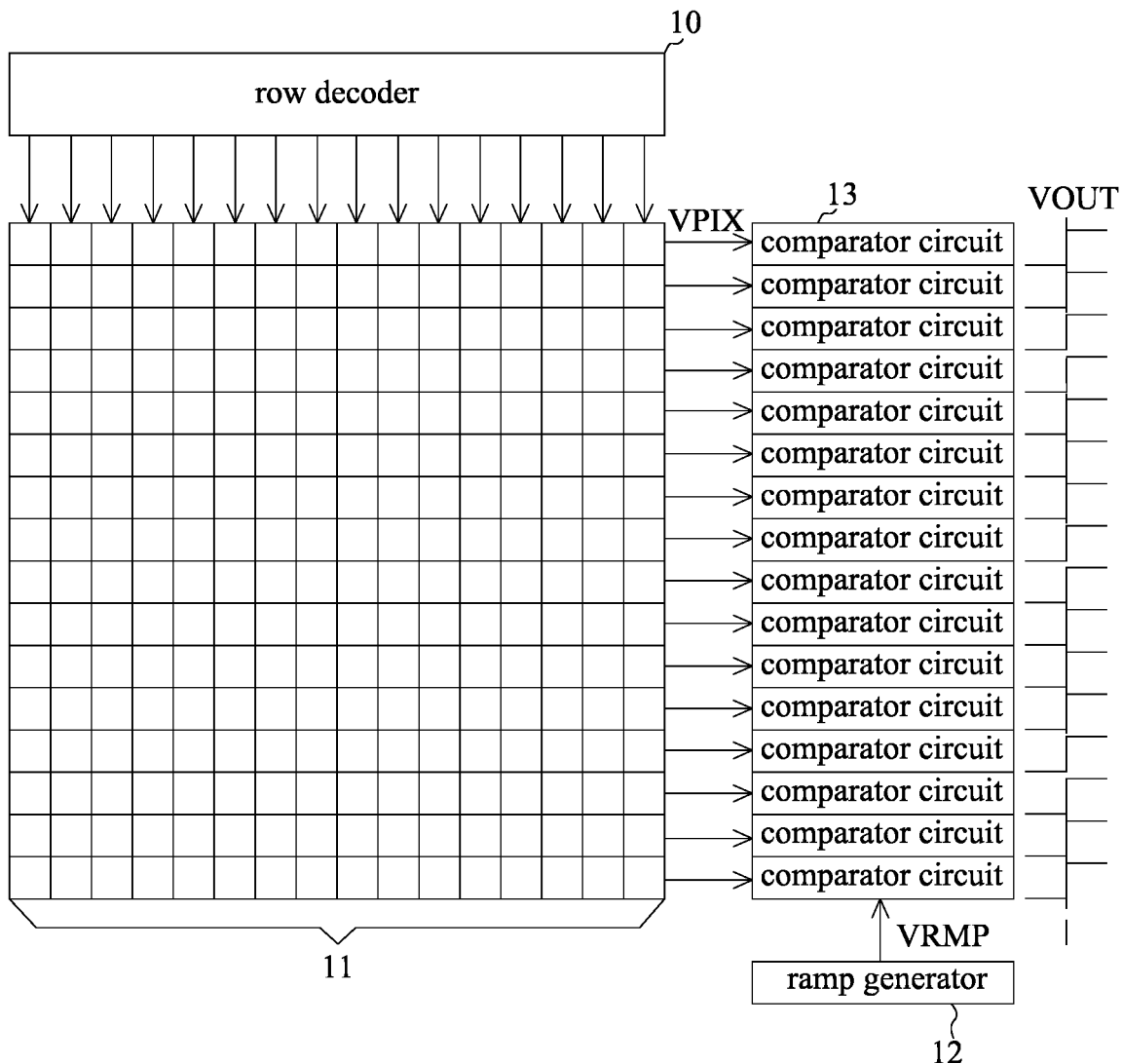
FIG. 1 is a diagram schematically illustrating a conventional CMOS image sensor.
Figure 2:
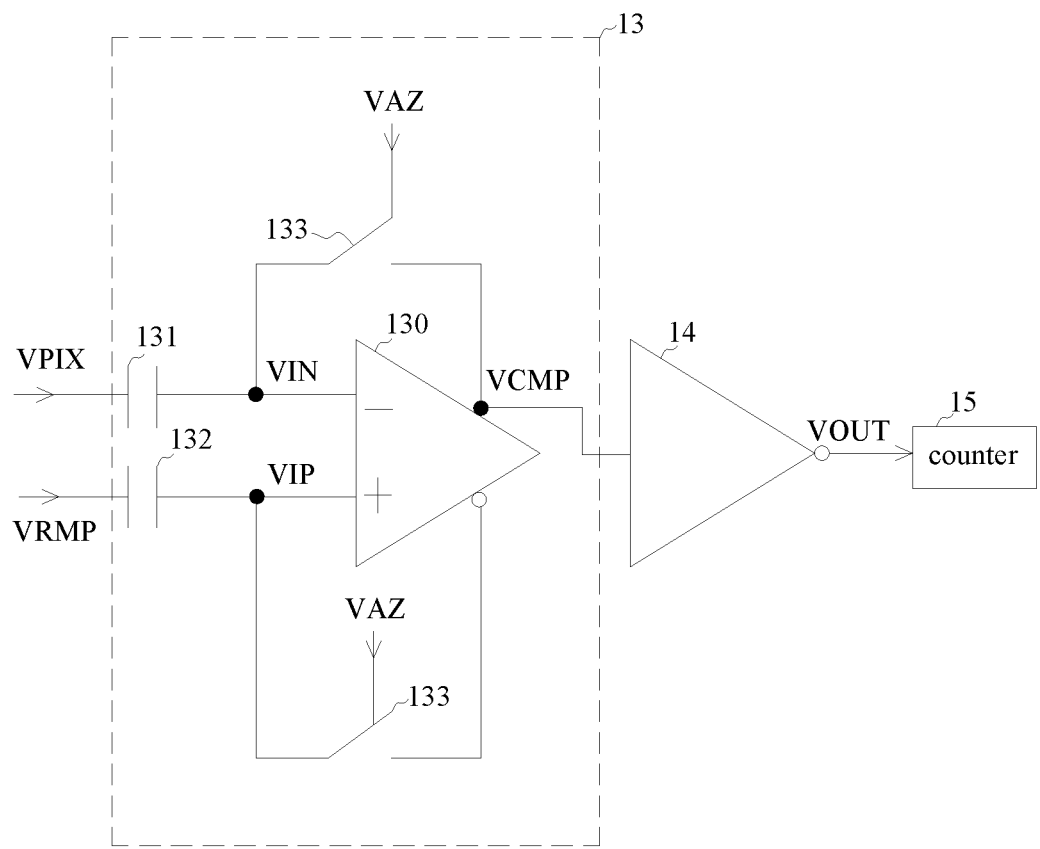
FIG. 2 is a diagram schematically illustrating a conventional comparator circuit coupled to an inverter and a counter.

Reference will now be made in detail to embodiments illustrated in the accompanying drawings. Wherever possible, the same reference numbers are used in the drawings and the description to refer to the same or like parts. In the drawings, the shape and thickness may be exaggerated for clarity and convenience. This description will be directed in particular to elements forming part of, or cooperating more directly with, methods and apparatus in accordance with the present disclosure. It is to be understood that elements not specifically shown or described may take various forms well known to those skilled in the art. Many alternatives and modifications will be apparent to those skilled in the art, once informed by the present disclosure.

Unless otherwise specified, some conditional sentences or words, such as "can", "could", "might", or "may", usually attempt to express what the embodiment in the invention has, but it can also be interpreted as a feature, element, or step that may not be needed. In other embodiments, these features, elements, or steps may not be required.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Certain terms are used throughout the description and the claims to refer to particular components. One skilled in the art appreciates that a component may be referred to using different names. This disclosure does not intend to distinguish between components that differ in name but not in function. In the description and in the claims, the term "comprise" is used in an open-ended fashion, and thus should be interpreted to mean "include, but not limited to." The phrases "be coupled to," "couples to," and "coupling to" are intended to encompass any indirect or direct connection. Accordingly, if this disclosure mentions that a first device is coupled with a second device, it means that the first device may be directly or indirectly connected to the second device through electrical connections, wireless communications, optical communications, or other signal connections with/without other intermediate devices or connection means.

The invention is particularly described with the following examples which are only for instance. Those skilled in the art will readily observe that numerous modifications and alterations of the device and method may be made while retaining the teachings of the invention. Accordingly, the following disclosure should be construed as limited only by the metes and bounds of the appended claims. In the whole patent application and the claims, except for clearly described content, the meaning of the articles "a" and "the" includes the meaning of "one or at least one" of the elements or components. Moreover, in the whole patent application and the claims, except that the plurality can be excluded obviously according to the context, the singular articles also contain the description for the plurality of elements or components. In the entire specification and claims, unless the contents clearly specify the meaning of some terms, the meaning of the article "wherein" includes the meaning of the articles "wherein" and "whereon". The meanings of every term used in the present claims and specification refer to a usual meaning known to one skilled in the art unless the meaning is additionally annotated. Some terms used to describe the invention will be discussed to guide practitioners about the invention. The examples in the present specification do not limit the claimed scope of the invention.

In the following description, an image readout device will be described. The image readout device employs a control capacitor and a control switch to control the transition time points of output signals not to occur at the same time, in other words, to control the transition time points of output signals to occur at different times, thereby reducing a peak current and an IR drop (voltage drop). The image readout devices described below may also be applied to other circuit configurations.

Figure 4:
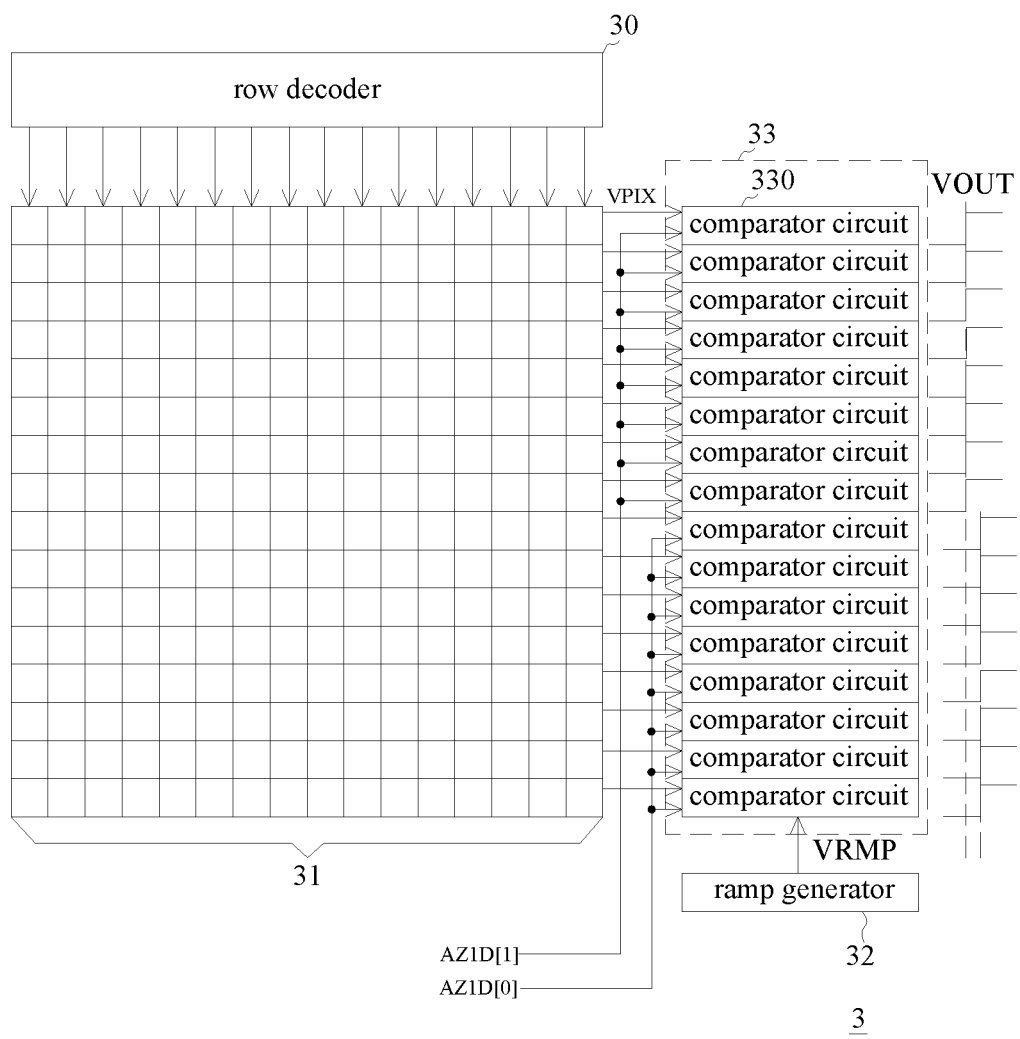
FIG. 4 is a diagram schematically illustrating an image sensor according to a first embodiment of the invention.

FIG. 4 is a diagram schematically illustrating an image sensor according to a first embodiment of the invention. Referring to FIG. 4, an image sensor 3 is introduced as follows. The image sensor 3 includes a row decoder 30, an image sensor array 31 which is taken as a sensing pixel array, a ramp generator 32, and an image readout device 33. The row decoder 30 is coupled to the image sensor array 31. The image sensor array 31 and the ramp generator 32 are coupled to the image readout device 33. The row decoder 30 drives the pixels of the image sensor array 31 row by row to transmit pixel signals VPIX of each pixel row (depicted in a vertical direction in FIG. 4) to the image readout device 33. The ramp generator 32 generates and transmits reference signals to the image readout device 33. The reference signal may be, but not limited to, a ramp signal VRMP. The image readout device 33 includes a plurality of comparator circuits 330. Each comparator circuit 330 is corresponding to a sensing pixel column (depicted in a horizontal direction in FIG. 4) and receives the pixel signals VPIX from the sensing pixel column, and each comparator circuit 330 compares the pixel signal VPIX and the ramp signal VRMP to generate a comparison signal. The image readout device 33 inverts the comparison signals to generate output signals VOUT. In order to control the transition time points of voltage levels of the output signals VOUT not to occur at the same time, the comparator circuits 330 can be divided into a plurality of groups and respective control signals may be applied to the respective groups of the comparator circuits 330. For clarity and convenience, the comparator circuits 330 can be divided into two groups. In addition, two different control signals AZ1D[0] and AZ1D[1] are respectively provided to the two groups of the comparator circuits 330 to control the transition time points of voltage levels of the output signals VOUT not to occur at the same time. For example, one group of the comparator circuits 330 outputs the output signals VOUT earlier and the other group of the comparator circuits 330 outputs the output signals VOUT later. In the first embodiment (as shown in FIG. 4) of the image sensor 3, a plurality of comparator circuits 330 of each group of the comparator circuits 330 are corresponding to a plurality of adjacent sensing pixel columns. However, the invention is not limited to the arrangement of sensing pixel columns corresponding to each group of the comparator circuits 330.

Figure 5:
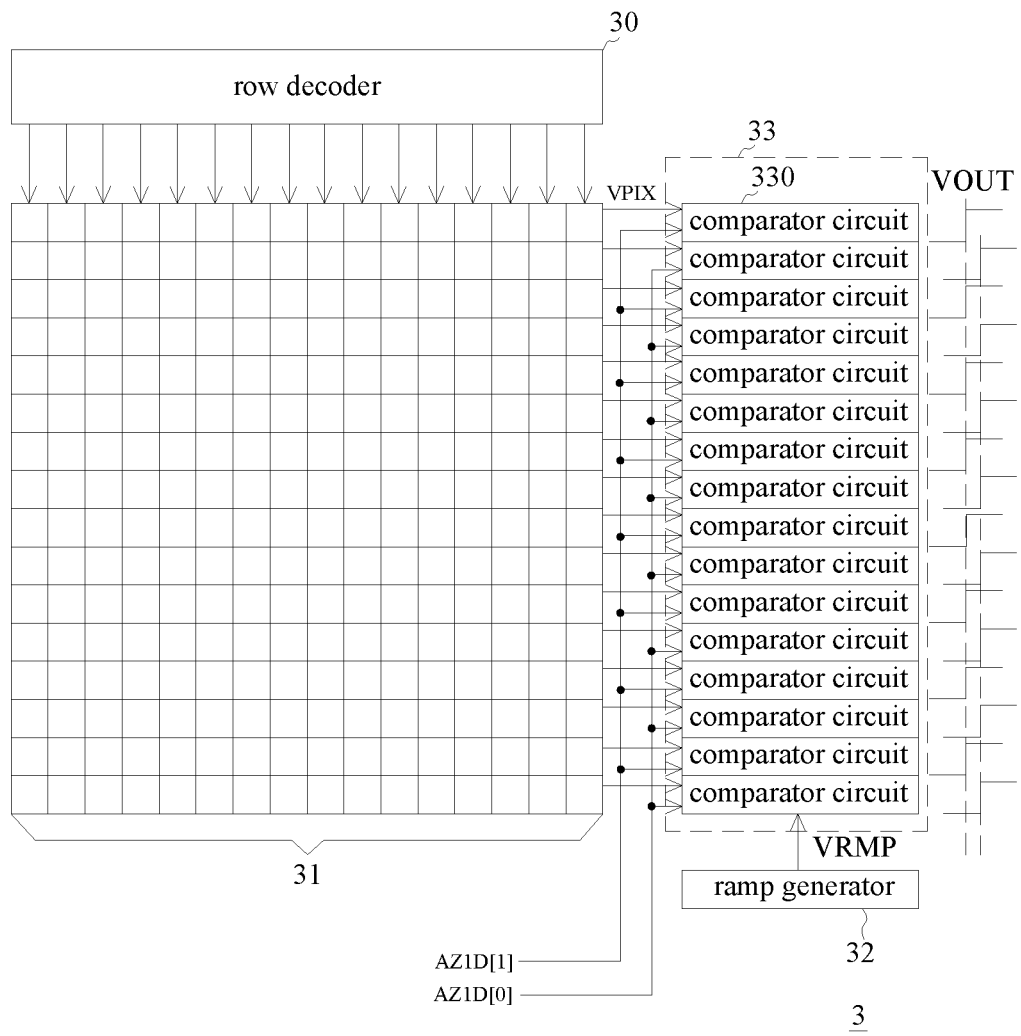
FIG. 5 is a diagram schematically illustrating an image sensor according to a second embodiment of the invention.

FIG. 5 is a diagram schematically illustrating an image sensor according to a second embodiment of the invention. Referring to FIG. 5, the second embodiment of the image sensor 3 is introduced as follows. The second embodiment of the image sensor 3 is different from the first embodiment of the image sensor 3 in the arrangement of groups of the comparator circuits 330 and corresponding sensing pixel columns. The other technical features have been described previously so it will not be reiterated. In the second embodiment of the image sensor 3, the comparator circuits 330 are divided into a first group and a second group. Two different control signals AZ1D[0] and AZ1D[1] are respectively provided to the first and the second groups of the comparator circuits 330, to control the output signals VOUT of different groups of the comparator circuits transiting at different times. The comparator circuits 330 in the first group and the second group are alternately arranged, which means that positions of sensing pixel columns corresponding to the first group of the comparator circuits 330 and positions of the other sensing pixel columns corresponding to the second group of the comparator circuits 330 are alternately arranged.

Figure 6:
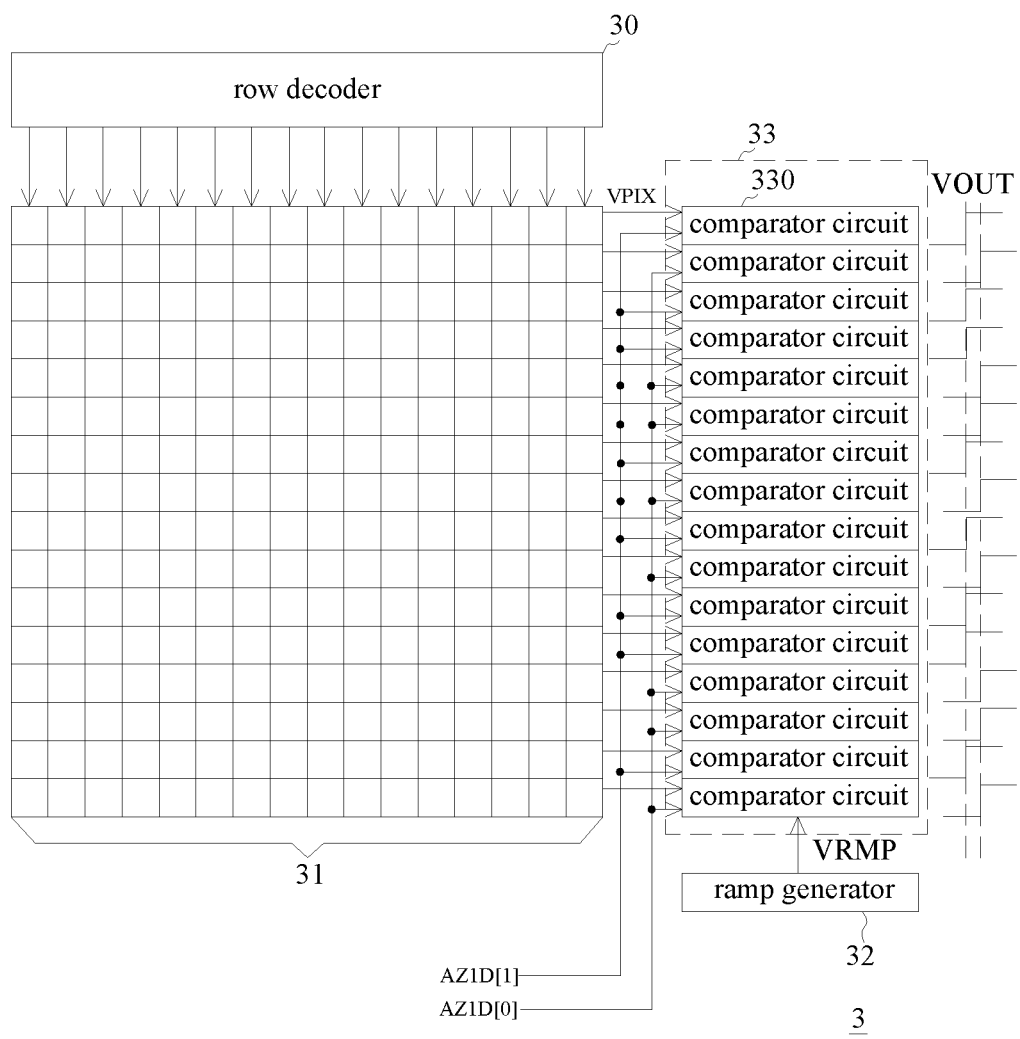
FIG. 6 is a diagram schematically illustrating an image sensor according to a third embodiment of the invention.

FIG. 6 is a diagram schematically illustrating an image sensor according to a third embodiment of the invention. Referring to FIG. 6, the third embodiment of the image sensor 3 is introduced as follows. The third embodiment of the image sensor 3 is different from the first embodiment of the image sensor 3 in the arrangement groups of the of the comparator circuits 330 corresponding sensing pixel columns. The other technical features have been described previously so it will not be reiterated. In the third embodiment of the image sensor 3, the comparator circuits 330 are divided into a first group and a second group. The comparator circuits 330 in the first group and the second group are randomly arranged, which means that positions of sensing pixel columns corresponding to the first group of the comparator circuits 330 and positions of the other sensing pixel columns corresponding to the second group of the comparator circuits 330 are neither adjacent nor alternate, but randomly arranged.

Figure 7:
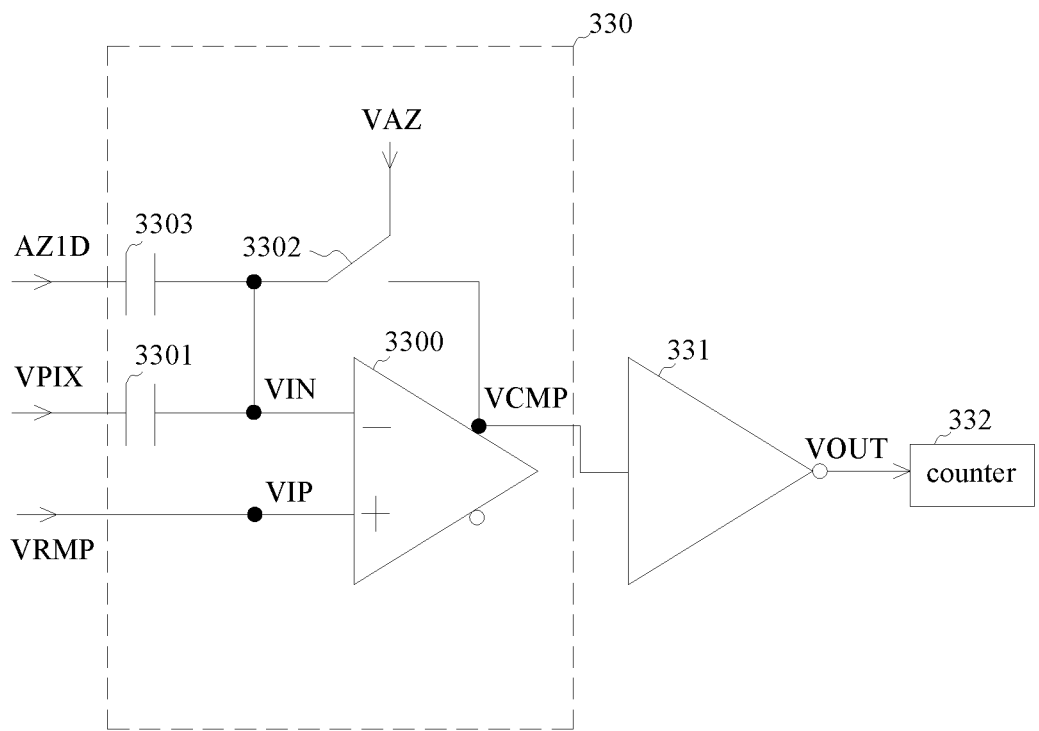
FIG. 7 is a diagram schematically illustrating a comparator circuit coupled to an inverter and a counter according to a first embodiment of the invention.
Figure 8:
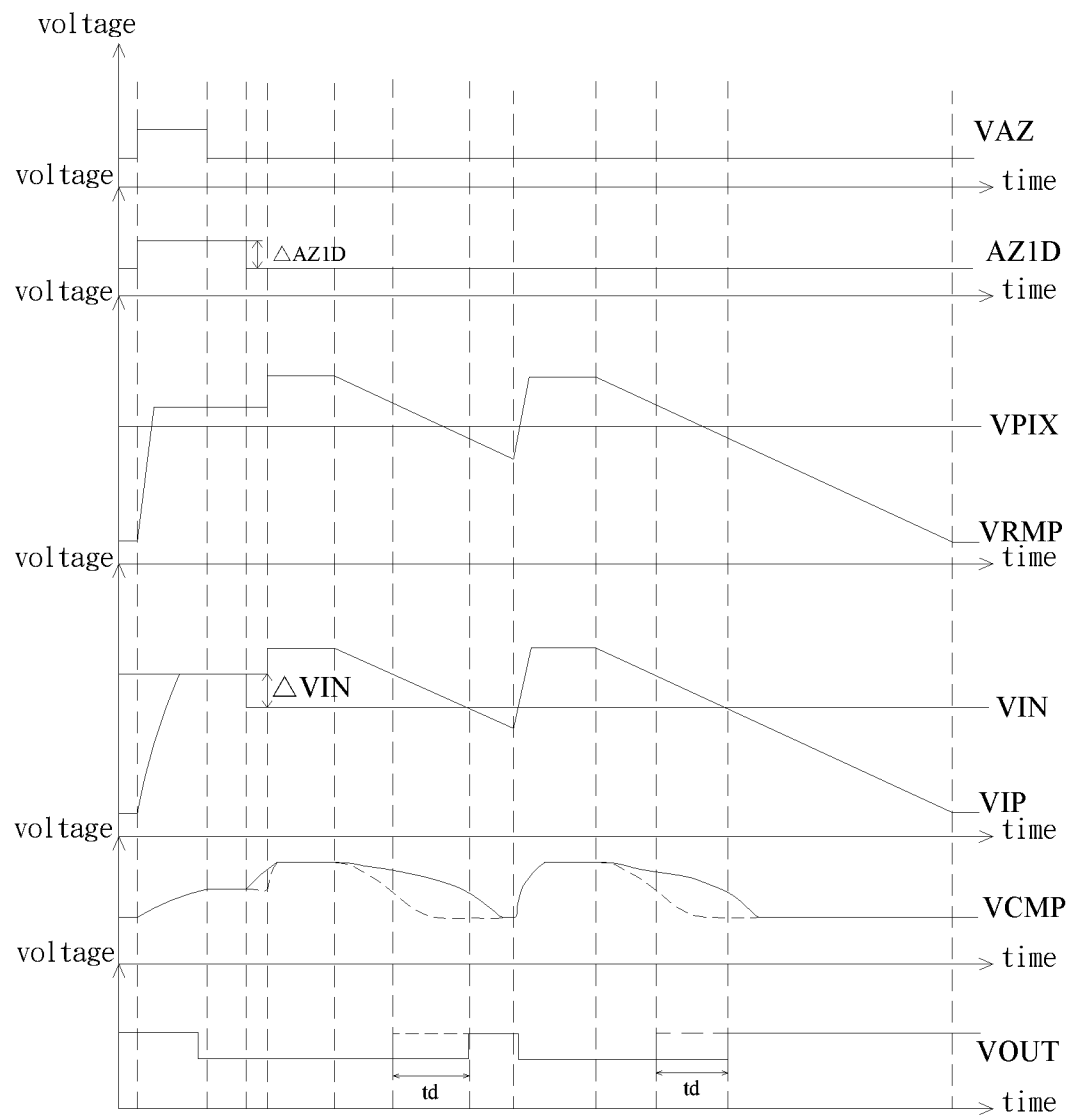
FIG. 8 is a diagram schematically illustrating the waveforms of the auto-zero control signal, the first control signal, the pixel signal, the reference signal, the input voltages of the amplifier, the comparison signal, and the output signal corresponding to FIG. 7.

FIG. 7 is a diagram schematically illustrating a comparator circuit according to a first embodiment of the invention. FIG. 8 is a diagram schematically illustrating the waveforms of the auto-zero control signal, the first control signal, the pixel signal, the reference signal, the input voltages of the amplifier, the comparison signal, and the output signal of the comparator circuit corresponding to FIG. 7. Referring to FIG. 7 and FIG. 8, the first embodiment of the comparator circuit 330 is introduced as follows. The comparator circuit 330 includes an amplifier 3300, an input capacitor 3301 named as a first input capacitor, an auto-zero switch 3302 named as a first auto-zero switch, and at least one control capacitor 3303 named as a first control capacitor. For clarity and convenience, the first embodiment exemplifies one control capacitor 3303. The amplifier 3300 has a first input node, a second input node, and a first output node. In the first embodiment, the first input node may be a negative (a.k.a. inverting) input node, the second input node may be a positive (a.k.a. non-inverting) input node, and the first output node may be a positive output node. The input capacitor 3301 has a first end and a second end. The first end of the input capacitor 3301 is coupled to the first input node of the amplifier 3300. The auto-zero switch 3302 has a first end, a second end, and a control end. The first end of the auto-zero switch 3302 is coupled to the first input node of the amplifier 3300. The second end of the auto-zero switch 3302 is coupled to the first output node of the amplifier 3300. The control capacitor 3303 has a first end and a second end. The first end of the control capacitor 3303 is coupled to the first input node of the amplifier 3300.

In order to effectively read the pixel signals VPIX, the image readout device may further include a plurality of inverters 331 and a plurality of counters 332. The inverters 331 are respectively coupled to the first output nodes of the amplifiers 3300 of the comparator circuits 330. The counters 332 are respectively coupled to the inverters 331.

The operation of the first embodiment of the comparator circuit 330 is introduced as follows. The first input node and the second input node of the amplifier 3300 respectively receive a pixel signal VPIX from the image sensor array and a reference signal. The reference signal may be, but not limited to, a ramp signal VRP. The amplifier 3300 compares the pixel signal VPIX to the ramp signal VRMP to generate a comparison signal VCMP from the first output node. The second end of the input capacitor 3301 is coupled to the pixel signal VPIX. The control end of the auto-zero switch 3302 is coupled to an auto-zero control signal VAZ. The auto-zero control signal VAZ is configured to couple or decouple the first input node of the amplifier 3300 to the first output node of the amplifier 3300. The second end of the control capacitor 3303 is coupled to a respective control signal AZ1D named as a respective first control signal. In addition, the input voltage of the negative input node of the amplifier 3300 is represented with VIN. The input voltage of the positive input node of the amplifier 3300 is represented with VIP. The inverters 331 convert the comparison signals VCMP generated from the comparator circuits 330 into a plurality of output signals VOUT which transition between a high level and a low level based on a predetermined voltage level. Each counter 332 counts one of the output signals VOUT to generate a digital counting value corresponding to the pixel signal VPIX.

Figure 3:
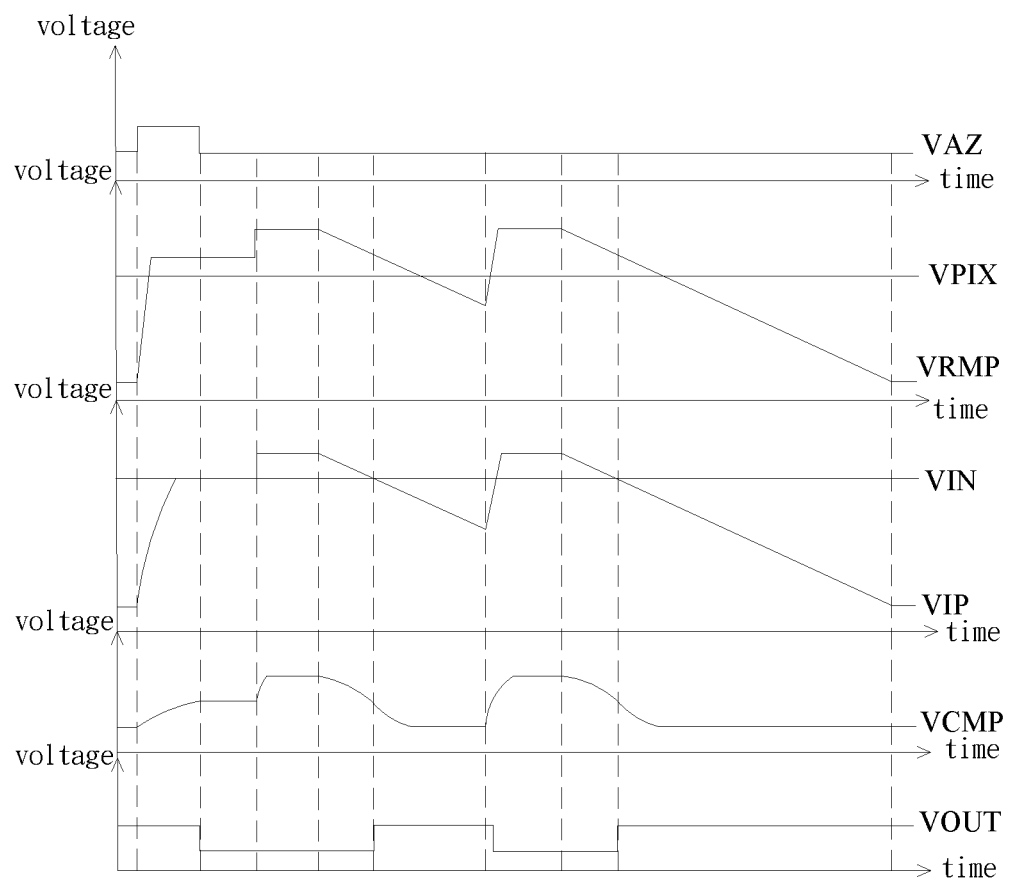
FIG. 3 is a diagram schematically illustrating the waveforms of the pixel signal, the ramp signal, the auto-zero control signals of auto-zero switches, the input voltages, the comparison signal, and the output signal corresponding to FIG. 2.

As illustrated in FIG. 8, the input voltages VIN and VIP respectively follow the voltage levels of the pixel signal VPIX and the ramp signal VRMP. The respective control signal AZ1D is different from the auto-zero control signal VAZ. Specifically, the active period of the respective control signal AZ1D may be larger than the active period of the auto-zero control signal VAZ. The leading edge of the respective control signal AZ1D is at the same time as the leading edge of the auto-zero control signal VAZ. The trailing edge of the respective control signal AZ1D is later than the trailing edge of the auto-zero control signal VAZ. When the voltage level of the auto-zero control signal VAZ rises from a logic low level to a logic high level, the auto-zero switch 3302 is turned on to couple the first input node of the amplifier 3300 to the first output node of the amplifier 3300, such that the input voltage VIN is equal to the input voltage VIP. Simultaneously, the voltage level of the respective control signal AZ1D rises from a logic low level to a logic high level. When the voltage level of the auto-zero control signal VAZ descends from the logic high level to the logic low level, the auto-zero switch 3302 is turned off to decouple the first input node of the amplifier 3300 to the first output node of the amplifier 3300. Afterwards, the voltage level of the respective control signal AZ1D descends from the logic high level to the logic low level. For example, the voltage level of the respective control signal AZ1D is decreased by $\Delta AZ1D$. When the voltage level of the respective control signal AZ1D is decreased by $\Delta AZ1D$, the voltage level of the input voltage VIN is decreased by $\Delta VIN$, thereby changing the transition time points of voltages of the comparison signal VCMP and the output signal VOUT. The comparator circuits 330 are divided into a plurality of groups. Based on the foregoing mechanism, the voltage level transition of the respective control signal AZ1D causes the transition time points of the comparison signal VCMP and the output signal VOUT change. The transition time points of the comparison signal VCMP and the output signal VOUT depend on the input capacitor 3301, the control capacitor 3303, the respective control signal AZ1D, and the ramp signal VRP as the reference signal. The transition time points of the output signals VOUT of the groups of the comparator circuits 330 are respectively set and partially or completely occurring at different times (i.e., the output signals VOUT do not transit at the same time), thereby reducing the peak current and the IR drop (voltage drop). Compared to the comparison signal VCMP in FIG. 3 (which is also depicted in FIG. 8 by the dashed waveform), the comparison signal VCMP (depicted in solid waveform) in FIG. 8 changes due to the voltage difference $\Delta VIN$ and results in that the transition time point of the output signal VOUT is delayed by a time delay denoted as td. Specifically, $\Delta VIN$ and td are respectively represented by equations (1) and (2).

$$\Delta VIN = \frac{C_{OSN}}{C_{OSN} + C_{INN}} \Delta AZ1D \quad (1)$$

$$td = \frac{C_{OSN}}{C_{OSN} + C_{INN}} \Delta AZ1D \frac{dt}{dV_{VRMP}} \quad (2)$$

$C_{OSN}$ represents the capacitance of the control capacitor 3303. $C_{INN}$ represents the capacitance of the input capacitor 3301. t represents time. $V_{VRMP}$ represents the voltage of the ramp signal VRMP.

Figure 9:
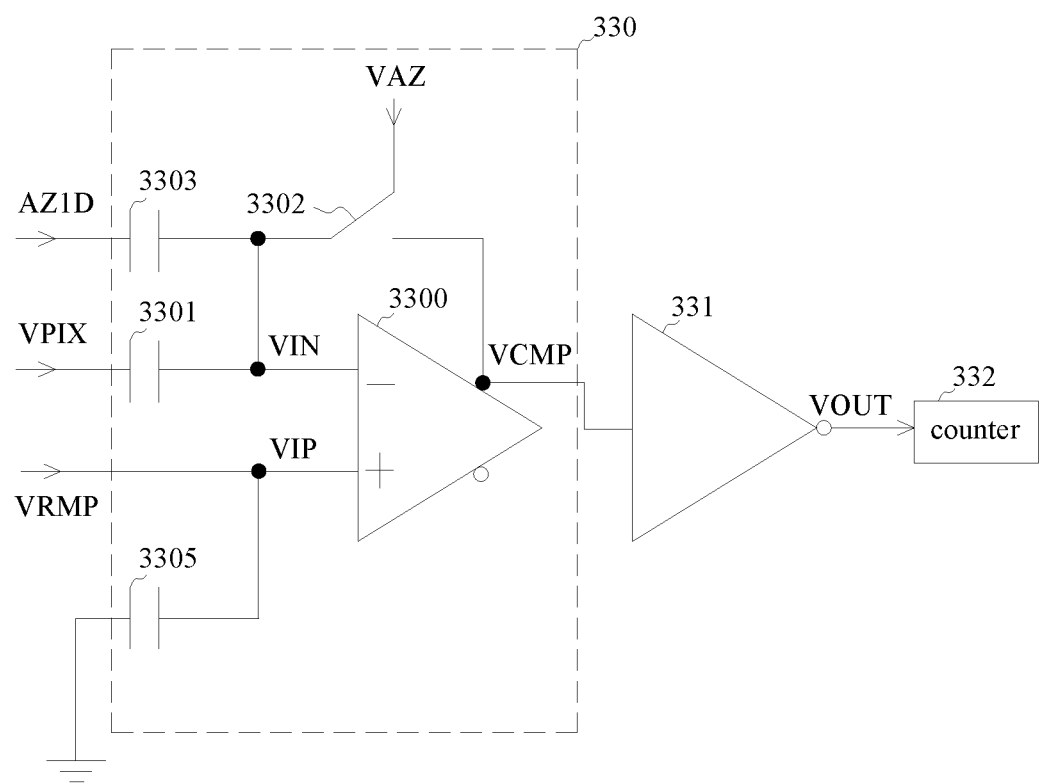
FIG. 9 is a diagram schematically illustrating a comparator circuit coupled to an inverter and a counter according to a second embodiment of the invention.

FIG. 9 is a diagram schematically illustrating a comparator circuit coupled to an inverter and a counter according to a second embodiment of the invention. Referring to FIG. 9, the second embodiment of the comparator circuit 330 is introduced as follows. Compared to the first embodiment of the comparator circuit 330, the second embodiment of the comparator circuit 330 further includes a control capacitor 3305 named as a second control capacitor. The control capacitor 3305 has a first end and a second end. The first end of the control capacitor 3305 is coupled to the second input node of the amplifier 3300. The second end of the control capacitor 3305 is grounded. The control capacitor 3305 does not influence the waveforms of the auto-zero control signal VAZ, the control signal AZ1D, the pixel signal VPIX, the ramp signal VRMP, the input voltages VIN and VIP, the comparison signal VCMP, and the output signal VOUT in FIG. 8. The other technical features of FIG. 9 have been described previously so it will not be reiterated.

Figure 10:
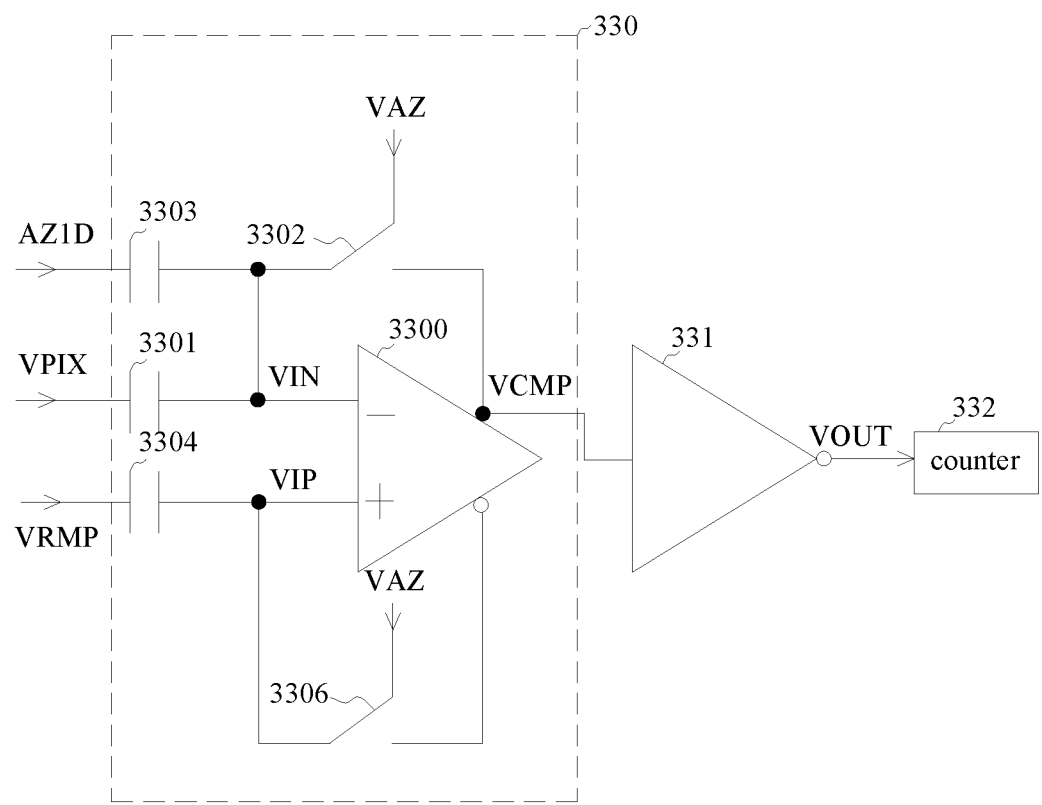
FIG. 10 is a diagram schematically illustrating a comparator circuit coupled to an inverter and a counter according to a third embodiment of the invention.

FIG. 10 is a diagram schematically illustrating a comparator circuit coupled to an inverter and a counter according to a third embodiment of the invention. Referring to FIG. 10, the third embodiment of the comparator circuit 330 is introduced as follows. Compared to the first embodiment of the comparator circuit 330, the third embodiment of the comparator circuit 330 further includes an input capacitor 3304 named as a second input capacitor and an auto-zero switch 3306 named as a second auto-zero switch. In the third embodiment, the amplifier 3300 has a second output node implemented with a negative output node. The input capacitor 3304 has a first end and a second end. The first end of the input capacitor 3304 is coupled to the second input node of the amplifier 3300. The second end of the input capacitor 3304 is coupled to the ramp signal VRMP as the reference signal. The auto-zero switch 3306 has a first end, a second end, a control end. The first end of the auto-zero switch 3306 is coupled to the second input node of the amplifier 3300. The second end of the auto-zero switch 3306 is coupled to the second output node of the amplifier 3300.

The control end of the auto-zero switch 3306 is coupled to the auto-zero control signal VAZ. The auto-zero control signal VAZ is configured to couple or decouple the second input node of the amplifier 3300 and the second output node of the amplifier 3300. When the voltage level of the auto-zero control signal VAZ rises from a logic low level to a logic high level, the auto-zero switch 3306 is turned on to couple the second input node and the second output node of the amplifier 3300 and help cancel the voltage offset between the input voltages VIN and VIP. When the voltage level of the auto-zero control signal VAZ descends from the logic high level to the logic low level, the auto-zero switch 3306 is turned off to decouple the second input node and the second output node of the amplifier 3300. The input capacitor 3304 and the auto-zero switch 3306 do not influence the waveforms of the auto-zero control signal VAZ, the control signal AZ1D, the pixel signal VPIX, the ramp signal VRMP, the input voltages VIN and VIP, the comparison signal VCMP, and the output signal VOUT in FIG. 8. In addition, the auto-zero switch 3306 may be applied to the second embodiment of FIG. 9. The other technical features of FIG. 10 have been described previously so it will not be reiterated.

Figure 11:
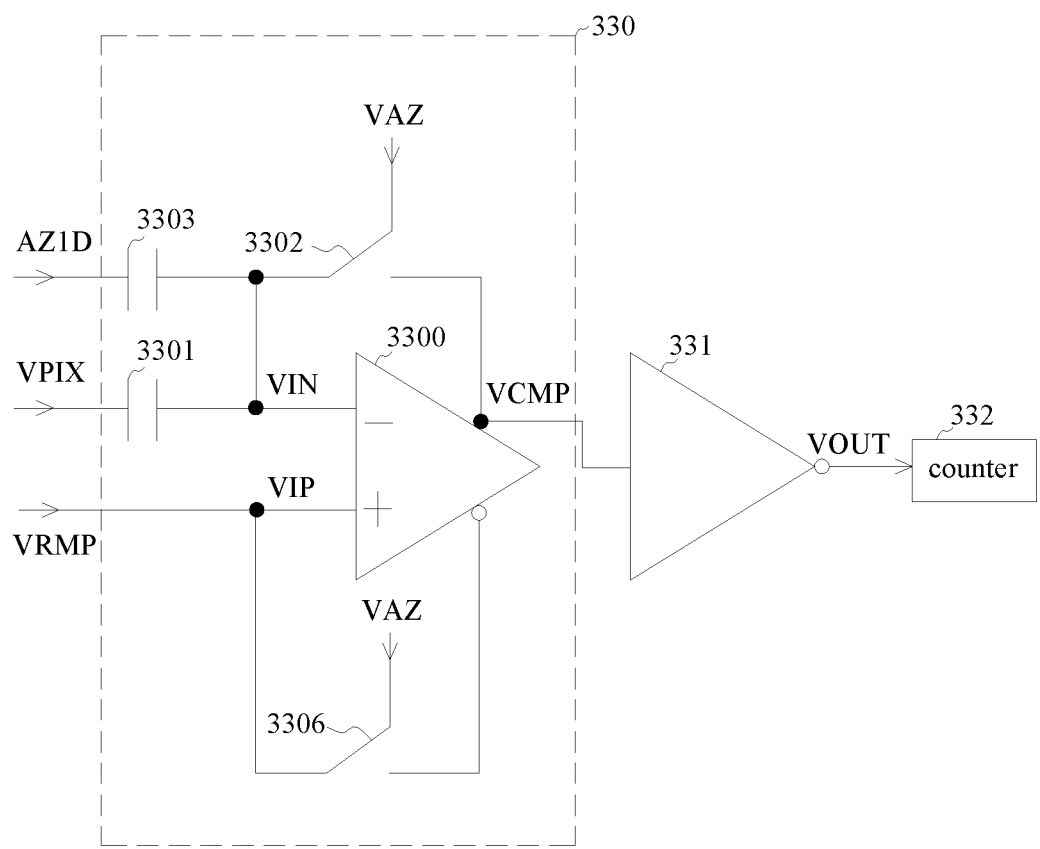
FIG. 11 is a diagram schematically illustrating a comparator circuit coupled to an inverter and a counter according to a fourth embodiment of the invention.

FIG. 11 is a diagram schematically illustrating a comparator circuit coupled to an inverter and a counter according to a fourth embodiment of the comparator circuit 330. Referring to FIG. 11 and FIG. 10, the fourth embodiment of the comparator circuit 330 is introduced as follows. Compared to the third embodiment of the comparator circuit 330 of FIG. 10, the fourth embodiment of the comparator circuit 330 does not have the input capacitor 3304. The omitted input capacitor 3304 does not influence the waveforms of the auto-zero control signal VAZ, the control signal AZ1D, the pixel signal VPIX, the ramp signal VRMP, the input voltages VIN and VIP, the comparison signal VCMP, and the output signal VOUT in FIG. 8. The other technical features of FIG. 11 have been described previously so it will not be reiterated.

Figure 12:
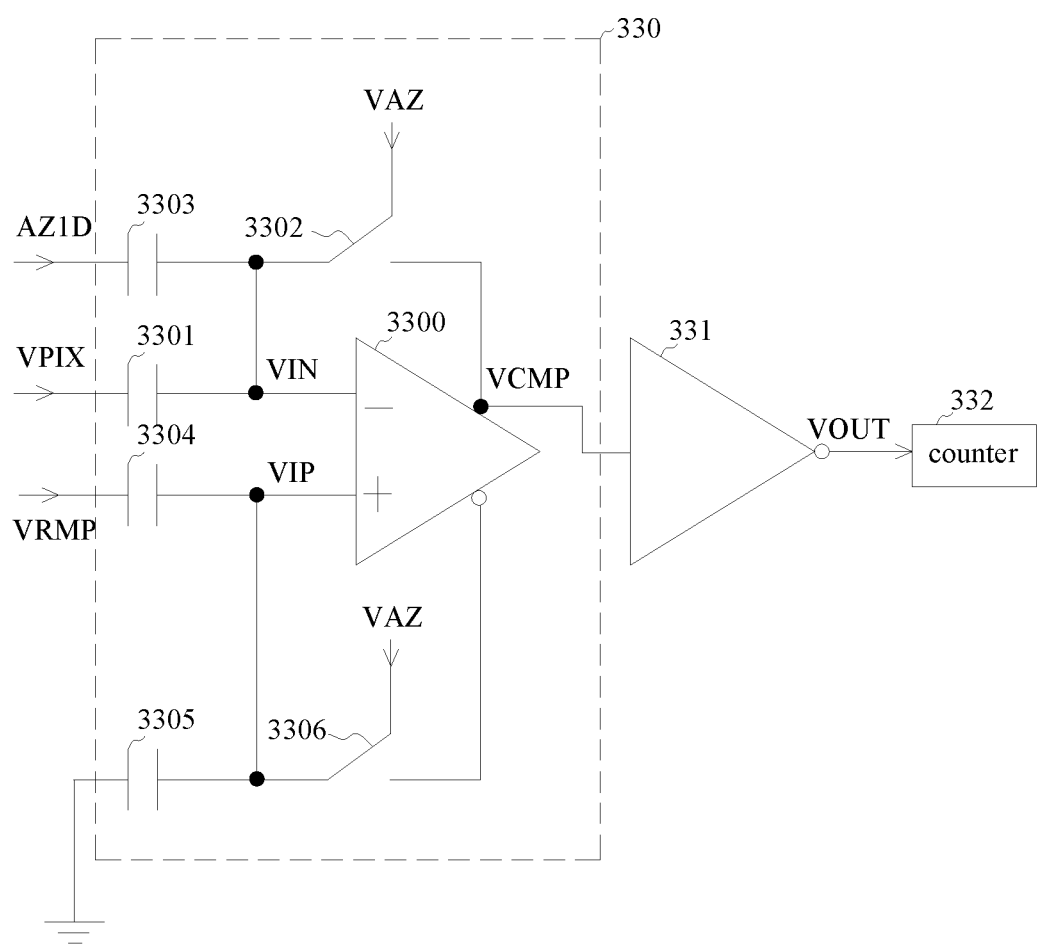
FIG. 12 is a diagram schematically illustrating a comparator circuit coupled to an inverter and a counter according to a fifth embodiment of the invention.

FIG. 12 is a diagram schematically illustrating a comparator circuit coupled to an inverter and a counter according to a fifth embodiment of the invention. Referring to FIG. 12, the fifth embodiment of the comparator circuit 330 is introduced as follows. Compared to the third embodiment of the comparator circuit 330, the fifth embodiment of the comparator circuit 330 further includes a control capacitor 3305 named as a second control capacitor. The control capacitor 3305 has a first end and a second end. The first end of the control capacitor 3305 is coupled to the second input node of the amplifier 3300. The second end of the control capacitor 3305 is grounded. The control capacitor 3305 does not influence the waveforms of the auto-zero control signal VAZ, the control signal AZ1D, the pixel signal VPIX, the ramp signal VRMP, the input voltages VIN and VIP, the comparison signal VCMP, and the output signal VOUT in FIG. 8. The other technical features of FIG. 12 have been described previously so it will not be reiterated.

Figure 13:
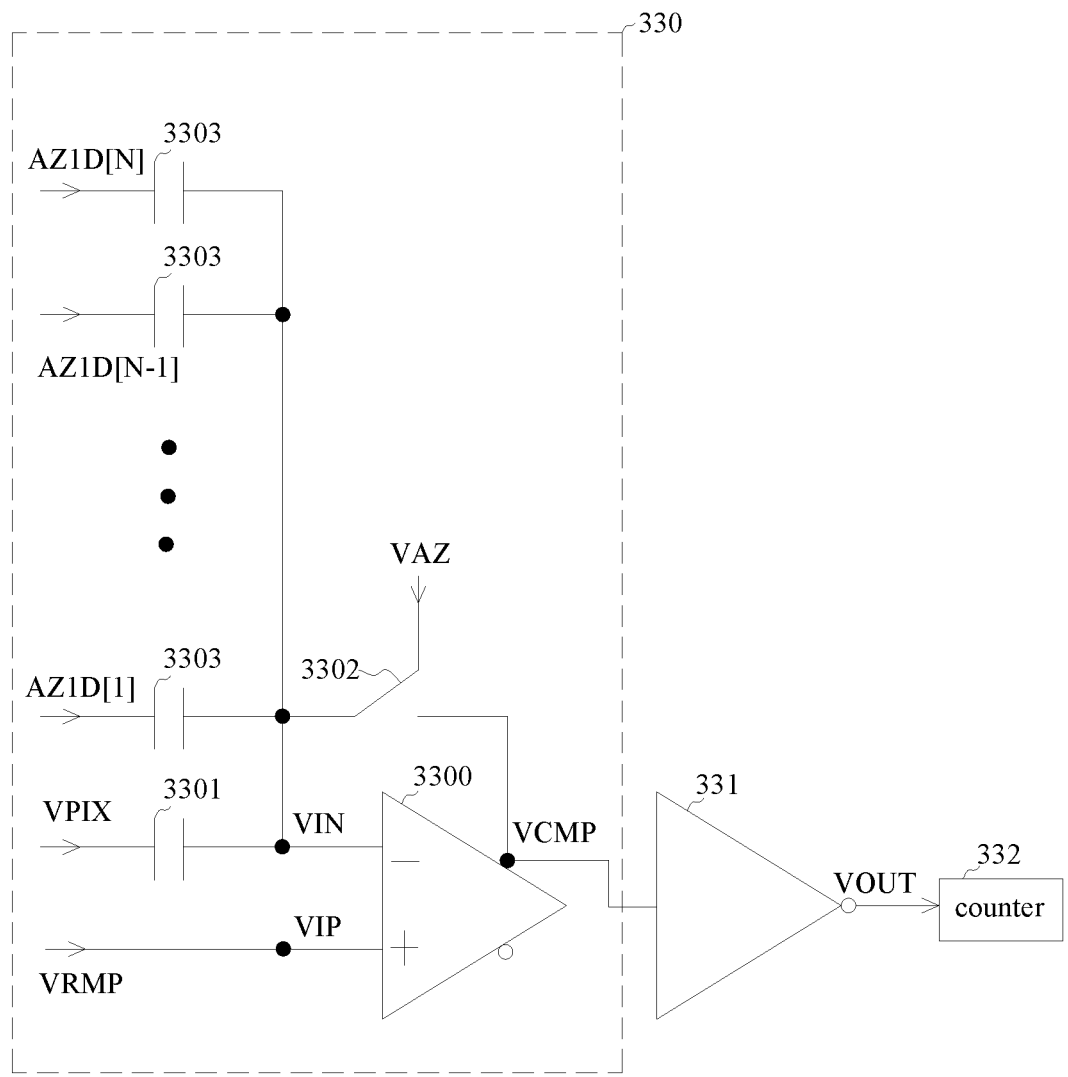
FIG. 13 is a diagram schematically illustrating a comparator circuit coupled to an inverter and a counter according to a sixth embodiment of the invention.
Figure 14:
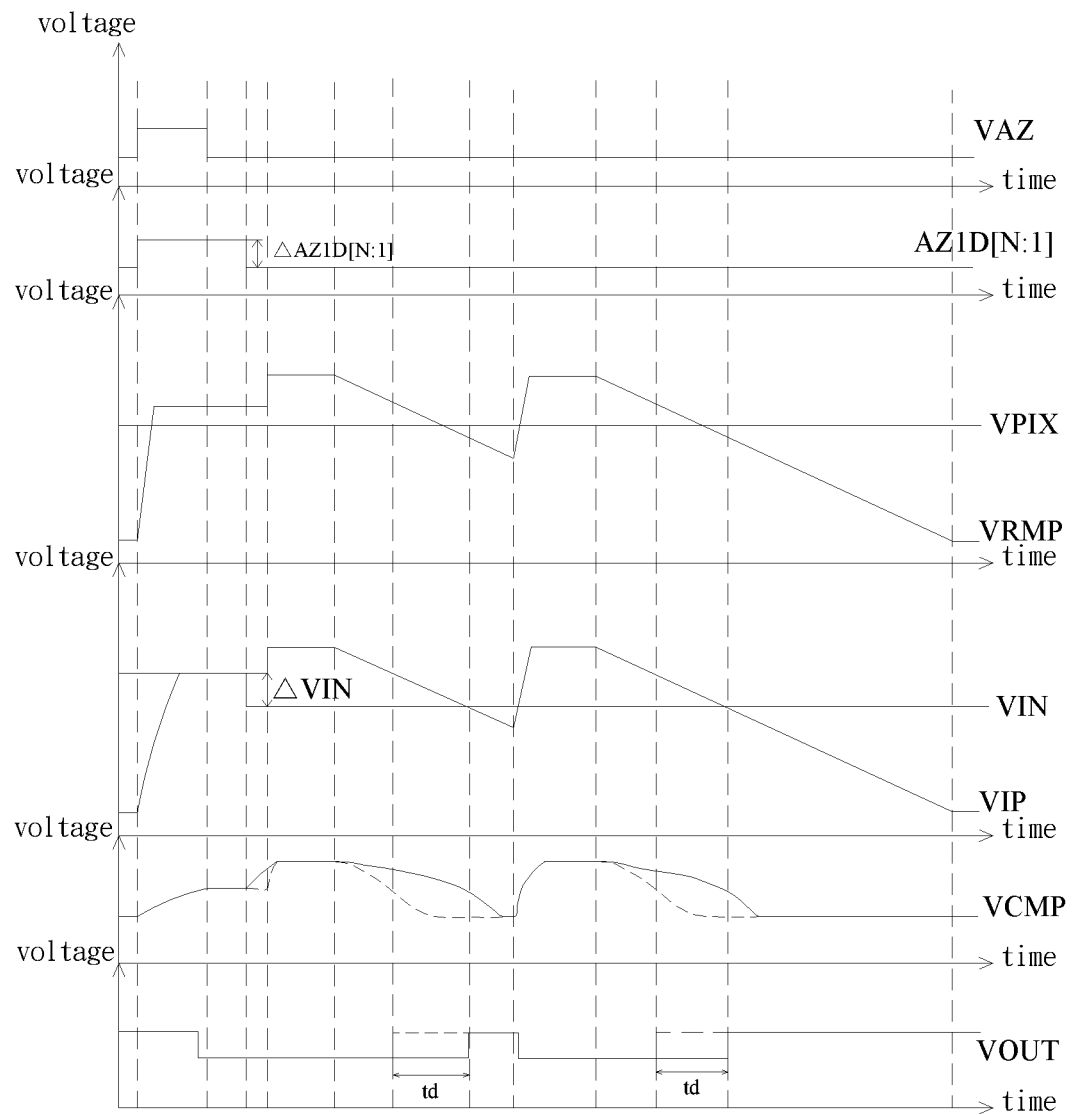
FIG. 14 is a diagram schematically illustrating the waveforms of the auto-zero control signal, the first control signals, the pixel signal, the reference signal, the input voltages of the amplifier, the comparison signal, and the output signal corresponding to FIG. 13.

FIG. 13 is a diagram schematically illustrating a comparator circuit coupled to an inverter and a counter according to a sixth embodiment of the invention. FIG. 14 is a diagram schematically illustrating the waveforms of the auto-zero control signal, the first control signals, the pixel signal, the reference signal, the input voltages of the amplifier, the comparison signal, and the output signal corresponding to FIG. 13. Referring to FIG. 13 and FIG. 14, the sixth embodiment of the comparator circuit 330 is introduced as follows. Compared to the first embodiment of the comparator circuit 330, the sixth embodiment of the comparator circuit 330 exemplifies a plurality of control capacitors 3303. The second ends of the control capacitors 3303 are respectively coupled to the respective control signals AZ1D[1]~AZ1D[N]. N is a natural number greater than 1. The number of the control capacitors 3303 is greater than or equal to the number of the groups of the comparator circuit 330. If the number of the groups of the comparator circuit 330 is equal to two, the number of the control capacitors 3303 is greater than or equal to two, and two of the control capacitors 3303 may be respectively selected to receive the respective control signals AZ1D[1] and AZ1D[2] and the remains of the control capacitors 3303 may be electrically floating. The other technical features of FIG. 13 have been described previously so it will not be reiterated.

As illustrated in FIG. 14, AZ1D[N:1] includes the respective control signals AZ1D[1]~AZ1D[N]. The input voltages VIN and VIP respectively follow the voltage levels of the pixel signal VPIX and the ramp signal VRMP. Each of the respective control signals AZ1D[1]~AZ1D[N] is different from the auto-zero control signal VAZ. Specifically, the active period of each of the respective control signals AZ1D[1]~AZ1D[N] may be larger than the active period of the auto-zero control signal VAZ. The leading edge of each of the respective control signals AZ1D[1]~AZ1D[N] is at the same time as the leading edge of the auto-zero control signal VAZ. The trailing edge of each of the respective control signals AZ1D[1]~AZ1D[N] is later than the trailing edge of the auto-zero control signal VAZ. When the voltage level of the auto-zero control signal VAZ rises from a logic low level to a logic high level, the auto-zero switch 3302 is turned on to couple the first input node of the amplifier 3300 to the first output node of the amplifier 3300, such that the input voltage VIN is equal to the input voltage VIP. Simultaneously, the voltage level of each of the respective control signals AZ1D[1]~AZ1D[N] rises from a logic low level to a logic high level. When the voltage level of the auto-zero control signal VAZ descends from the logic high level to the logic low level, the auto-zero switch 3302 is turned off to decouple the first input node of the amplifier 3300 to the first output node of the amplifier 3300. Afterwards, the voltage level of each of the respective control signals AZ1D[1]~AZ1D[N] descends from the logic high level to the logic low level. For example, the voltage levels of the respective control signals AZ1D[1]~AZ1D[N] are respectively decreased by ΔAZ1D[1]~ΔAZ1D[N]. ΔAZ1D[N:1] includes ΔAZ1D[1]~ΔAZ1D[N]. When the voltage levels of the respective control signals AZ1D[1]~AZ1D[N] are respectively decreased by ΔAZ1D[1]~ΔAZ1D[N], the voltage level of the input voltage VIN is decreased by ΔVIN, thereby changing the transition time points of voltages of the comparison signal VCMP and the output signal VOUT. The comparator circuits 330 are divided into a plurality of groups. Based on the foregoing mechanism, the voltage level transition of each of the respective control signals AZ1D[1]~AZ1D[N] causes the transition time points of the comparison signal VCMP and the output signal VOUT change. The transition time points of the comparison signal VCMP and the output signal VOUT depend on the input capacitor 3301, the control capacitors 3303, the respective control signals AZ1D[1]~AZ1D[N], and the ramp signal VRMP as the reference signal. The transition time points corresponding to the groups are respectively set and partially or completely occurring at different times, thereby reducing the peak current and the IR drop. Compared to the comparison signal VCMP in FIG. 3 (which is also depicted in FIG. 14 by the dashed waveform), the comparison signal VCMP (depicted in solid waveform) in FIG. 14 changes due to the voltage difference ΔVIN and results in that the transition time point of the output signal VOUT is delayed by the time delay td. Specifically, ΔVIN and td are respectively represented by equations (3) and (4).

$$\Delta VIN = \frac{\sum_{i=1}^{N} C_{OSN}[i]\Delta AZ1D[i]}{\sum_{i=1}^{N} C_{OSN}[i] + C_{INN}} \quad (3)$$

$$td = \frac{\sum_{i=1}^{N} C_{OSN}[i]\Delta AZ1D[i]}{\sum_{i=1}^{N} C_{OSN}[i] + C_{INN}} \frac{dt}{dV_{VRMP}} \quad (4)$$

$C_{OSN}[i]$ represents the capacitance of the i-th control capacitor 3303.

Figure 15:
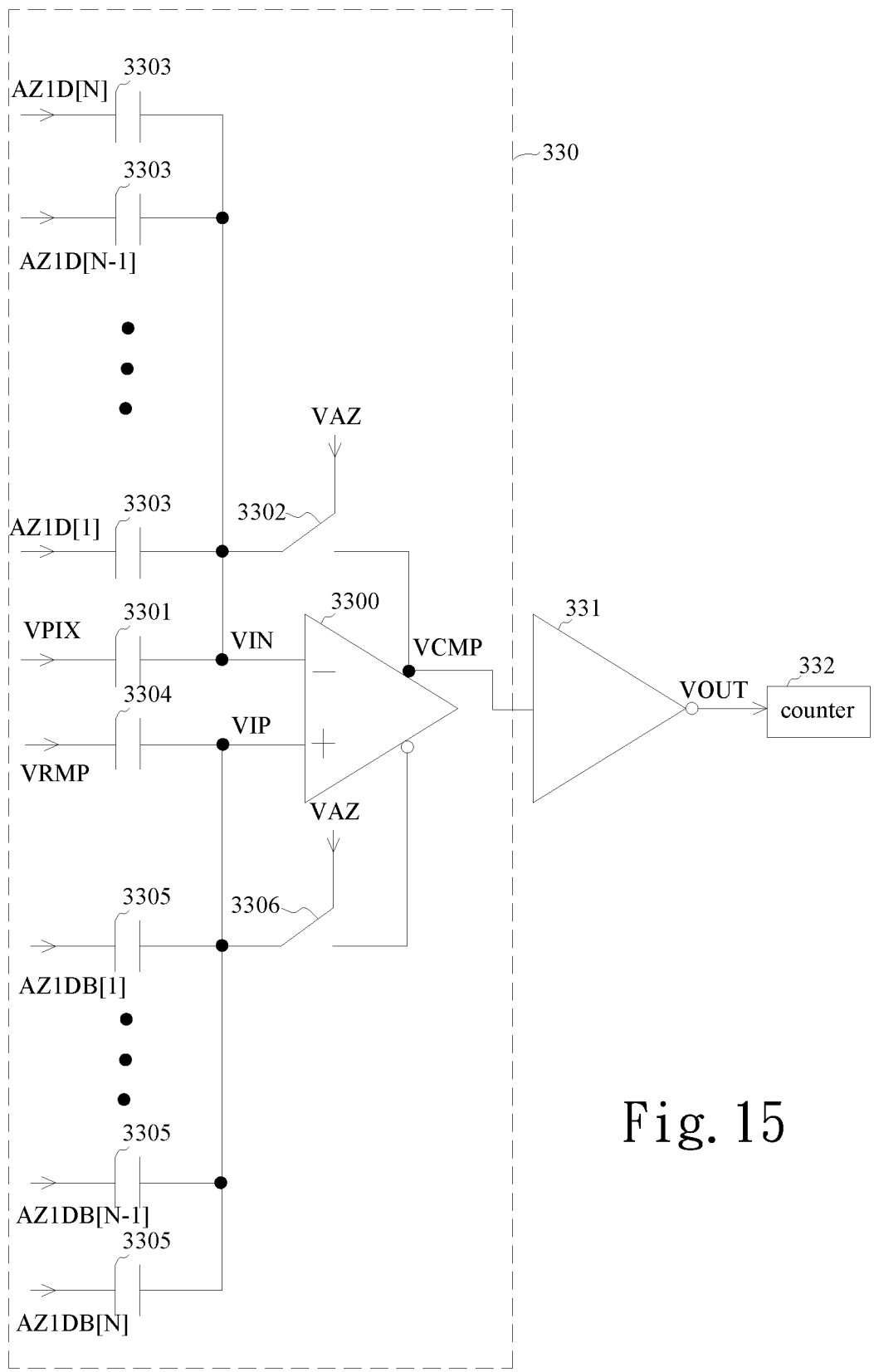
FIG. 15 is a diagram schematically illustrating a comparator circuit coupled to an inverter and a counter according to a seventh embodiment of the invention.
Figure 16:
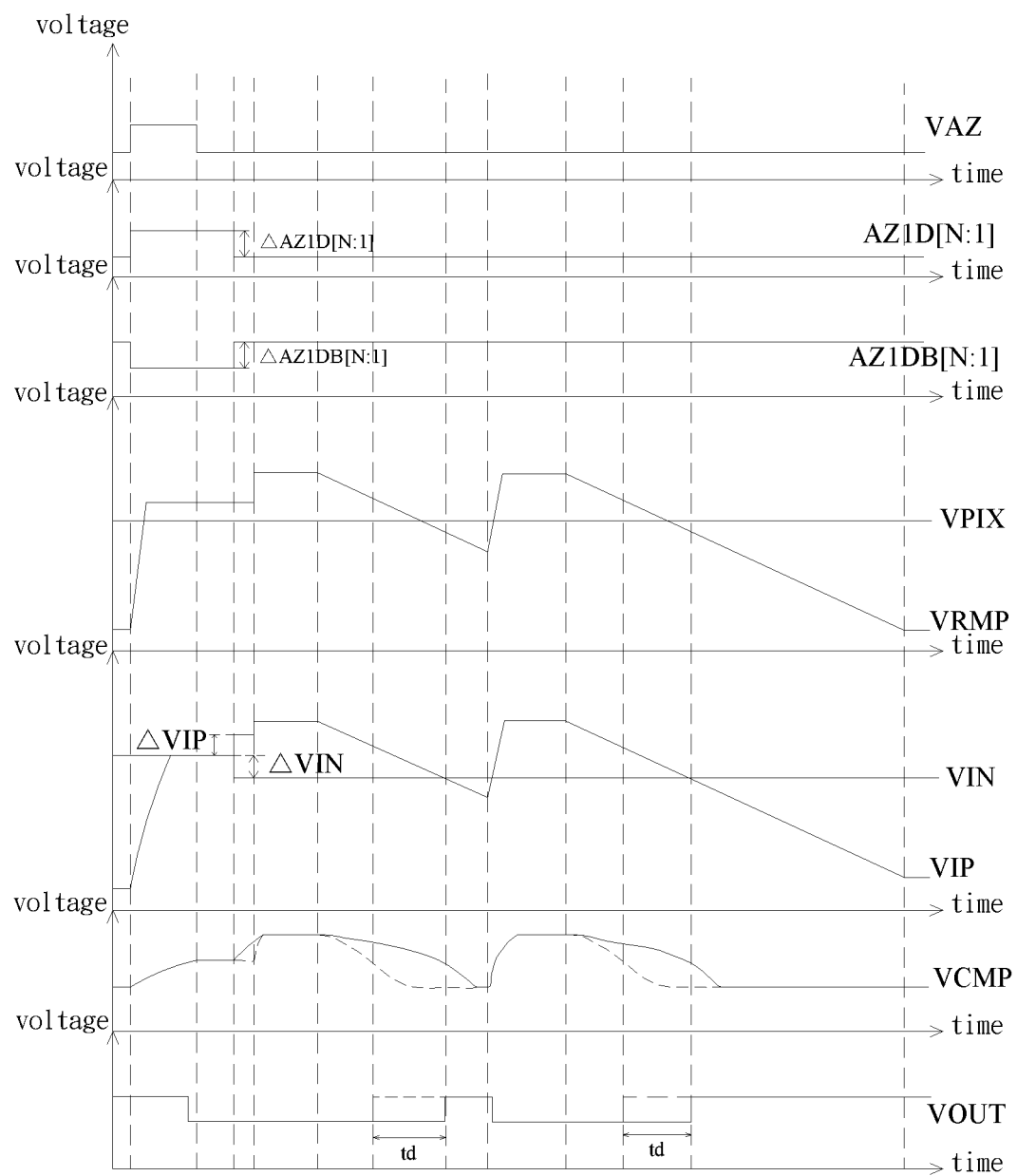
FIG. 16 is a diagram schematically illustrating the waveforms of the auto-zero control signal, the first control signals, the second control signals, the pixel signal, the reference signal, the input voltages of the amplifier, the comparison signal, and the output signal corresponding to FIG. 15.

FIG. 15 is a diagram schematically illustrating a comparator circuit coupled to an inverter and a counter according to a seventh embodiment of the invention. FIG. 16 is a diagram schematically illustrating the waveforms of the auto-zero control signal, the first control signals, the second control signals, the pixel signal, the reference signal, the input voltages of the amplifier, the comparison signal, and the output signal corresponding to FIG. 15. Referring to FIG. 15 and FIG. 16, the seventh embodiment of the comparator circuit 330 is introduced as follows. Compared to the sixth embodiment of the comparator circuit 330, the seventh embodiment of the comparator circuit 330 further includes an input capacitor 3304, at least one control capacitor 3305, and an auto-zero switch 3306. The technical features of the input capacitor 3304 and the auto-zero switch 3306 have been described in the third embodiment of FIG. 10. The seventh embodiment of the comparator circuit 330 exemplifies a plurality of control capacitors 3305. Each control capacitor 3305 has a first end and a second end. The first end of each control capacitor 3305 is coupled to the second input node of the amplifier 3300. The second ends of the control capacitors 3305 are respectively coupled to respective control signals AZ1DB[1]~AZ1DB[N] named as respective second control signals. The number of the control capacitors 3305 is greater than or equal to the number of the groups of the comparator circuit 330. If the number of the groups of the comparator circuit 330 is equal to two, the number of the control capacitors 3305 is greater than or equal to two, and two of the control capacitors 3305 may be respectively selected to receive the respective control signals AZ1DB[1] and AZ1DB[2] and the remains of the control capacitors 3305 may be electrically floating. The other technical features of FIG. 15 have been described previously so it will not be reiterated.

As illustrated in FIG. 16, AZ1DB[N:1] includes the respective control signals AZ1DB[1]~AZ1D[N]. The input voltages VIN and VIP respectively follow the voltage levels of the pixel signal VPIX and the ramp signal VRMP. The waveform of the input voltage VIN in FIG. 16 is identical to the waveform of the input voltage VIN in FIG. 14. Each of the respective control signals AZ1DB[1]~AZ1DB[N] is different from the auto-zero control signal VAZ. Specifically, the active period of each of the respective control signals AZ1DB[1]~AZ1DB[N] may be larger than the active period of the auto-zero control signal VAZ. The leading edge of each of the respective control signals AZ1DB[1]~AZ1DB[N] is at the same time as the leading edge of the auto-zero control signal VAZ. The trailing edge of each of the respective control signals AZ1DB[1]~AZ1DB[N] is later than the trailing edge of the auto-zero control signal VAZ. When the voltage level of the auto-zero control signal VAZ rises from a logic low level to a logic high level, the auto-zero switch 3302 and the auto-zero switch 3306 are turned on to couple the first input node of the amplifier 3300 to the first output node of the amplifier 3300 and couple the second input node of the amplifier 3300 to the second output node of the amplifier 3300, such that the input voltage VIN is equal to the input voltage VIP. Simultaneously, the voltage level of each of the respective control signals AZ1DB[1]~AZ1DB[N] descends from a logic high level to a logic low level. When the voltage level of the auto-zero control signal VAZ descends from the logic high level to the logic low level, the auto-zero switch 3302 and the auto-zero switch 3306 are turned off to decouple the first input node of the amplifier 3300 to the first output node of the amplifier 3300 and decouple the second input node of the amplifier 3300 to the second output node of the amplifier 3300. Afterwards, the voltage level of each of the respective control signals AZ1DB[1]~AZ1DB[N] rises from the logic low level to the logic high level. For example, the voltage levels of the respective control signals AZ1DB[1]~AZ1DB[N] are respectively increased by $\Delta$AZ1DB[1]~$\Delta$AZ1DB[N]. $\Delta$AZ1DB[N:1] includes $\Delta$AZ1DB[1]~$\Delta$AZ1DB[N]. When the voltage levels of the respective control signals AZ1DB[1]~AZ1DB[N] are respectively increased by $\Delta$AZ1DB[1]~$\Delta$AZ1DB[N], the voltage level of the input voltage VIP is increased by $\Delta$VIP, thereby changing the transition time points of voltages of the comparison signal VCMP and the output signal VOUT. The comparator circuits 330 are divided into a plurality of groups. Based on the foregoing mechanism, the voltage level transition of each of the respective control signals AZ1D[1]~AZ1D[N] and the respective control signals AZ1DB[1]~AZ1DB[N] causes the transition time points of the comparison signal VCMP and the output signal VOUT change. The transition time points of the comparison signal VCMP and the output signal VOUT depend on the input capacitor 3301, the control capacitors 3303, the respective control signals AZ1D[1]~AZ1D[N], the input capacitor 3304, the control capacitors 3305, the respective control signals AZ1DB[1]~AZ1DB[N], and the ramp signal VRMP as the reference signal. The transition time points corresponding to the groups are respectively set and partially or completely occurring at different times, thereby reducing the peak current and the IR drop. Compared to the comparison signal VCMP in FIG. 3 (which is also depicted in FIG. 16 by the dashed waveform), the comparison signal VCMP (depicted in solid waveform) in FIG. 16 changes due to the voltage difference $\Delta$VIP and results in that the transition time point of the output signal VOUT is delayed by the time delay td. Specifically, $\Delta$VIP and td are respectively represented by equations (5) and (6).

$$\Delta VIP = \frac{\sum_{i=1}^{N} C_{OSP}[i] \Delta AZ1DB[i]}{\sum_{i=1}^{N} C_{OSP}[i] + C_{INP}} \quad (5)$$

$$td = \left( \frac{\sum_{i=1}^{N} C_{OSN}[i] \Delta AZ1D[i]}{\sum_{i=1}^{N} C_{OSN}[i] + C_{INN}} + \frac{\sum_{i=1}^{N} C_{OSP}[i] \Delta AZ1DB[i]}{\sum_{i=1}^{N} C_{OSP}[i] + C_{INP}} \right) \frac{dt}{dV_{VRMP}} \quad (6)$$

$C_{OSP}[i]$ represents the capacitance of the i-th control capacitor 3305. $C_{INP}$ represents the capacitance of the input capacitor 3304.

Figure 17:
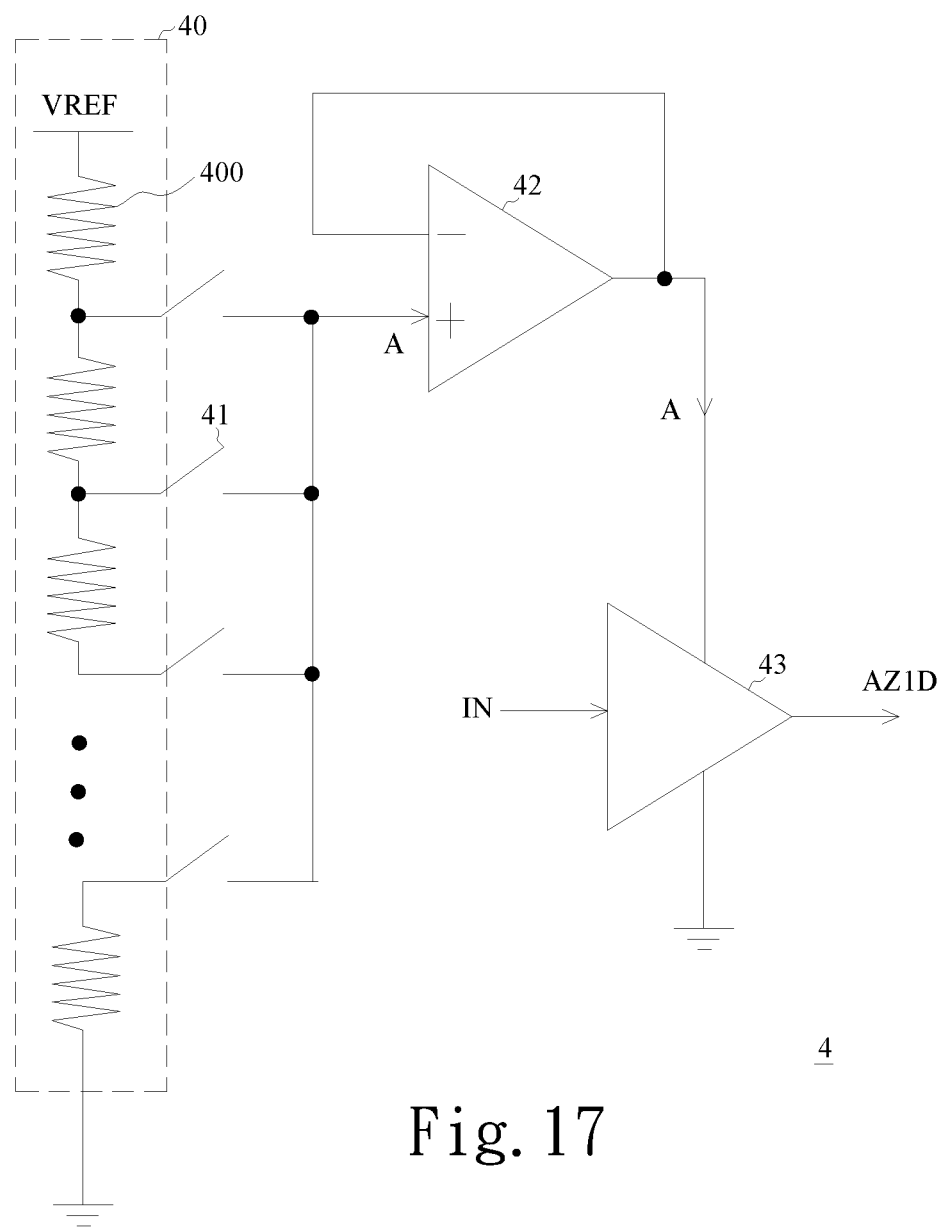
FIG. 17 is a diagram schematically illustrating a voltage generation circuit according to an embodiment of the invention.

FIG. 17 is a diagram schematically illustrating a voltage generation circuit according to an embodiment of the invention. Referring to FIG. 17 and FIG. 7, the second end of the control capacitor 3303 may be coupled to a voltage generation circuit 4. The voltage generation circuit 4 may include, but is not limited to, a voltage dividing resistor string 40, a plurality of electrical switches 41, a first buffer 42, and a second buffer 43. The voltage dividing resistor string 40 includes a plurality of resistors 400 coupled in series. Anode between the two adjacent resistors 400 is coupled to an end of the electrical switch 41 and another end of the electrical switch 41 is coupled to the input of the first buffer 42. The output of the first buffer 42 is coupled to the second buffer 43. The output of the second buffer 43 may be coupled to the second end of the control capacitor 3303. The voltage dividing resistor string 40 receives a reference voltage VREF to generate an adjustable voltage A. By turning one of the electrical switches 41, the adjustable voltage A is transmitted to the first buffer 42 and the second buffer 43. The second buffer 43 receives an input signal IN and the adjustable voltage A to generate the respective control signal AZ1D. The respective control signal AZ1D has an active period and an amplitude in the active period, wherein the amplitude depends on the adjustable voltage A.

Figure 18:
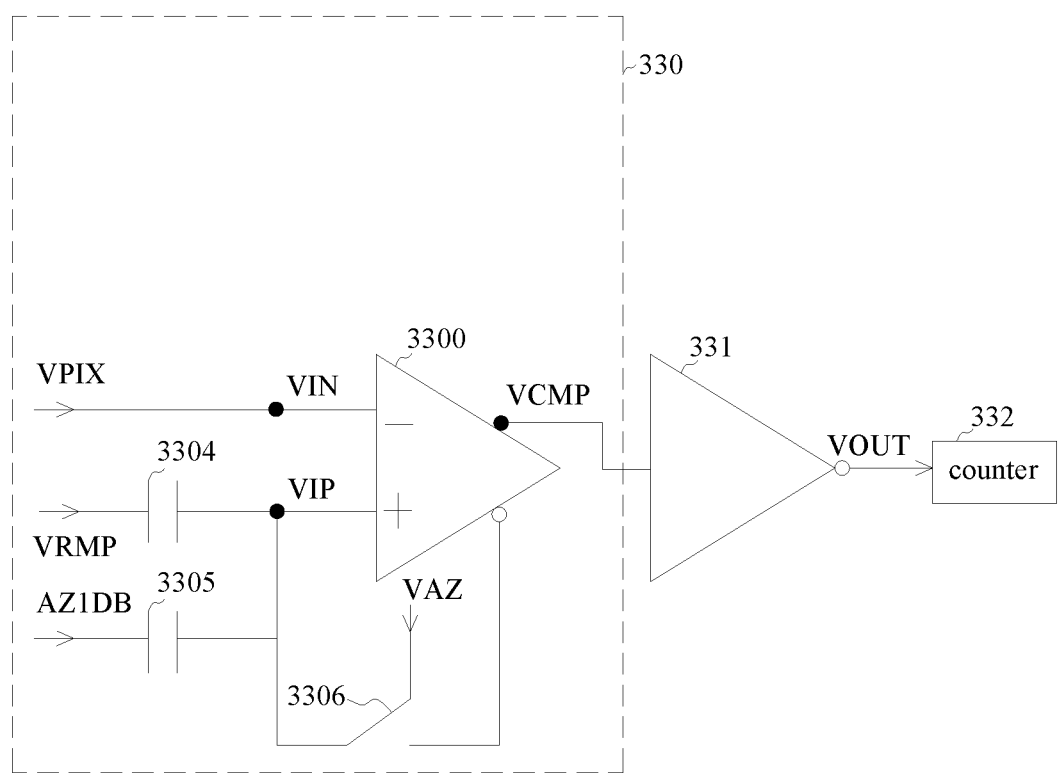
FIG. 18 is a diagram schematically illustrating a comparator circuit coupled to an inverter and a counter according to an eighth embodiment of the invention.
Figure 19:
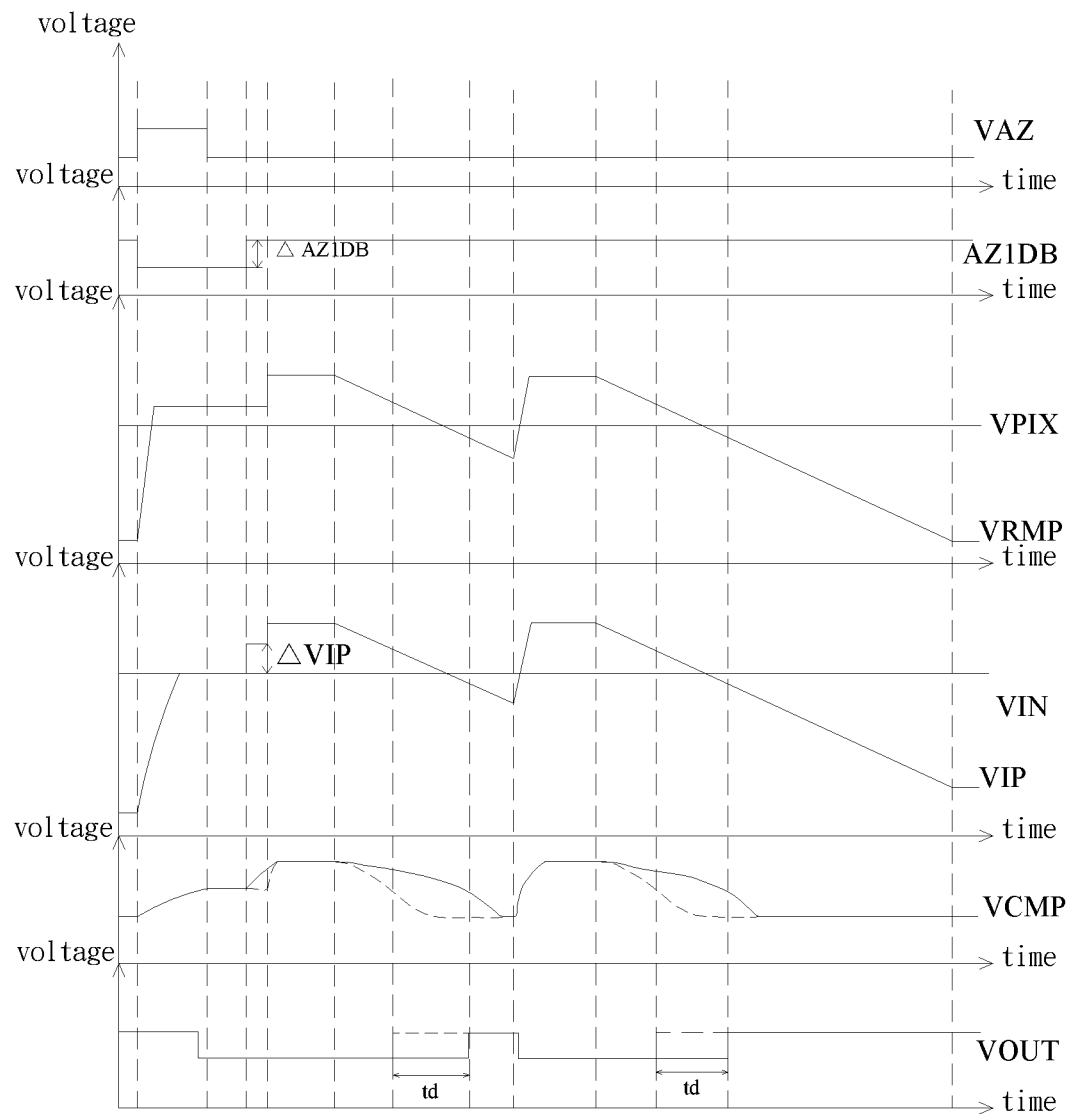
FIG. 19 is a diagram schematically illustrating the waveforms of the auto-zero control signal, the first control signal, the pixel signal, the reference signal, the input voltages of the amplifier, the comparison signal, and the output signal corresponding to FIG. 18.

FIG. 18 is a diagram schematically illustrating a comparator circuit coupled to an inverter and a counter according to an eighth embodiment of the invention. FIG. 19 is a diagram schematically illustrating the waveforms of the auto-zero control signal, the first control signal, the pixel signal, the reference signal, the input voltages of the amplifier, the comparison signal, and the output signal corresponding to FIG. 18. Referring to FIG. 18 and FIG. 19, the eighth embodiment of the comparator circuit 330 is introduced as follows. The comparator circuit 330 includes an amplifier 3300, an input capacitor 3304 named as a first input capacitor, an auto-zero switch 3306 named as a first auto-zero switch, and at least one control capacitor 3305 named as a first control capacitor. For clarity and convenience, the ninth embodiment exemplifies one control capacitor 3305. The amplifier 3300 has a first input node, a second input node, a first output node, and a second output node. In the eighth embodiment, the first input node may be a positive input node, the second input node may be a negative input node, and the first output node and the second output node may be respectively a negative output node and a positive output node. The input capacitor 3304 has a first end and a second end. The first end of the input capacitor 3304 is coupled to the first input node of the amplifier 3300. The auto-zero switch 3306 has a first end, a second end, and a control end. The first end of the auto-zero switch 3306 is coupled to the first input node of the amplifier 3300. The second end of the auto-zero switch 3306 is coupled to the first output node of the amplifier 3300. The control capacitor 3305 has a first end and a second end. The first end of the control capacitor 3305 is coupled to the first input node of the amplifier 3300.

In order to effectively read the pixel signals VPIX, the image readout device may further include a plurality of inverters 331 and a plurality of counters 332. The inverters 331 are respectively coupled to the second output nodes of the amplifiers 3300 of the comparator circuits 330. The counters 332 are respectively coupled to the inverters 331.

The operation of the eighth embodiment of the comparator circuit 330 is introduced as follows. The first input node and the second input node of the amplifier 3300 respectively receive a reference signal and a pixel signal VPIX from the image sensor array. The reference signal may be, but not limited to, a ramp signal VRMP. The amplifier 3300 compares the pixel signal VPIX to the ramp signal VRMP to generate a comparison signal VCMP from the second output node. The second end of the input capacitor 3304 is coupled to the ramp signal VRMP. The control end of the auto-zero switch 3306 is coupled to an auto-zero control signal VAZ. The auto-zero control signal VAZ is configured to couple or decouple the first input node of the amplifier 3300 to the first output node of the amplifier 3300. The second end of the control capacitor 3305 is coupled to a respective control signal AZ1DB named as a respective first control signal. In addition, the input voltage of the negative input node of the amplifier 3300 is represented with VIN. The input voltage of the positive input node of the amplifier 3300 is represented with VIP. The inverters 331 convert the comparison signals VCMP generated from the comparator circuits 330 into a plurality of output signals VOUT which transition between a high level and a low level based on a predetermined voltage level. Each counter 332 counts one of the output signals VOUT to generate a digital counting value corresponding to the pixel signal VPIX.

As illustrated in FIG. 19, the input voltages VIN and VIP respectively follow the voltage levels of the pixel signal VPIX and the ramp signal VRMP. The respective control signal AZ1DB is different from the auto-zero control signal VAZ. Specifically, the active period of the respective control signal AZ1DB may be larger than the active period of the auto-zero control signal VAZ. The leading edge of the respective control signal AZ1DB is at the same time as the leading edge of the auto-zero control signal VAZ. The trailing edge of the respective control signal AZ1DB is later than the trailing edge of the auto-zero control signal VAZ. When the voltage level of the auto-zero control signal VAZ rises from a logic low level to a logic high level, the auto-zero switch 3306 is turned on to couple the first input node of the amplifier 3300 to the first output node of the amplifier 3300, such that the input voltage VIN is equal to the input voltage VIP. Simultaneously, the voltage level of the respective control signal AZ1DB descends from a logic high level to a logic low level. When the voltage level of the auto-zero control signal VAZ descends from the logic high level to the logic low level, the auto-zero switch 3306 is turned off to decouple the first input node of the amplifier 3300 to the first output node of the amplifier 3300. Afterwards, the voltage level of the respective control signal AZ1DB rises from the logic low level to the logic high level. For example, the voltage level of the respective control signal AZ1DB is increased by $\Delta AZ1DB$. When the voltage level of the respective control signal AZ1DB is increased by $\Delta AZ1DB$, the voltage level of the input voltage VIP is increased by $\Delta VIP$, thereby changing the transition time points of voltages of the comparison signal VCMP and the output signal VOUT. The comparator circuits 330 are divided into a plurality of groups. Based on the foregoing mechanism, the voltage level transition of the respective control signal AZ1DB causes the transition time points of the comparison signal VCMP and the output signal VOUT change. The transition time points of the comparison signal VCMP and the output signal VOUT depend on the input capacitor 3304, the control capacitor 3305, the respective control signal AZ1DB, and the ramp signal VRMP as the reference signal. The transition time points corresponding to the groups are respectively set and partially or completely occurring at different times, thereby reducing the peak current and the IR drop. Compared to the comparison signal VCMP in FIG. 3 (which is also depicted in FIG. 19 by the dashed waveform), the comparison signal VCMP (depicted in solid waveform) in FIG. 19 changes due to the voltage difference $\Delta VIP$ and results in that the transition time point of the output signal VOUT is delayed by the time delay td. Specifically, $\Delta VIP$ and td are respectively represented by equations (7) and (8).

$$\Delta VIP = \frac{C_{OSP}}{C_{OSP} + C_{INP}} \Delta AZ1DB \tag{7}$$

$$td = \frac{C_{OSP}}{C_{OSP} + C_{INP}} \Delta AZ1DB \frac{dt}{dV_{VRMP}} \tag{8}$$

$C_{OSP}$ represents the capacitance of the control capacitor 3305. $C_{INP}$ represents the capacitance of the input capacitor 3304.

Referring to FIG. 17 and FIG. 18, the output of the second buffer 43 may be coupled to the second end of the control capacitor 3305. The second buffer 43 may receive the input signal IN and the adjustable voltage A to generate the respective control signal AZ1DB.

Figure 20:
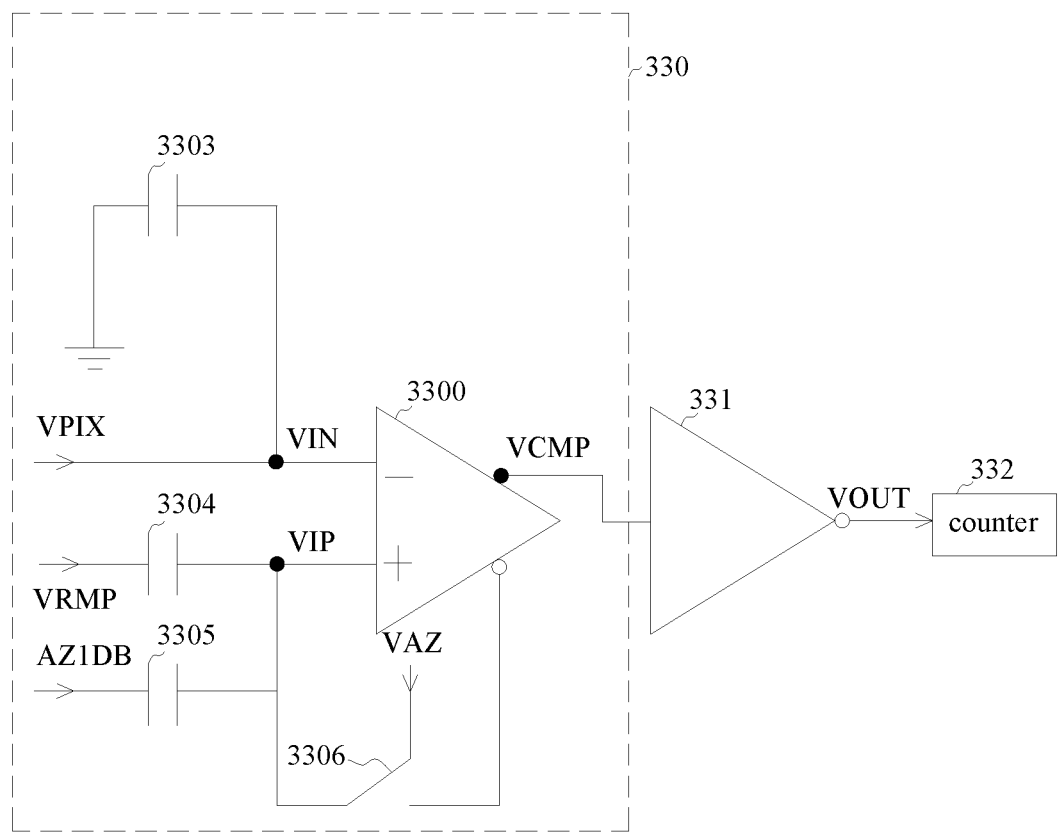
FIG. 20 is a diagram schematically illustrating a comparator circuit coupled to an inverter and a counter according to a ninth embodiment of the invention.

FIG. 20 is a diagram schematically illustrating a comparator circuit coupled to an inverter and a counter according to a ninth embodiment of the invention. Referring to FIG. 20, the ninth embodiment of the comparator circuit 330 is introduced as follows. Compared to the eighth embodiment of the comparator circuit 330, the ninth embodiment of the comparator circuit 330 further includes a control capacitor 3303 named as a second control capacitor. The control capacitor 3303 has a first end and a second end. The first end of the control capacitor 3303 is coupled to the second input node of the amplifier 3300. The second end of the control capacitor 3303 is grounded. The control capacitor 3303 does not influence the waveforms of the auto-zero control signal VAZ, the control signal AZ1DB, the pixel signal VPIX, the ramp signal VRMP, the input voltages VIN and VIP, the comparison signal VCMP, and the output signal VOUT in FIG. 19. The other technical features of FIG. 20 have been described previously so it will not be reiterated.

Figure 21:
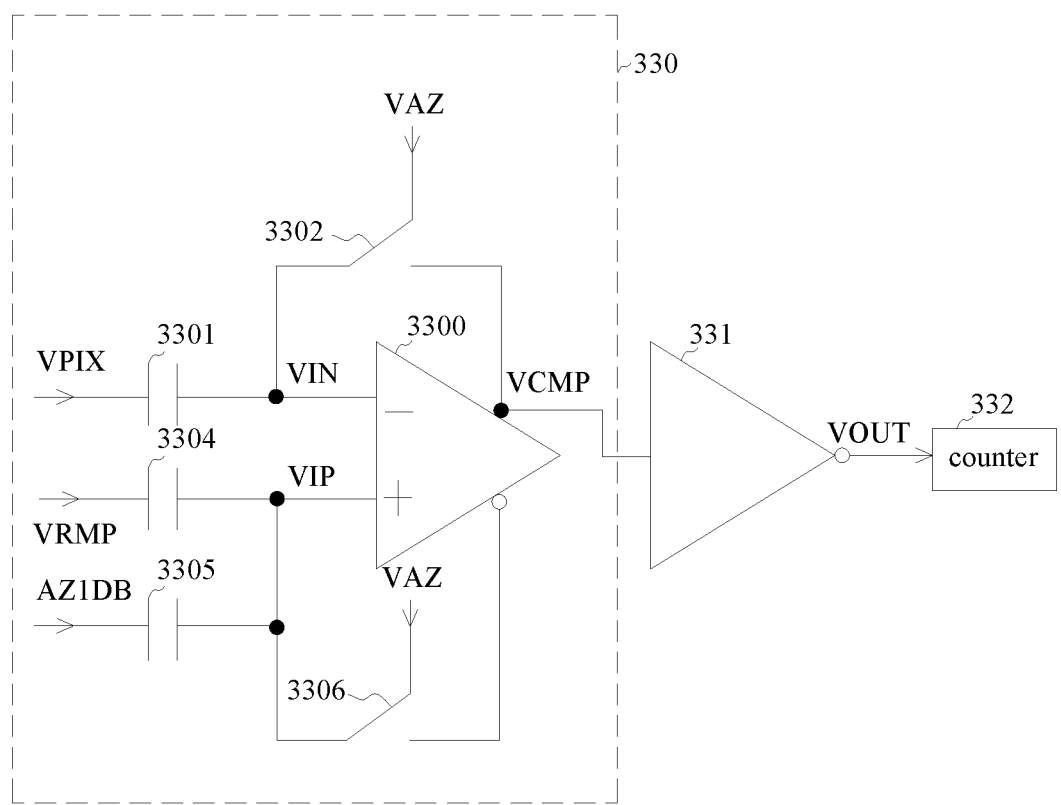
FIG. 21 is a diagram schematically illustrating a comparator circuit coupled to an inverter and a counter according to a tenth embodiment of the invention.

FIG. 21 is a diagram schematically illustrating a comparator circuit coupled to an inverter and a counter according to a tenth embodiment of the invention. Referring to FIG. 21, the tenth embodiment of the comparator circuit 330 is introduced as follows. Compared to the eighth embodiment of the comparator circuit 330, the tenth embodiment of the comparator circuit 330 further includes an input capacitor 3301 named as a second input capacitor and an auto-zero switch 3302. The input capacitor 3301 has a first end and a second end. The first end of the input capacitor 3301 is coupled to the second input node of the amplifier 3300. The second end of the input capacitor 3301 is coupled to the pixel signal VPIX. The auto-zero switch 3302 has a first end, a second end, and a control end. The first end of the auto-zero switch 3302 is coupled to the second input node of the amplifier 3300. The second end of the auto-zero switch 3302 is coupled to the second output node of the amplifier

3300. The control end of the auto-zero switch 3302 is coupled to the auto-zero control signal VAZ. The auto-zero control signal VAZ is configured to couple or decouple the second input node of the amplifier 3300 and the second output node of the amplifier 3300. When the voltage level of the auto-zero control signal VAZ rises from a logic low level to a logic high level, the auto-zero switch 3302 is turned on to couple the second input node and the second output node of the amplifier 3300 and help cancel the voltage offset between the input voltages VIN and VIP. When the voltage level of the auto-zero control signal VAZ descends from the logic high level to the logic low level, the auto-zero switch 3302 is turned off to decouple the second input node and the second output node of the amplifier 3300. The input capacitor 3301 and the auto-zero switch 3302 do not influence the waveforms of the auto-zero control signal VAZ, the control signal AZ1DB, the pixel signal VPIX, the ramp signal VRMP, the input voltages VIN and VIP, the comparison signal VCMP, and the output signal VOUT in FIG. 19. In addition, the auto-zero switch 3302 may be applied to the ninth embodiment of FIG. 20. The other technical features of FIG. 21 have been described previously so it will not be reiterated.

Figure 22:
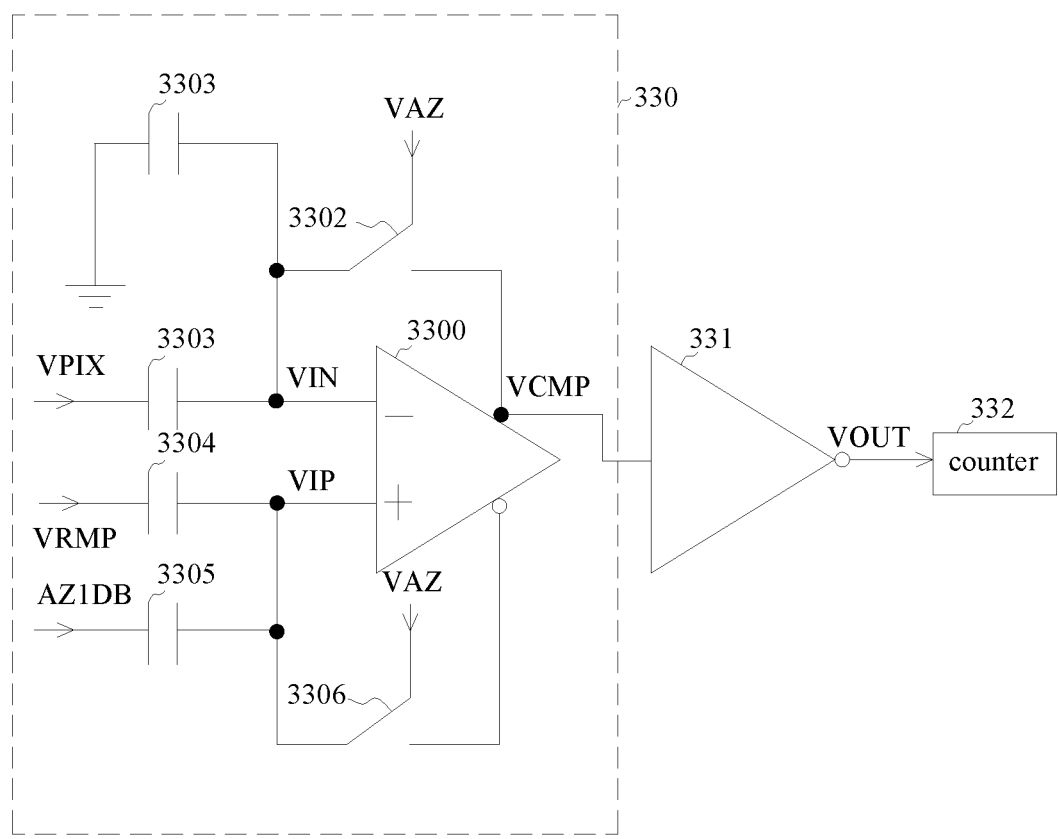
FIG. 22 is a diagram schematically illustrating a comparator circuit coupled to an inverter and a counter according to an eleventh embodiment of the invention.

FIG. 22 is a diagram schematically illustrating a comparator circuit coupled to an inverter and a counter according to an eleventh embodiment of the invention. Referring to FIG. 22 and FIG. 21, the eleventh embodiment of the comparator circuit 330 is introduced as follows. Compared to the tenth embodiment of the comparator circuit 330, the eleventh embodiment of the comparator circuit 330 further includes a control capacitor 3303 named as a second control capacitor. The control capacitor 3303 has a first end and a second end. The first end of the control capacitor 3303 is coupled to the second input node of the amplifier 3300. The second end of the control capacitor 3303 is grounded. The control capacitor 3303 does not influence the waveforms of the auto-zero control signal VAZ, the control signal AZ1DB, the pixel signal VPIX, the ramp signal VRMP, the input voltages VIN and VIP, the comparison signal VCMP, and the output signal VOUT in FIG. 19. The other technical features of FIG. 22 have been described previously so it will not be reiterated.

Figure 23:
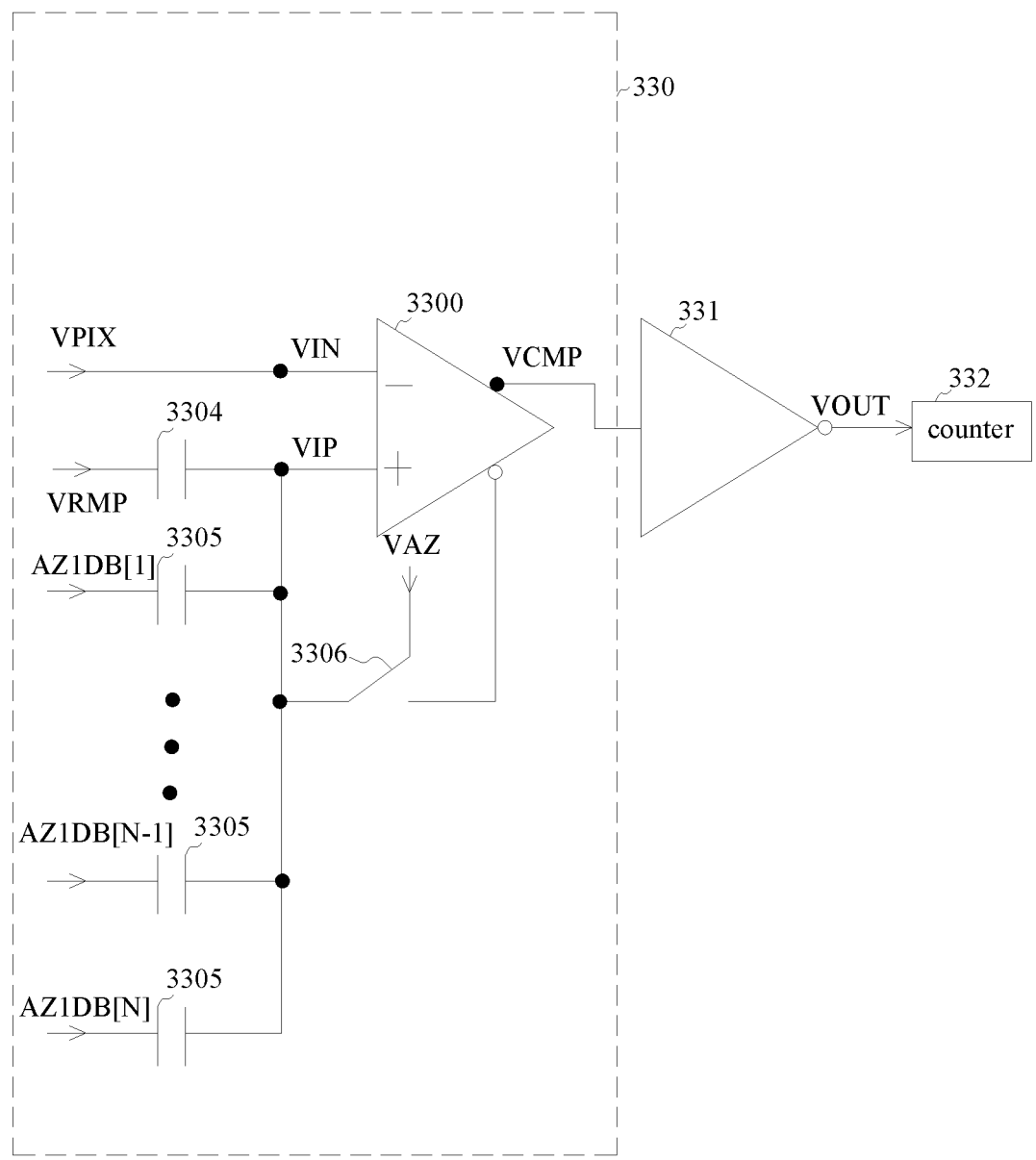
FIG. 23 is a diagram schematically illustrating a comparator circuit coupled to an inverter and a counter according to a twelfth embodiment of the invention.
Figure 24:
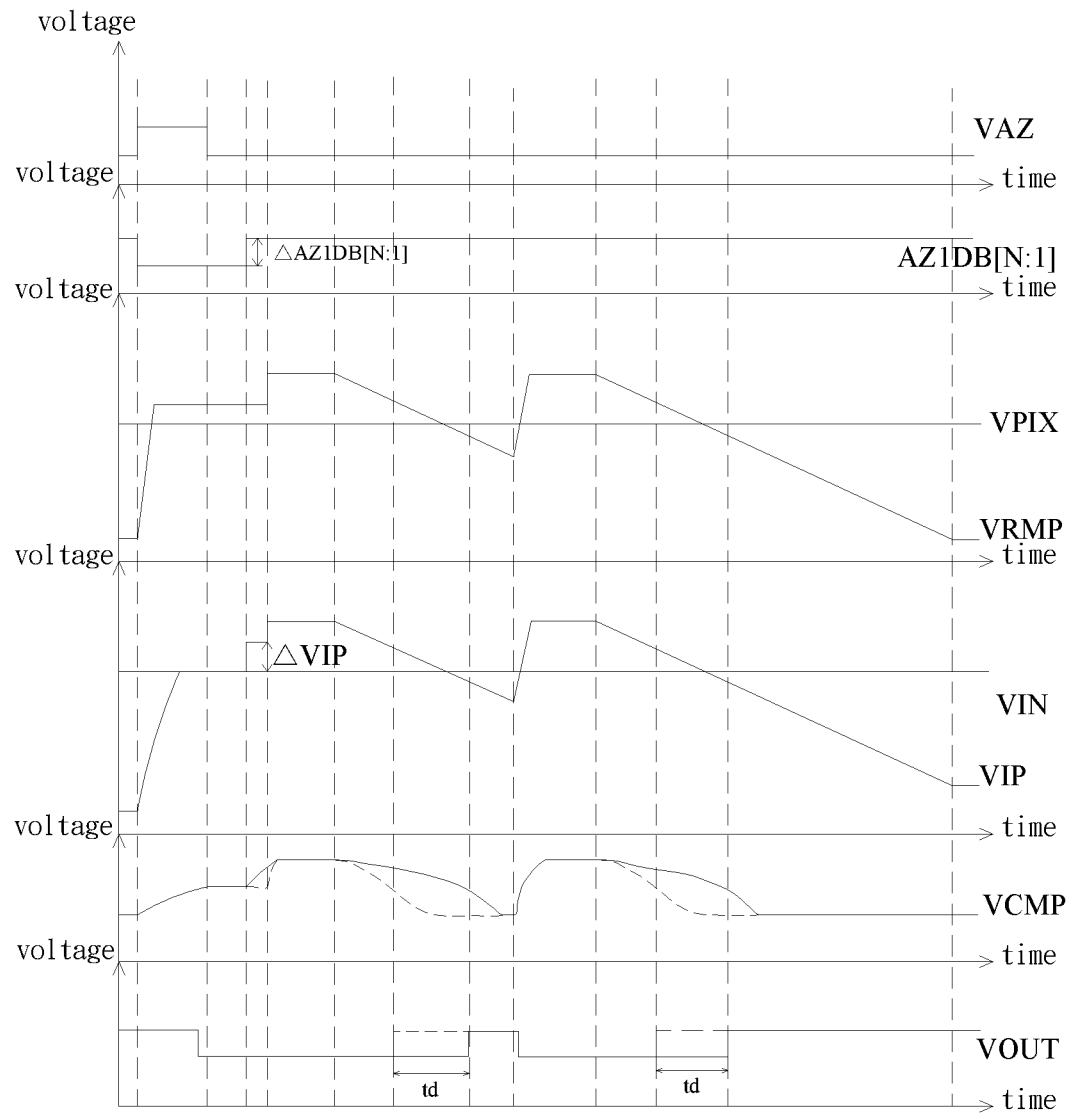
FIG. 24 is a diagram schematically illustrating the waveforms of the auto-zero control signal, the first control signals, the pixel signal, the reference signal, the input voltages of the amplifier, the comparison signal, and the output signal corresponding to FIG. 23.

FIG. 23 is a diagram schematically illustrating a comparator circuit coupled to an inverter and a counter according to a twelfth embodiment of the invention. FIG. 24 is a diagram schematically illustrating the waveforms of the auto-zero control signal, the first control signals, the pixel signal, the reference signal, the input voltages of the amplifier, the comparison signal, and the output signal corresponding to FIG. 23. Referring to FIG. 23 and FIG. 24, the twelfth embodiment of the comparator circuit 330 is introduced as follows. Compared to the eighth embodiment of the comparator circuit 330, the twelfth embodiment of the comparator circuit 330 exemplifies a plurality of control capacitors 3305. The second ends of the control capacitors 3305 are respectively coupled to the respective control signals AZ1DB[1]~AZ1DB[N]. The number of the control capacitors 3305 is greater than or equal to the number of the groups of the comparator circuit 330. If the number of the groups of the comparator circuit 330 is equal to two, the number of the control capacitors 3305 is greater than or equal to two, and two of the control capacitors 3305 are respectively selected to receive the respective control signals AZ1DB[1] and AZ1DB[2] and the remains of the control capacitors 3305 are electrically floating. The other technical features of FIG. 23 have been described previously so it will not be reiterated.

As illustrated in FIG. 24, AZ1DB[N:1] includes the respective control signals AZ1DB[1]~AZ1DB[N]. The input voltages VIN and VIP respectively follow the voltage levels of the pixel signal VPIX and the ramp signal VRMP. Each of the respective control signals AZ1DB[1]~AZ1DB[N] is different from the auto-zero control signal VAZ. Specifically, the active period of each of the respective control signals AZ1DB[1]~AZ1DB[N] may be larger than the active period of the auto-zero control signal VAZ. The leading edge of each of the respective control signals AZ1DB[1]~AZ1DB[N] is at the same time as the leading edge of the auto-zero control signal VAZ. The trailing edge of each of the respective control signals AZ1DB[1]~AZ1DB[N] is later than the trailing edge of the auto-zero control signal VAZ. When the voltage level of the auto-zero control signal VAZ rises from a logic low level to a logic high level, the auto-zero switch 3306 is turned on to couple the first input node of the amplifier 3300 to the first output node of the amplifier 3300, such that the input voltage VIN is equal to the input voltage VIP. Simultaneously, the voltage level of each of the respective control signals AZ1DB[1]~AZ1DB[N] descends from a logic high level to a logic low level. When the voltage level of the auto-zero control signal VAZ rises from the logic low level to the logic high level, the auto-zero switch 3306 is turned off to decouple the first input node of the amplifier 3300 to the first output node of the amplifier 3300. Afterwards, the voltage level of each of the respective control signals AZ1DB[1]~AZ1DB[N] rises from the logic low level to the logic high level. For example, the voltage levels of the respective control signals AZ1DB[1]~AZ1DB[N] are respectively increased by $\Delta AZ1DB[1]\sim\Delta AZ1DB[N]$. $\Delta AZ1DB[N:1]$ includes $\Delta AZ1DB[1]\sim\Delta AZ1DB[N]$. When the voltage levels of the respective control signals AZ1DB[1]~AZ1DB[N] are respectively decreased by $\Delta AZ1DB[1]\sim\Delta AZ1DB[N]$, the voltage level of the input voltage VIP is increased by $\Delta VIP$, thereby changing the transition time points of voltages of the comparison signal VCMP and the output signal VOUT. The comparator circuits 330 are divided into a plurality of groups. Based on the foregoing mechanism, the voltage level transition of each of the respective control signals AZ1DB[1]~AZ1DB[N] causes the transition time points of the comparison signal VCMP and the output signal VOUT change. The transition time points of the comparison signal VCMP and the output signal VOUT depend on the input capacitor 3304, the control capacitors 3305, the respective control signals AZ1DB[1]~AZ1DB[N], and the ramp signal VRMP as the reference signal. The transition time points corresponding to the groups are respectively set and partially or completely occurring at different times, thereby reducing the peak current and the IR drop. Compared to the comparison signal VCMP in FIG. 3 (which is also depicted in FIG. 24 by the dashed waveform), the comparison signal VCMP (depicted in solid waveform) in FIG. 24 changes due to the voltage difference $\Delta VIP$ and results in that the transition time point of the output signal VOUT is delayed by the time delay td. Specifically, $\Delta VIP$ and td are respectively represented by equations (9) and (10).

$$\Delta VIP = \frac{\sum_{i=1}^{N} C_{OSP}[i] \Delta AZ1DB[i]}{\sum_{i=1}^{N} C_{OSP}[i] + C_{INP}} \quad (9)$$

-continued $$td = \frac{\sum_{i=1}^{N} C_{OSP}[i] \Delta AZ1DB[i]}{\sum_{i=1}^{N} C_{OSP}[i] + C_{INP}} \frac{dt}{dV_{VRMP}} \quad (10)$$

Figure 25:
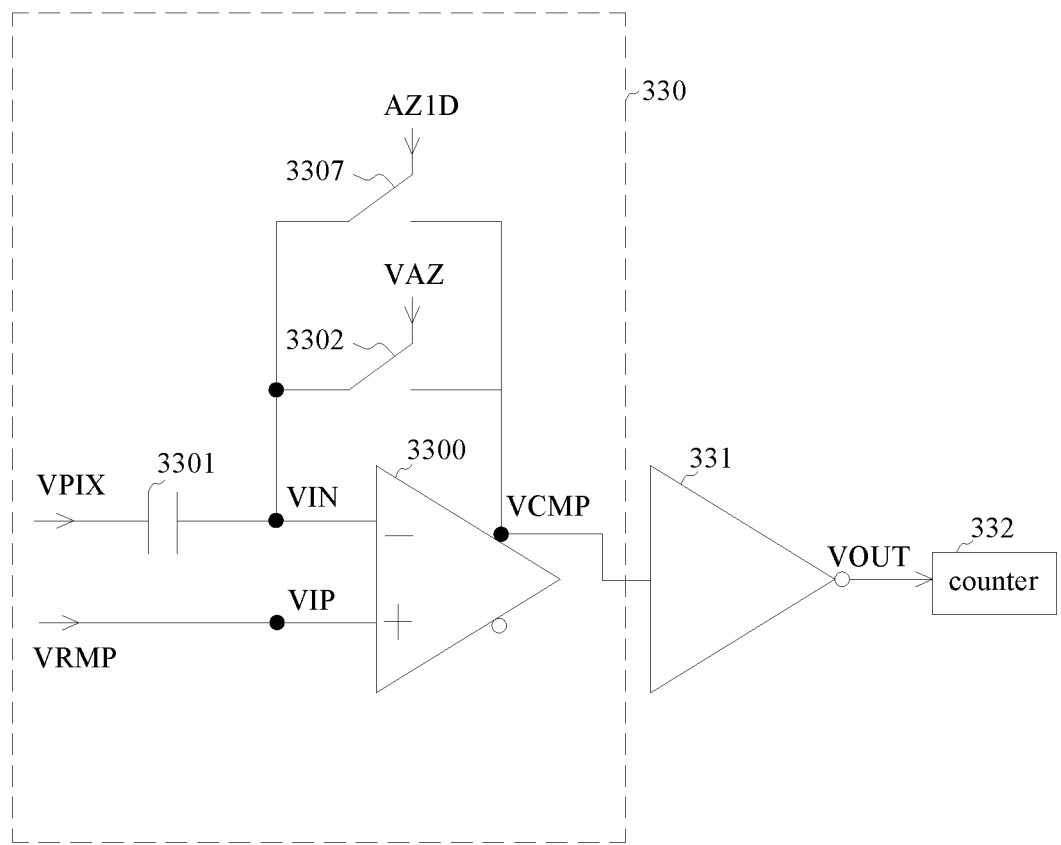
FIG. 25 is a diagram schematically illustrating a comparator circuit coupled to an inverter and a counter according to a thirteenth embodiment of the invention.
Figure 26:
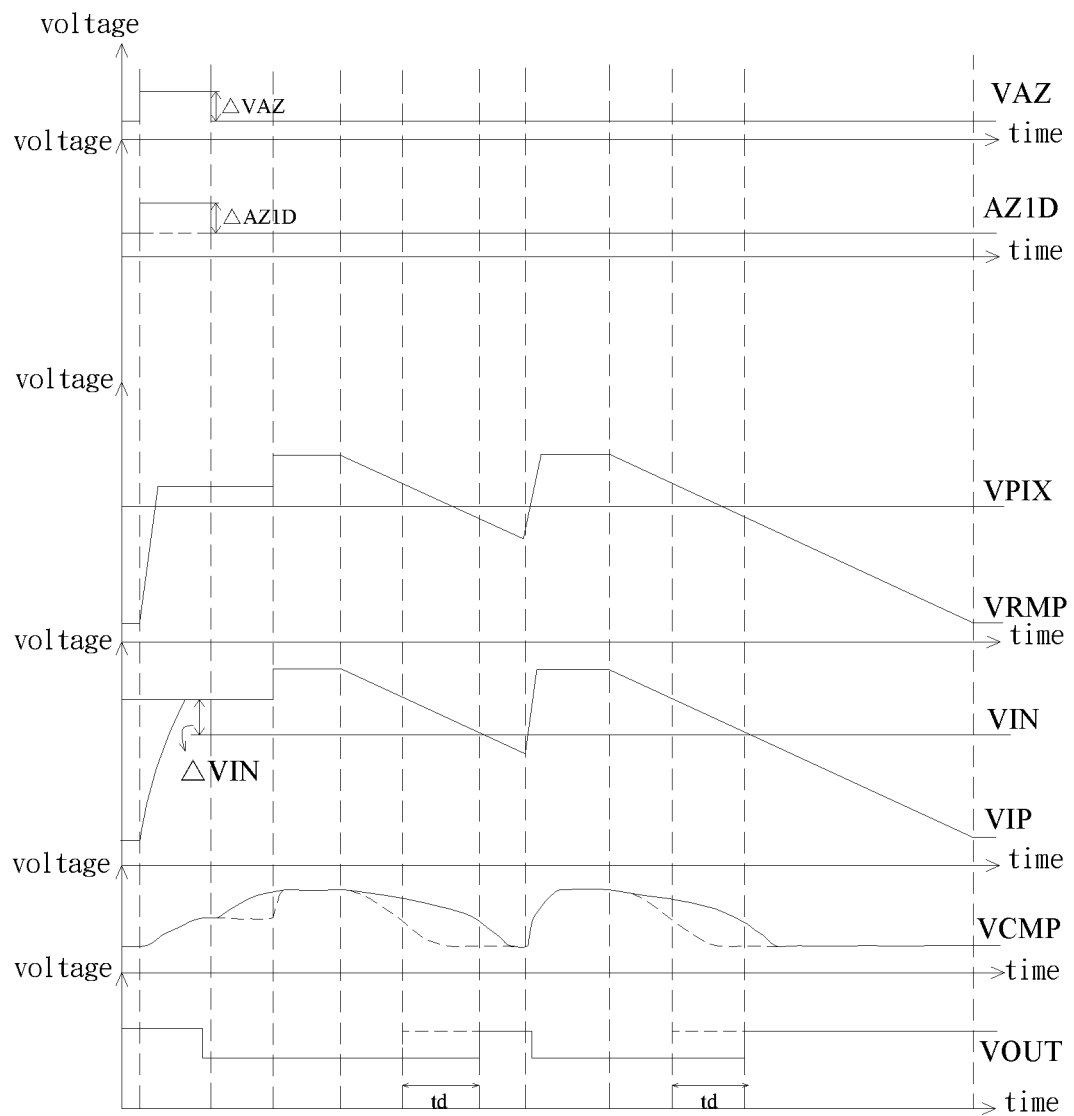
FIG. 26 is a diagram schematically illustrating the waveforms of the auto-zero control signal, the first control signal, the pixel signal, the reference signal, the input voltages of the amplifier, the comparison signal, and the output signal corresponding to FIG. 25.

FIG. 25 is a diagram schematically illustrating a comparator circuit coupled to an inverter and a counter according to a thirteenth embodiment of the invention. FIG. 26 is a diagram schematically illustrating the waveforms of the auto-zero control signal, the first control signal, the pixel signal, the reference signal, the input voltages of the amplifier, the comparison signal, and the output signal corresponding to FIG. 25. Referring to FIG. 25 and FIG. 26, the thirteenth embodiment of the comparator circuit 330 is introduced as follows. The comparator circuit 330 includes an amplifier 3300, an input capacitor 3301 named as a first input capacitor, an auto-zero switch 3302 named as a first auto-zero switch, and at least one control switch 3307 named as a first control switch. For clarity and convenience, the thirteenth embodiment exemplifies one control switch 3307. The control switch 3307 may be, but not limited to, a metal-oxide-semiconductor field-effect transistor (MOSFET) or a suitable transistor. The amplifier 3300 has a first input node, a second input node, a first output node, and a second output node. In the thirteenth embodiment, the first input node, the second input node, the first output node, and the second output node may be respectively a negative input node, a positive input node, a positive output node, and a negative output node. The input capacitor 3301 has a first end and a second end. The first end of the input capacitor 3301 is coupled to the first input node of the amplifier 3300. The auto-zero switch 3302 has a first end, a second end, and a control end. The first end of the auto-zero switch 3302 is coupled to the first input node of the amplifier 3300. The second end of the auto-zero switch 3302 is coupled to the first output node of the amplifier 3300. The control switch 3307 has a first end, a second end, and a control end. The first end of the control switch 3307 is coupled to the first input node of the amplifier 3300. The second end of the control switch 3307 is coupled to the first output node of the amplifier 3300.

In order to effectively read the pixel signals VPIX, the image readout device may further include a plurality of inverters 331 and a plurality of counters 332. The inverters 331 are respectively coupled to the first output nodes of the amplifiers 3300 of the comparator circuits 330. The counters 332 are respectively coupled to the inverters 331.

The operation of the thirteenth embodiment of the comparator circuit 330 is introduced as follows. The first input node and the second input node of the amplifier 3300 respectively receive a pixel signal VPIX from the image sensor array and a reference signal. The reference signal may be, but not limited to, a ramp signal VRMP. The amplifier 3300 compares the pixel signal VPIX to the ramp signal VRMP to generate a comparison signal VCMP from the first output node. The second end of the input capacitor 3301 is coupled to the pixel signal VPIX or the reference signal. In the thirteenth embodiment, the second end of the input capacitor 3301 is coupled to the pixel signal VPIX. The control end of the auto-zero switch 3302 is coupled to an auto-zero control signal VAZ. The auto-zero control signal VAZ is configured to couple or decouple the first input node of the amplifier 3300 to the first output node of the amplifier 3300. The control end of the control switch 3307 is coupled to a respective control signal AZ1D named as a respective first control signal. In addition, the input voltage of the negative input node of the amplifier 3300 is represented with VIN. The input voltage of the positive input node of the amplifier 3300 is represented with VIP. The inverters 331 convert the comparison signals VCMP generated from the comparator circuits 330 into a plurality of output signals VOUT which transition between a high level and a low level based on a predetermined voltage level. Each counter 332 counts one of the output signals VOUT to generate a digital counting value corresponding to the pixel signal VPIX.

As illustrated in FIG. 26, the input voltages VIN and VIP respectively follow the voltage levels of the pixel signal VPIX and the ramp signal VRMP. The respective control signal AZ1D is identical to the auto-zero control signal VAZ. When the voltage level of the auto-zero control signal VAZ rises from a logic low level to a logic high level, the auto-zero switch 3302 is turned on to couple the first input node of the amplifier 3300 to the first output node of the amplifier 3300, such that the input voltage VIN is equal to the input voltage VIP. Simultaneously, the voltage level of the respective control signal AZ1D rises from a logic low level to a logic high level. When the voltage level of the auto-zero control signal VAZ descends from the logic high level to the logic low level, the auto-zero switch 3302 is turned off to decouple the first input node of the amplifier 3300 to the first output node of the amplifier 3300. Simultaneously, the voltage level of the respective control signal AZ1D descends from the logic high level to the logic low level. For example, the voltage levels of the respective control signal AZ1D and the auto-zero control signal VAZ are respectively decreased by ΔAZ1D and ΔVAZ. When the voltage levels of the respective control signal AZ1D and the auto-zero control signal VAZ are respectively decreased by ΔAZ1D and ΔVAZ, the voltage level of the input voltage VIN is decreased by ΔVIN, thereby changing the transition time points of voltages of the comparison signal VCMP and the output signal VOUT. Assume that the auto-zero switch 3302 and the control switch 3307 are implemented with NMOSFETs. The source and the drain of the NMOSFET are respectively coupled to the first input node and the first output node of the amplifier 3300. The gate of the NMOSFET receives the respective control signal AZ1D or the auto-zero control signal VAZ. In other words, ΔVIN is caused by ΔAZ1D, ΔVAZ, and the parasitic gate-source capacitances of the NMOSFETs. The comparator circuits 330 are divided into a plurality of groups. Based on the foregoing mechanism, the voltage level transition of the respective control signal AZ1D causes the transition time points of the comparison signal VCMP and the output signal VOUT change. The transition time points of the comparison signal VCMP and the output signal VOUT depend on the input capacitor 3301, the parasitic gate-source capacitances, the respective control signal AZ1D, the auto-zero control signal VAZ, and the ramp signal VRMP as the reference signal. The transition time points corresponding to the groups are respectively set and partially or completely occurring at different times, thereby reducing the peak current and the IR drop. Compared to the comparison signal VCMP in FIG. 3 (which is also depicted in FIG. 26 by the dashed waveform), the comparison signal VCMP (depicted in solid waveform) in FIG. 27 changes due to the voltage difference ΔVIN and results in that the transition time point of the output signal VOUT is delayed by the time delay td. Specifically, ΔVIN and td are respectively represented by equations (11) and (12).

$$\Delta VIN = \frac{C_{GSN}\Delta VAZ + C_{gsN}\Delta AZ1D}{C_{GSN} + C_{gsN} + C_{INN}} \quad (11)$$

$$td = \frac{C_{GSN}\Delta VAZ + C_{gsN}\Delta AZ1D}{C_{GSN} + C_{gsN} + C_{INN}} \frac{dt}{dV_{VRMP}} \quad (12)$$

$C_{OSN}$ represents the parasitic gate-source capacitance of the auto-zero switch 3302. $C_{gsN}$ represents the parasitic gate-source capacitance of the control switch 3307.

Figure 27:
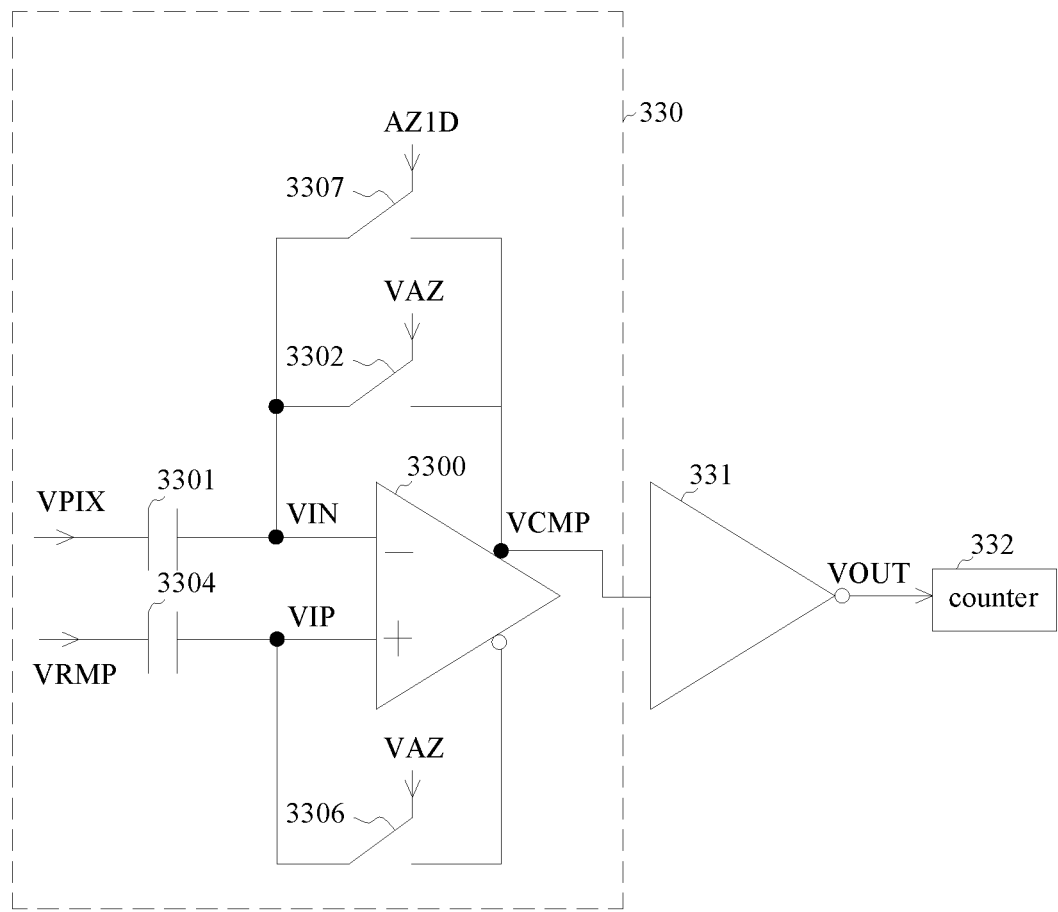
FIG. 27 is a diagram schematically illustrating a comparator circuit coupled to an inverter and a counter according to a fourteenth embodiment of the invention.
Figure 28:
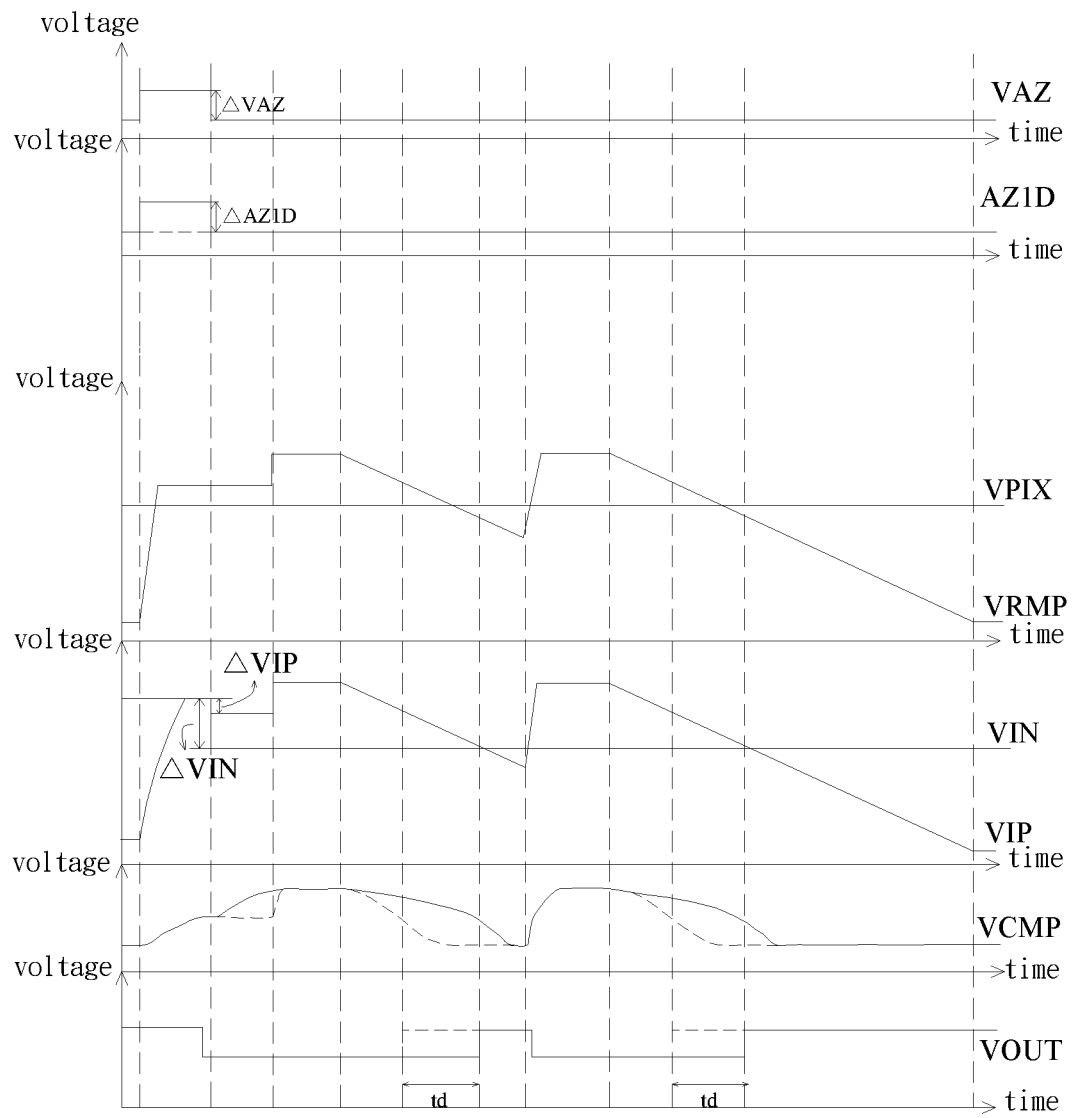
FIG. 28 is a diagram schematically illustrating the waveforms of the auto-zero control signal, the first control signal, the pixel signal, the reference signal, the input voltages of the amplifier, the comparison signal, and the output signal corresponding to FIG. 27.

FIG. 27 is a diagram schematically illustrating a comparator circuit coupled to an inverter and a counter according to a fourteenth embodiment of the invention. FIG. 28 is a diagram schematically illustrating the waveforms of the auto-zero control signal, the first control signal, the pixel signal, the reference signal, the input voltages of the amplifier, the comparison signal, and the output signal corresponding to FIG. 27. Referring to FIG. 25 and FIG. 27, the fourteenth embodiment of the comparator circuit 330 is introduced as follows. Compared to the thirteenth embodiment of the comparator circuit 330, the fourteenth embodiment of the comparator circuit 330 further includes an input capacitor 3304 named as a second input capacitor and an auto-zero switch 3306 named as a second auto-zero switch. The input capacitor 3304 has a first end and a second end. The first end of the input capacitor 3304 is coupled to the second input node of the amplifier 3300. The second end of the input capacitor 3304 is coupled to the reference signal or the pixel signal VPIX. In the fourteenth embodiment, the second end of the input capacitor 3304 is coupled to the reference signal. The auto-zero switch 3306 has a first end, a second end, and a control end. The first end of the auto-zero switch 3306 is coupled to the second input node of the amplifier 3300. The second end of the auto-zero switch 3306 is coupled to the second output node of the amplifier 3300. The control end of the auto-zero switch 3306 is coupled to the auto-zero control signal VAZ which is configured to couple or decouple the second input node of the amplifier 3300 and the second output node of the amplifier 3300.

As illustrated in FIG. 28, the input voltages VIN and VIP respectively follow the voltage levels of the pixel signal VPIX and the ramp signal VRMP. The respective control signal AZ1D is identical to the auto-zero control signal VAZ. When the voltage level of the auto-zero control signal VAZ rises from a logic low level to a logic high level, the auto-zero switch 3302 and the auto-zero switch 3306 are turned on to couple the first input node of the amplifier 3300 to the first output node of the amplifier 3300 and couple the second input node of the amplifier 3300 to the second output node of the amplifier 3300, such that the input voltage VIN is equal to the input voltage VIP. Simultaneously, the voltage level of the respective control signal AZ1D rises from a logic low level to a logic high level. When the voltage level of the auto-zero control signal VAZ descends from the logic high level to the logic low level, the auto-zero switch 3302 and the auto-zero switch 3306 are turned off to decouple the first input node of the amplifier 3300 to the first output node of the amplifier 3300 and decouple the second input node of the amplifier 3300 to the second output node of the amplifier 3300. Simultaneously, the voltage level of the respective control signal AZ1D descends from the logic high level to the logic low level. For example, the voltage levels of the respective control signal AZ1D and the auto-zero control signal VAZ are respectively decreased by $\Delta$AZ1D and $\Delta$VAZ. When the voltage levels of the respective control signal AZ1D and the auto-zero control signal VAZ are respectively decreased by $\Delta$AZ1D and $\Delta$VAZ, the voltage levels of the input voltages VIN and VIP are respectively decreased by $\Delta$VIN and $\Delta$VIP, thereby changing the transition time points of voltages of the comparison signal VCMP and the output signal VOUT. Assume that the auto-zero switch 3302, the auto-zero switch 3306, and the control switch 3307 are implemented with NMOSFETs. The source and the drain of each of the auto-zero switch 3302 and the control switch 3307 are respectively coupled to the first input node and the first output node of the amplifier 3300. The gate of each of the auto-zero switch 3302 and the control switch 3307 receives the respective control signal AZ1D or the auto-zero control signal VAZ. The source and the drain of the auto-zero switch 3306 are respectively coupled to the second input node and the second output node of the amplifier 3300. The gate of the auto-zero switch 3306 receives the auto-zero control signal VAZ. In other words, $\Delta$VIN is caused by $\Delta$AZ1D, $\Delta$VAZ, and the parasitic gate-source capacitances of the auto-zero switch 3302 and the control switch 3307. $\Delta$VIP is caused by $\Delta$VAZ and the parasitic gate-source capacitance of the auto-zero switch 3306. The comparator circuits 330 are divided into a plurality of groups. Based on the foregoing mechanism, the voltage level transition of the respective control signal AZ1D causes the transition time points of the comparison signal VCMP and the output signal VOUT change. The transition time points of the comparison signal VCMP and the output signal VOUT depend on the input capacitors 3301 and 3304, the parasitic gate-source capacitances, the respective control signal AZ1D, the auto-zero control signal VAZ, and the ramp signal VRMP as the reference signal. The transition time points corresponding to the groups are respectively set and partially or completely occurring at different times, thereby reducing the peak current and the IR drop. The transition time point of the output signal VOUT is delayed by the time delay td. Specifically, $\Delta$VIP and td are respectively represented by equations (13) and (14).

$$\Delta VIP = \frac{C_{GSP}\Delta VAZ}{C_{GSP} + C_{INP}} \quad (13)$$

$$td = \left(\frac{C_{GSN}\Delta VAZ + C_{gsN}\Delta AZ1D}{C_{GSN} + C_{gsN} + C_{INN}} - \frac{C_{GSP}\Delta VAZ}{C_{GSP} + C_{INP}}\right)\frac{dt}{dV_{VRMP}} \quad (14)$$

$C_{GSP}$ represents the parasitic gate-source capacitance of the auto-zero switch 3306.

However, when the input capacitor 3304 in FIG. 27 is omitted, the input voltage VIP recovers its original voltage level to cancel $\Delta$VIP, as illustrated in FIG. 26.

Figure 29:
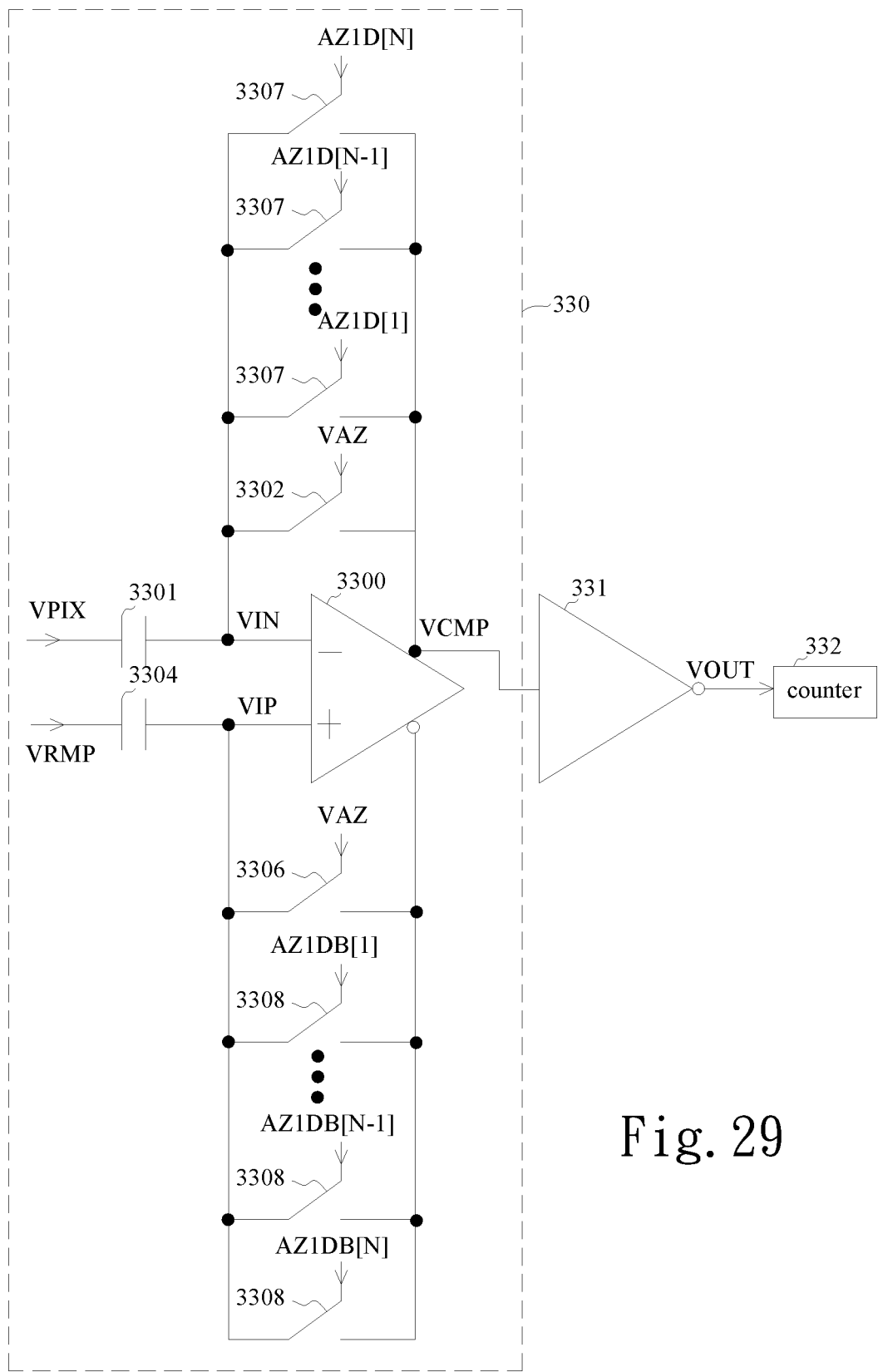
FIG. 29 is a diagram schematically illustrating a comparator circuit coupled to an inverter and a counter according to a fifteenth embodiment of the invention.
Figure 30:
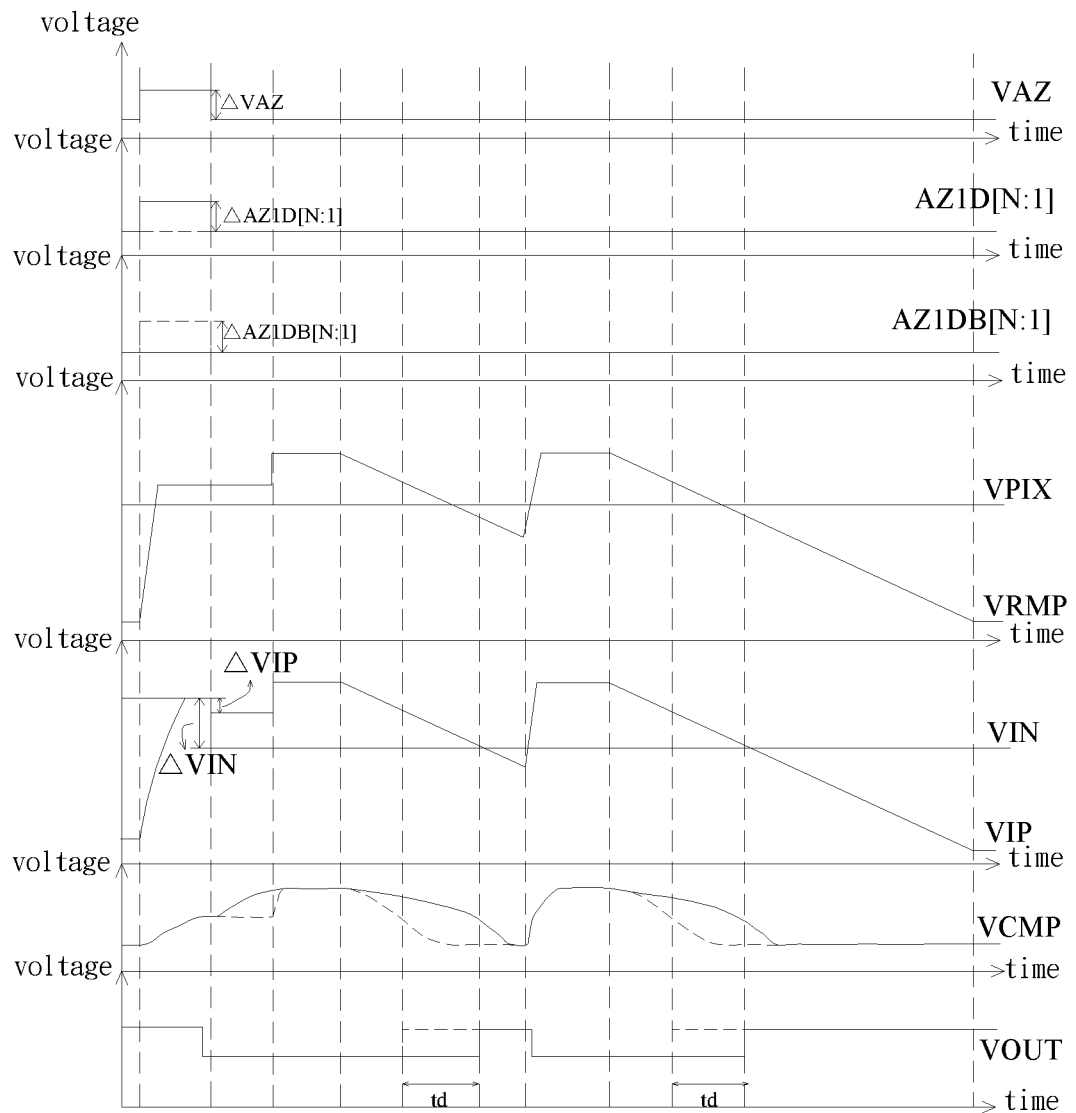
FIG. 30 is a diagram schematically illustrating the waveforms of the auto-zero control signal, the first control signals, the second control signals, the pixel signal, the reference signal, the input voltages of the amplifier, the comparison signal, and the output signal corresponding to FIG. 29.

FIG. 29 is a diagram schematically illustrating a comparator circuit coupled to an inverter and a counter according to a fifteenth embodiment of the invention. FIG. 30 is a diagram schematically illustrating the waveforms of the auto-zero control signal, the first control signals, the second control signals, the pixel signal, the reference signal, the input voltages of the amplifier, the comparison signal, and the output signal corresponding to FIG. 29. Referring to FIG. 29 and FIG. 30, the fifteenth embodiment of the comparator circuit 330 is introduced as follows. Compared to the fourteenth embodiment of the comparator circuit 330, the fifteenth embodiment of the comparator circuit 330 further includes at least one control switch 3308 named as a second control switch.

In addition, the fifteenth embodiment of the comparator circuit 330 exemplifies a plurality of control switches 3307 and a plurality of control switches 3308. Each control switch 3307 has a first end, a second end, and a control end. The first end and the second end of each control switch 3307 are respectively coupled to the first input node and the first output node of the amplifier 3300. The control ends of the control switches 3307 are respectively coupled to respective control signals AZ1D[1]~AZ1D[N] named as respective first control signals. The number of the control switches 3307 is greater than or equal to the number of the groups of the comparator circuit 330. If the number of the groups of the comparator circuit 330 is equal to two, the number of the control switches 3307 is greater than or equal to two, and two of the control switches 3307 are respectively selected to receive the respective control signals AZ1D[1] and AZ1D[2] and the remains of the control switches 3307 are electrically floating. Each control switch 3308 has a first end, a second end, and a control end. The first end and the second end of each control switch 3308 are respectively coupled to the second input node and the second output node of the amplifier 3300. The control ends of the control switches 3308 are respectively coupled to respective control signals AZ1DB[1]~AZ1DB[N] named as respective second control signals. The number of the control switches 3308 is greater than or equal to the number of the groups of the comparator circuit 330. If the number of the groups of the comparator circuit 330 is equal to two, the number of the control switches 3308 is greater than or equal to two, and two of the control switches 3308 are respectively selected to receive the respective control signals AZ1DB[1] and AZ1DB[2] and the remains of the control switches 3308 are electrically floating. The other technical features of FIG. 35 have been described previously so it will not be reiterated.

As illustrated in FIG. 30, AZ1D[N:1] includes the respective control signal AZ1D[1]~AZ1D[N]. AZ1DB[N:1] includes the respective control signal AZ1DB[1]~AZ1DB[N]. The input voltages VIN and VIP respectively follow the voltage levels of the pixel signal VPIX and the ramp signal VRMP. Each of the respective control signals AZ1D[1]~AZ1D[N] is identical to the auto-zero control signal VAZ. The voltage level of each of the respective control signals AZ1DB[1]~AZ1DB[N] is maintained at a logic low level. The voltage difference between the logic low level and the logic high level of each of the respective control signals AZ1DB[1]~AZ1DB[N] is defined as ΔAZ1DB[1], . . . , ΔAZ1DB[N−1], or ΔAZ1DB[N]. ΔAZ1DB[N:1] includes ΔAZ1DB[1]~ΔAZ1DB[N]. When the voltage level of the auto-zero control signal VAZ rises from a logic low level to a logic high level, the auto-zero switch 3302 and the auto-zero switch 3306 are turned on to couple the first input node of the amplifier 3300 to the first output node of the amplifier 3300 and couple the second input node of the amplifier 3300 to the second output node of the amplifier 3300, such that the input voltage VIN is equal to the input voltage VIP. Simultaneously, the voltage level of each of the respective control signals AZ1D[1]~AZ1D[N] rises from a logic low level to a logic high level. When the voltage level of the auto-zero control signal VAZ descends from the logic high level to the logic low level, the auto-zero switch 3302 and the auto-zero switch 3306 are turned off to decouple the first input node of the amplifier 3300 to the first output node of the amplifier 3300 and decouple the second input node of the amplifier 3300 to the second output node of the amplifier 3300. Simultaneously, the voltage level of each of the respective control signals AZ1D[1]~AZ1D[N] descends from the logic high level to the logic low level. For example, the voltage levels of the respective control signals AZ1D[1]~AZ1D[N] are respectively decreased by ΔAZ1D[1]~ΔAZ1D[N]. ΔAZ1D[N:1] includes ΔAZ1D[1]~ΔAZ1D[N]. The voltage level of the auto-zero control signal VAZ is decreased by ΔVAZ. When the voltage levels of the respective control signals AZ1D[1]~AZ1D[N] are respectively decreased by ΔAZ1D[1]~ΔAZ1D[N] and the voltage level of the auto-zero control signal VAZ is decreased by ΔVAZ, the voltage levels of the input voltages VIN and VIP are respectively decreased by ΔVIN and ΔVIP, thereby changing the transition time points of voltages of the comparison signal VCMP and the output signal VOUT. Assume that the auto-zero switch 3302, the auto-zero switch 3306, the control switch 3307, and the control switch 3308 are implemented with NMOSFETs. The source and the drain of each of the auto-zero switch 3302 and the control switch 3307 are respectively coupled to the first input node and the first output node of the amplifier 3300. The gate of each of the auto-zero switch 3302 and the control switch 3307 receives one of the respective control signals AZ1D[1]~AZ1D[N], or the auto-zero control signal VAZ. The source and the drain of each of the auto-zero switch 3306 and the control switch 3308 are respectively coupled to the second input node and the second output node of the amplifier 3300. The gate of each of the auto-zero switch 3306 and the control switch 3308 receives one of the respective control signals AZ1DB[1]~AZ1DB[N] or the auto-zero control signal VAZ.

In other words, ΔVIN is caused by ΔAZ1D[N:1], ΔVAZ, and the parasitic gate-source capacitances of the auto-zero switch 3302 and the control switch 3307. ΔVIP is caused by ΔVAZ and the parasitic gate-source capacitance of the auto-zero switch 3306. ΔVIP will be caused by ΔAZ1DB[N:1] and the gate-source capacitances of the control switches 3308 if the phases of the respective control signals AZ1DB[N:1] are adjusted to be the same to the phases of the respective control signals AZ1D[N:1]. The comparator circuits 330 are divided into a plurality of groups. Based on the foregoing mechanism, the voltage levels of the respective control signals AZ1D[N:1] and AZ1DB[N:1] transition to change the transition time points of the comparison signal VCMP and the output signal VOUT. The transition time points of the comparison signal VCMP and the output signal VOUT depend on the input capacitors 3301 and 3304, the parasitic gate-source capacitances, the respective control signals AZ1D[N:1] and AZ1DB[N:1], the auto-zero control signal VAZ, and the ramp signal VRMP as the reference signal. The transition time points corresponding to the groups are respectively set and partially or completely occurring at different times, thereby reducing the peak current and the IR drop. The dashed waveforms of the comparison signal VCMP and the output signal VOUT are generated when the control switches 3307 and the control switches 3308 do not receive the respective control signals AZ1D[N:1] and AZ1DB[N:1]. The transition time point of the output signal VOUT is delayed by the time delay td. Specifically, ΔVIN, ΔVIP and td are respectively represented by equations (15), (16), and (17).

$$\Delta VIN = \frac{C_{GSN}\Delta VAZ + \sum_{i=1}^{N} C_{gsN}[i]\Delta AZ1D[i]}{C_{GSN} + \sum_{i=1}^{N} C_{gsN}[i] + C_{INN}} \quad (15)$$

$$\Delta VIP = \frac{C_{GSP}\Delta VAZ + \sum_{i=1}^{N} C_{gsP}[i]\Delta AZ1DB[i]}{C_{GSP} + \sum_{i=1}^{N} C_{gsP}[i] + C_{INP}} \quad (16)$$

$$td = \left( \frac{C_{GSN}\Delta VAZ + \sum_{i=1}^{N} C_{gsN}[i]\Delta AZ1D[i]}{C_{GSN} + \sum_{i=1}^{N} C_{gsN}[i] + C_{INN}} - \frac{C_{GSP}\Delta VAZ + \sum_{i=1}^{N} C_{gsP}[i]\Delta AZ1DB[i]}{C_{GSP} + \sum_{i=1}^{N} C_{gsP}[i] + C_{INP}} \right) \frac{dt}{dV_{VRMP}} \quad (17)$$

$C_{gsN}[i]$ represents the parasitic gate-source capacitance of the i-th control switch 3307. $C_{gsP}[i]$ represents the parasitic gate-source capacitance of the i-th control switch 3308.

Figure 31:
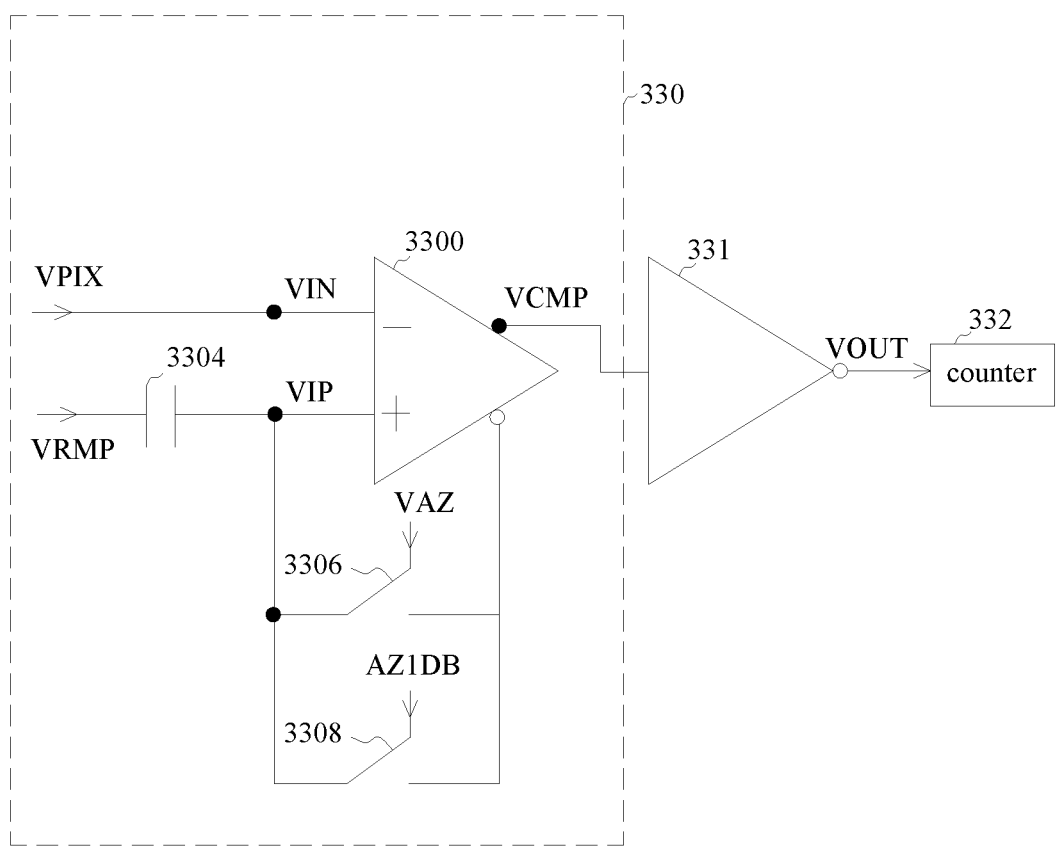
FIG. 31 is a diagram schematically illustrating a comparator circuit coupled to an inverter and a counter according to a sixteenth embodiment of the invention.
Figure 32:
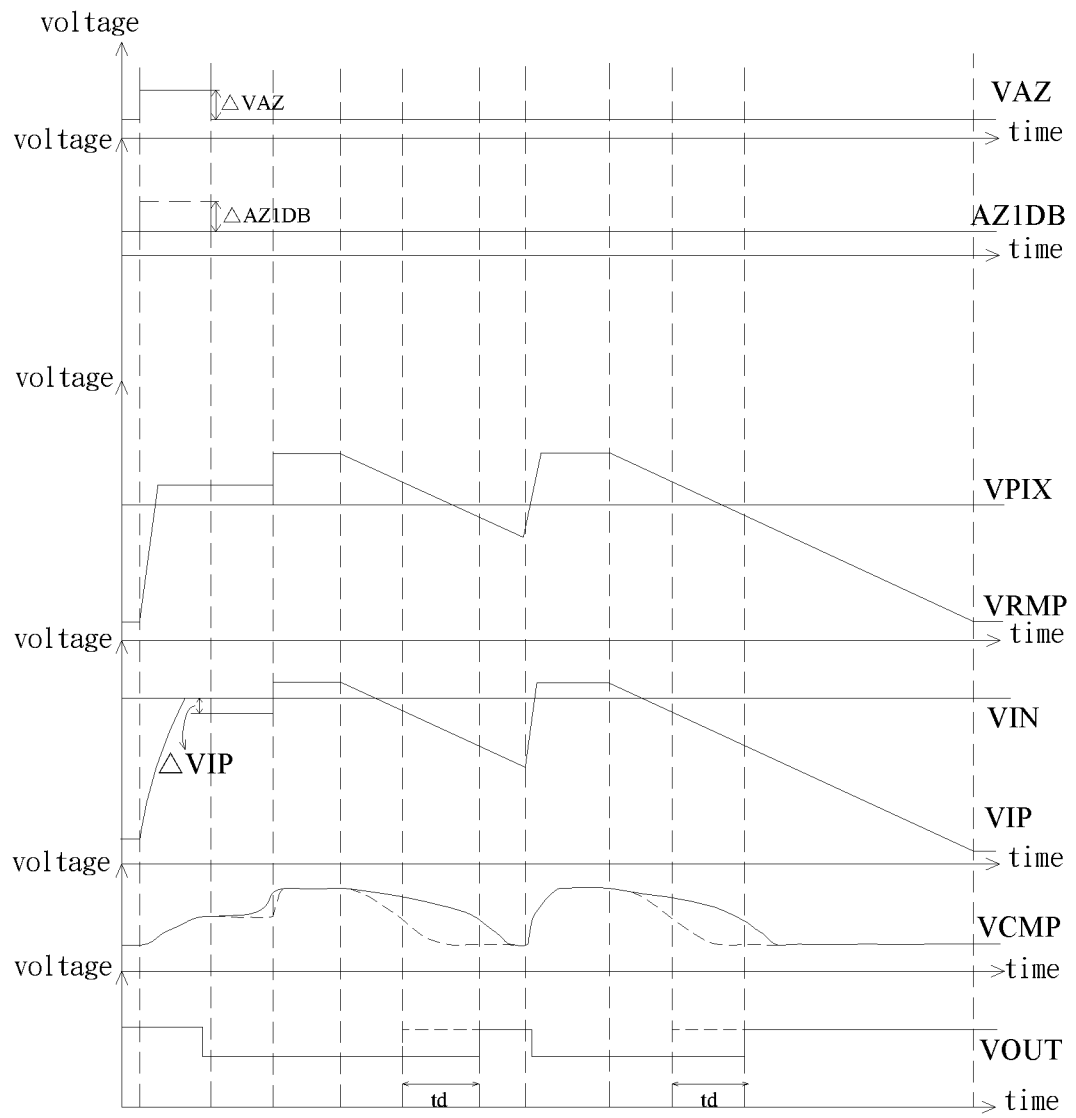
FIG. 32 is a diagram schematically illustrating the waveforms of the auto-zero control signal, the first control signal, the pixel signal, the reference signal, the input voltages of the amplifier, the comparison signal, and the output signal corresponding to FIG. 31.

FIG. 31 is a diagram schematically illustrating a comparator circuit coupled to an inverter and a counter according to a sixteenth embodiment of the invention. FIG. 32 is a diagram schematically illustrating the waveforms of the auto-zero control signal, the first control signal, the pixel signal, the reference signal, the input voltages of the amplifier, the comparison signal, and the output signal corresponding to FIG. 31. Referring to FIG. 31 and FIG. 32, the sixteenth embodiment of the comparator circuit 330 is introduced as follows. The comparator circuit 330 includes an amplifier 3300, an input capacitor 3304 named as a first input capacitor, an auto-zero switch 3306 named as a first auto-zero switch, and at least one control switch 3308 named as a first control switch. For clarity and convenience, the sixteenth embodiment exemplifies one control switch 3308. The control switch 3308 may be, but not limited to, a metal-oxide-semiconductor field-effect transistor (MOSFET) or a suitable transistor. The amplifier 3300 has a first input node, a second input node, a first output node, and a second output node. In the sixteenth embodiment, the first input node, the second input node, the first output node, and the second output node may be respectively a positive input node, a negative input node, a negative output node, and a positive output node. The input capacitor 3304 has a first end and a second end. The first end of the input capacitor 3304 is coupled to the first input node of the amplifier 3300. The auto-zero switch 3306 has a first end, a second end, and a control end. The first end of the auto-zero switch 3306 is coupled to the first input node of the amplifier 3300. The second end of the auto-zero switch 3306 is coupled to the first output node of the amplifier 3300. The control switch 3308 has a first end, a second end, and a control end. The first end of the control switch 3308 is coupled to the first input node of the amplifier 3300. The second end of the control switch 3308 is coupled to the first output node of the amplifier 3300.

In order to effectively read the pixel signals VPIX, the image readout device may further include a plurality of inverters 331 and a plurality of counters 332. The inverters 331 are respectively coupled to the second output nodes of the amplifiers 3300 of the comparator circuits 330. The counters 332 are respectively coupled to the inverters 331.

The operation of the sixteenth embodiment of the comparator circuit 330 is introduced as follows. The second input node and the first input node of the amplifier 3300 respectively receive a pixel signal VPIX from the image sensor array and a reference signal. The reference signal may be, but not limited to, a ramp signal VRMP. The amplifier 3300 compares the pixel signal VPIX to the ramp signal VRMP to generate a comparison signal VCMP from the second output node. The second end of the input capacitor 3304 is coupled to the pixel signal VPIX or the reference signal. In the sixteenth embodiment, the second end of the input capacitor 3304 is coupled to the ramp signal VRMP. The control end of the auto-zero switch 3306 is coupled to an auto-zero control signal VAZ. The auto-zero control signal VAZ is configured to couple or decouple the first input node of the amplifier 3300 to the first output node of the amplifier 3300. The control end of the control switch 3308 is coupled to a respective control signal AZ1DB named as a respective first control signal. In addition, the input voltage of the negative input node of the amplifier 3300 is represented with VIN. The input voltage of the positive input node of the amplifier 3300 is represented with VIP. The inverters 331 convert the comparison signals VCMP generated from the comparator circuits 330 into a plurality of output signals VOUT which transition between a high level and a low level based on a predetermined voltage level. Each counter 332 counts one of the output signals VOUT to generate a digital counting value corresponding to the pixel signal VPIX.

As illustrated in FIG. 32, the input voltages VIN and VIP respectively follow the voltage levels of the pixel signal VPIX and the ramp signal VRMP. The voltage level of the respective control signal AZ1DB is maintained at a logic low level. The voltage difference between the logic low level and the logic high level of the respective control signal AZ1DB is defined as $\Delta AZ1DB$. When the voltage level of the auto-zero control signal VAZ rises from a logic low level to a logic high level, the auto-zero switch 3306 is turned on to couple the first input node of the amplifier 3300 to the first output node of the amplifier 3300, such that the input voltage VIN is equal to the input voltage VIP. When the voltage level of the auto-zero control signal VAZ descends from the logic high level to the logic low level, the auto-zero switch 3306 is turned off to decouple the first input node of the amplifier 3300 to the first output node of the amplifier 3300. For example, the auto-zero control signal VAZ is decreased by $\Delta VAZ$. When the voltage level of the auto-zero control signal VAZ is decreased by $\Delta VAZ$, the voltage level of the input voltage VIP is decreased by $\Delta VIP$, thereby changing the transition time points of voltages of the comparison signal VCMP and the output signal VOUT. Assume that the auto-zero switch 3306 and the control switch 3308 are implemented with NMOSFETs. The source and the drain of the NMOSFET are respectively coupled to the first input node and the first output node of the amplifier 3300. The gate of the NMOSFET receives the respective control signal AZ1DB or the auto-zero control signal VAZ. In other words, ΔVIP is caused by ΔVAZ and the parasitic gate-source capacitances of the auto-zero switch 3306. ΔVIP will be caused by ΔAZ1DB and the gate-source capacitance of the control switch 3308 if the phase of the respective control signal AZ1DB is adjusted to be the same to the phase of the auto-zero control signal VAZ. The comparator circuits 330 are divided into a plurality of groups. Based on the foregoing mechanism, the voltage level transition of the respective control signal AZ1DB causes the transition time points of the comparison signal VCMP and the output signal VOUT change. The transition time points of the comparison signal VCMP and the output signal VOUT depend on the input capacitor 3304, the parasitic gate-source capacitances, the respective control signal AZ1DB, the auto-zero control signal VAZ, and the ramp signal VRMP as the reference signal. The transition time points corresponding to the groups are respectively set and partially or completely occurring at different times, thereby reducing the peak current and the IR drop. The transition time point of the output signal VOUT is delayed by the time delay td. Specifically, ΔVIP and td are respectively represented by equations (18) and (19).

$$\Delta VIP = \frac{C_{GSP}\Delta VAZ + C_{gsP}\Delta AZ1DB}{C_{GSP} + C_{gsP} + C_{INP}} \quad (18)$$

$$td = -\frac{C_{GSP}\Delta VAZ + C_{gsP}\Delta AZ1DB}{C_{GSP} + C_{gsP} + C_{INP}} \frac{dt}{dV_{VRMP}} \quad (19)$$

$C_{GSP}$ represents the parasitic gate-source capacitance of the auto-zero switch 3306. $C_{gsP}$ represents the parasitic gate-source capacitance of the control switch 3308.

Figure 33:
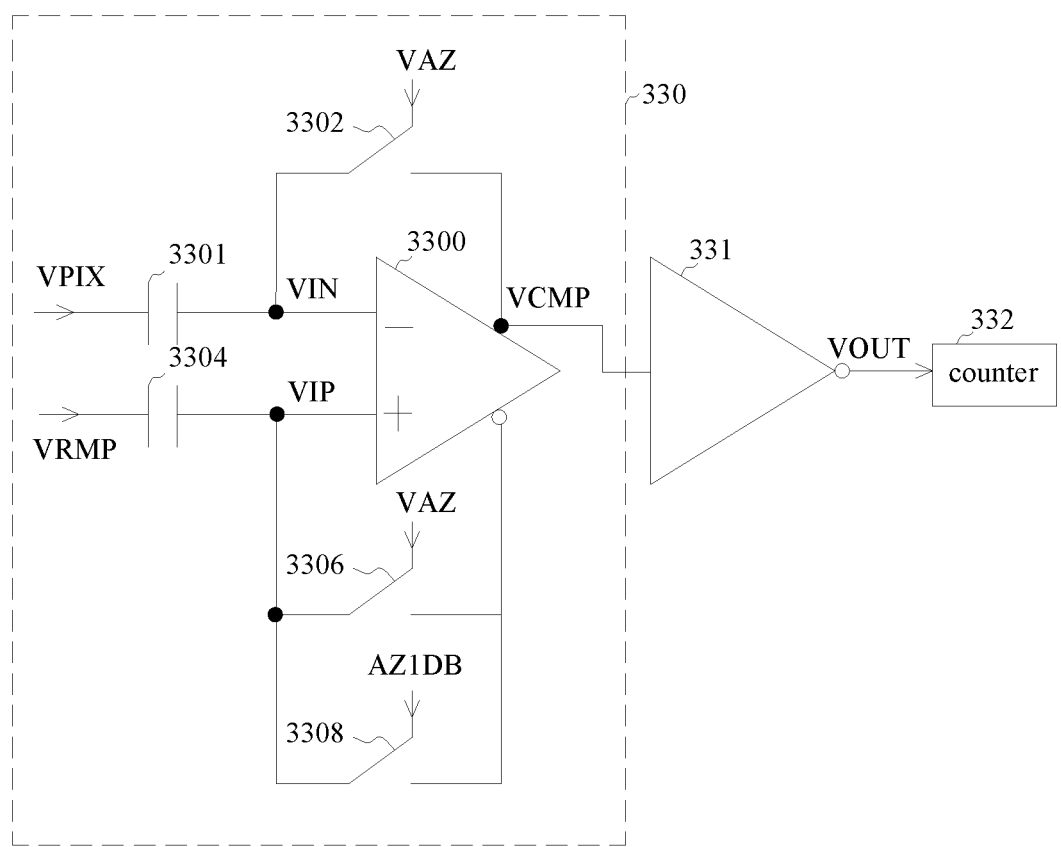
FIG. 33 is a diagram schematically illustrating a comparator circuit coupled to an inverter and a counter according to a seventeenth embodiment of the invention.
Figure 34:
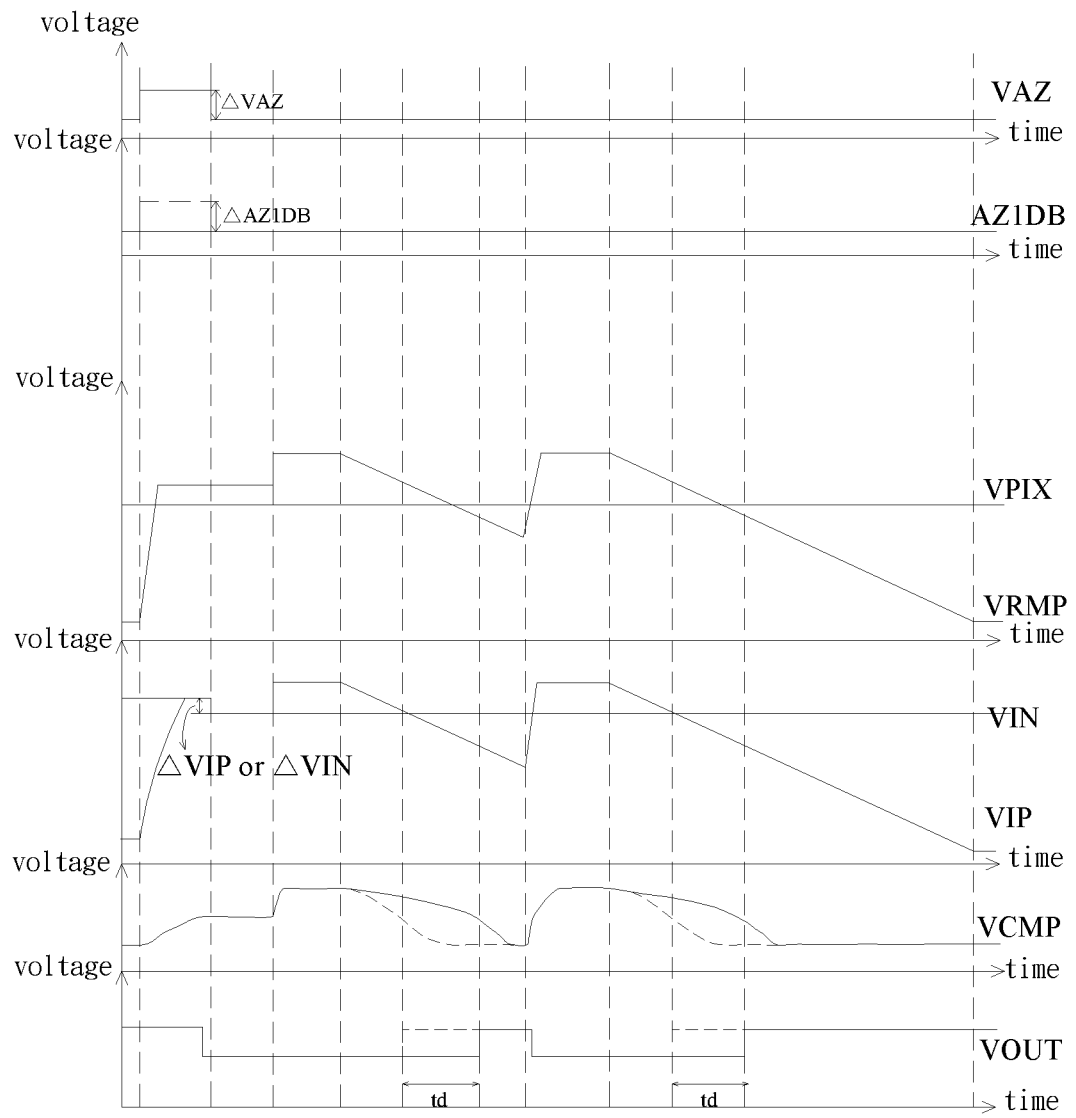
FIG. 34 is a diagram schematically illustrating the waveforms of the auto-zero control signal, the first control signal, the pixel signal, the reference signal, the input voltages of the amplifier, the comparison signal, and the output signal corresponding to FIG. 33.

FIG. 33 is a diagram schematically illustrating a comparator circuit coupled to an inverter and a counter according to a seventeenth embodiment of the invention. FIG. 34 is a diagram schematically illustrating the waveforms of the auto-zero control signal, the first control signal, the pixel signal, the reference signal, the input voltages of the amplifier, the comparison signal, and the output signal corresponding to FIG. 33. Referring to FIG. 33 and FIG. 34, the seventeenth embodiment of the comparator circuit 330 is introduced as follows. Compared to the sixteenth embodiment of the comparator circuit 330, the seventeenth embodiment of the comparator circuit 330 further includes an input capacitor 3301 named as a second input capacitor and an auto-zero switch 3302 named as a second auto-zero switch. The input capacitor 3301 has a first end and a second end. The first end of the input capacitor 3301 is coupled to the second input node of the amplifier 3300. The second end of the input capacitor 3301 is coupled to the reference signal or the pixel signal VPIX. In the seventeenth embodiment, the second end of the input capacitor 3301 is coupled to the pixel signal VPIX. The auto-zero switch 3302 has a first end, a second end, and a control end. The first end of the auto-zero switch 3302 is coupled to the second input node of the amplifier 3300. The second end of the auto-zero switch 3302 is coupled to the second output node of the amplifier 3300. The control end of the auto-zero switch 3302 is coupled to the auto-zero control signal VAZ which is configured to couple or decouple the second input node of the amplifier 3300 and the second output node of the amplifier 3300.

As illustrated in FIG. 34, the input voltages VIN and VIP respectively follow the voltage levels of the pixel signal VPIX and the ramp signal VRMP. The voltage level of the respective control signal AZ1DB is maintained at a logic low level. The voltage difference between the logic low level and the logic high level of the respective control signal AZ1DB is defined as ΔAZ1DB. When the voltage level of the auto-zero control signal VAZ rises from a logic low level to a logic high level, the auto-zero switch 3302 and the auto-zero switch 3306 are turned on to couple the first input node of the amplifier 3300 to the first output node of the amplifier 3300 and couple the second input node of the amplifier 3300 to the second output node of the amplifier 3300, such that the input voltage VIN is equal to the input voltage VIP. When the voltage level of the auto-zero control signal VAZ descends from the logic high level to the logic low level, the auto-zero switch 3302 and the auto-zero switch 3306 are turned off to decouple the first input node of the amplifier 3300 to the first output node of the amplifier 3300 and decouple the second input node of the amplifier 3300 to the second output node of the amplifier 3300. For example, the voltage level of the auto-zero control signal VAZ is decreased by ΔVAZ. When the voltage level of the auto-zero control signal VAZ is decreased by ΔVAZ, the voltage levels of the input voltages VIN and VIP are respectively decreased by ΔVIN and ΔVIP, thereby changing the transition time points of voltages of the comparison signal VCMP and the output signal VOUT. Assume that the auto-zero switch 3302, the auto-zero switch 3306, and the control switch 3308 are implemented with NMOSFETs. The source and the drain of each of the auto-zero switch 3306 and the control switch 3308 are respectively coupled to the first input node and the first output node of the amplifier 3300. The gate of each of the auto-zero switch 3306 and the control switch 3308 receives the respective control signal AZ1DB and the auto-zero control signal VAZ. The source and the drain of the auto-zero switch 3302 are respectively coupled to the second input node and the second output node of the amplifier 3300. The gate of the auto-zero switch 3302 receives the auto-zero control signal VAZ. In other words, ΔVIP is caused by ΔVAZ and the parasitic gate-source capacitances of the auto-zero switch 3306. ΔVIN is caused by ΔVAZ and the parasitic gate-source capacitance of the auto-zero switch 3302. ΔVIP will be caused by ΔAZ1DB and the gate-source capacitance of the control switch 3308 if the phase of the respective control signals AZ1DB is adjusted to be the same to the phase of the auto-zero control signal VAZ. The comparator circuits 330 are divided into a plurality of groups. Based on the foregoing mechanism, the voltage level transition of the respective control signal AZ1DB causes the transition time points of the comparison signal VCMP and the output signal VOUT change. The transition time points of the comparison signal VCMP and the output signal VOUT depend on the input capacitors 3301 and 3304, the parasitic gate-source capacitances, the respective control signal AZ1DB, the auto-zero control signal VAZ, and the ramp signal VRMP as the reference signal. The transition time points corresponding to the groups are respectively set and partially or completely occurring at different times, thereby reducing the peak current and the IR drop. The dashed waveforms of the comparison signal VCMP and the output signal VOUT are generated when the control switch 3308 does not receive the respective control signal AZ1DB. The transition time point of the output signal VOUT is delayed by the time delay td. Specifically, ΔVIN and td are respectively represented by equations (20) and (21).

$$\Delta VIN = \frac{C_{GSN}\Delta VAZ}{C_{GSN}+C_{INN}} \quad (20)$$

$$td = \left(\frac{C_{GSN}\Delta VAZ}{C_{GSN}+C_{INN}} - \frac{C_{GSP}\Delta VAZ + C_{gsP}\Delta AZ1DB}{C_{GSP}+C_{gsP}+C_{INP}}\right)\frac{dt}{dV_{VRMP}} \quad (21)$$

$C_{GSN}$ represents the parasitic gate-source capacitance of the auto-zero switch 3302.

However, when the input capacitor 3301 in FIG. 33 is omitted, the input voltage VIN recovers its original voltage level to cancel ΔVIN, as illustrated in FIG. 32.

Figure 35:
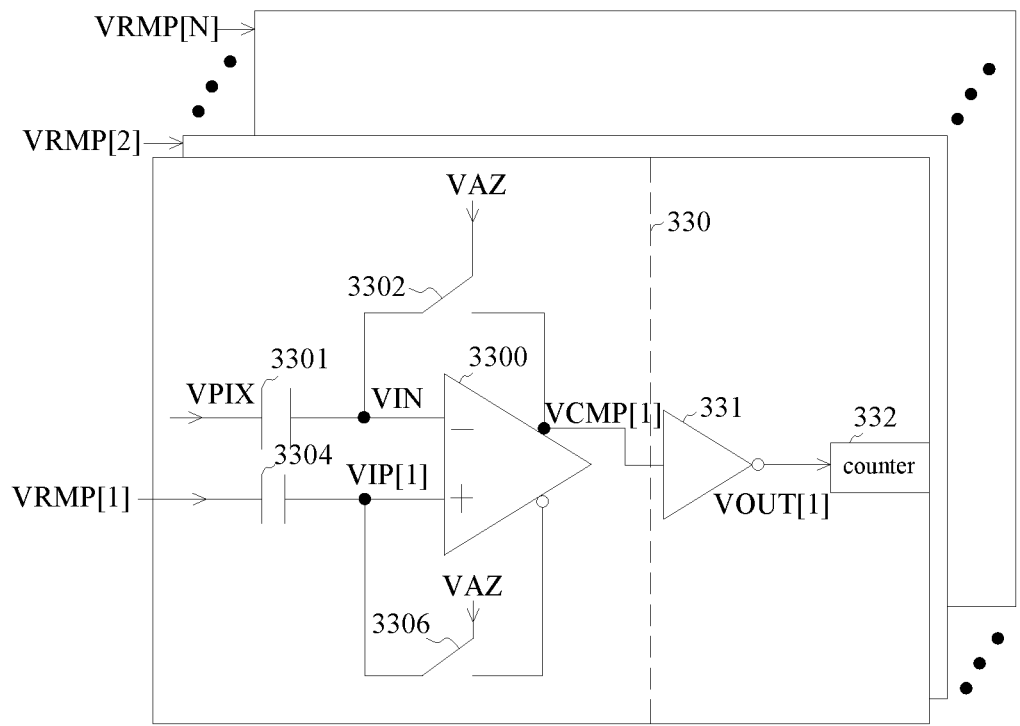
FIG. 35 is a diagram schematically illustrating a comparator circuit coupled to an inverter and a counter according to an eighteenth embodiment of the invention.
Figure 36:
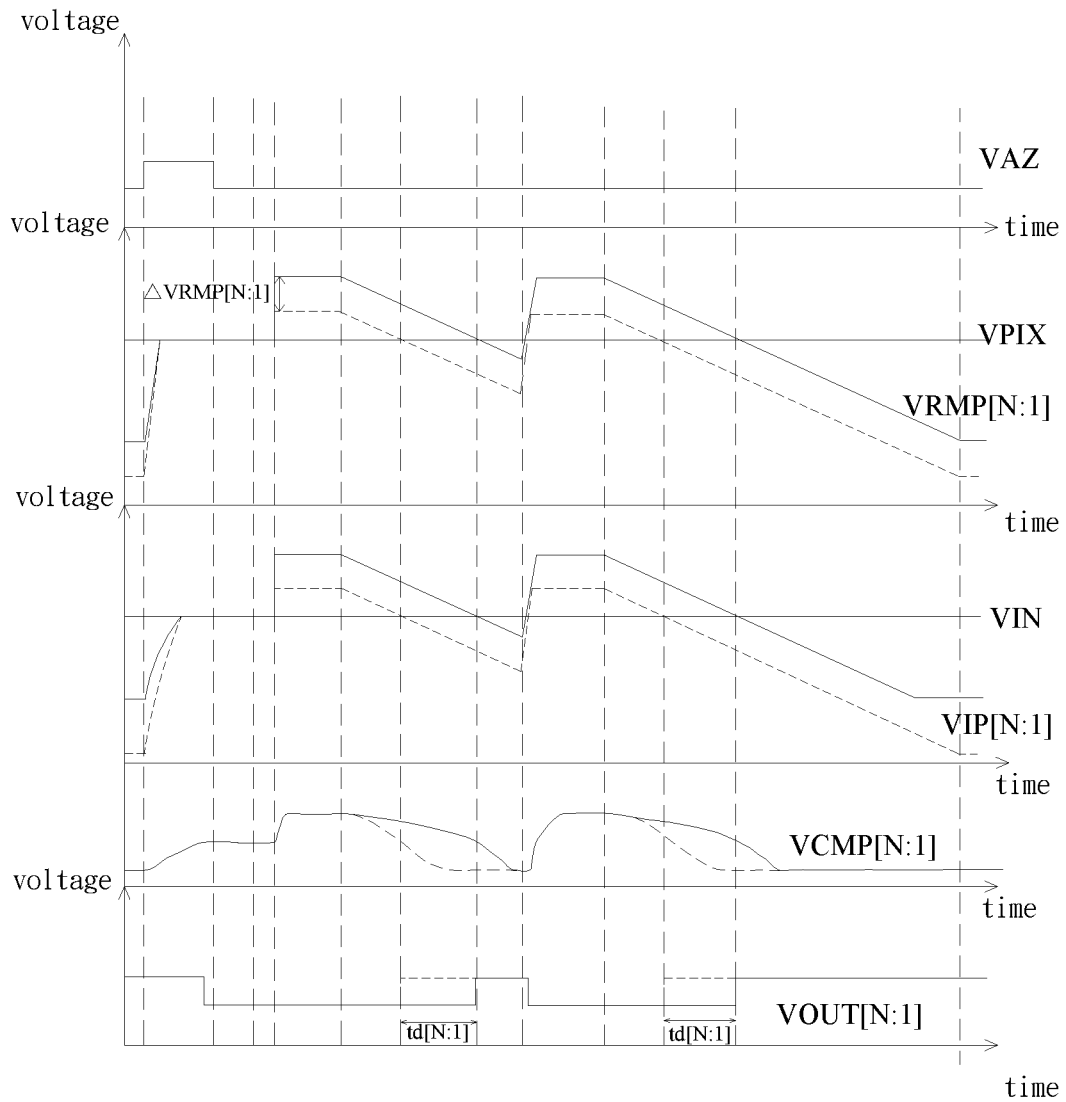
FIG. 36 is a diagram schematically illustrating the waveforms of the auto-zero control signal, the pixel signal, the reference signals, the input voltages of the amplifier, the comparison signals, and the output signals corresponding to FIG. 35.

FIG. 35 is a diagram schematically illustrating a comparator circuit coupled to an inverter and a counter according to an eighteenth embodiment of the invention. FIG. 36 is a diagram schematically illustrating the waveforms of the auto-zero control signal, the pixel signal, the reference signals, the input voltages of the amplifier, the comparison signals, and the output signals corresponding to FIG. 35. Referring to FIG. 35 and FIG. 36, the eighteenth embodiment of the comparator circuit 330 is introduced as follows. The comparator circuit 330 includes an amplifier 3300, an input capacitor 3304 named as a first input capacitor, an input capacitor 3301 named as a second input capacitor, an auto-zero switch 3302 named as a first auto-zero switch, and an auto-zero switch 3306 named as a second auto-zero switch. The amplifier 3300 has a first input node, a second input node, a first output node, and a second output node. In the eighteenth embodiment, the first input node may be a negative input node, the second input node may be a positive input node, and the first output node and the second output node may be respectively a positive output node and a negative output node. The input capacitor 3301 has a first end and a second end. The first end of the input capacitor 3301 is coupled to the first input node of the amplifier 3300, and the second end of the input capacitor 3301 is coupled to the pixel signal VPIX. The input capacitor 3304 has a first end and a second end. The first end of the input capacitor 3304 is coupled to the second input node of the amplifier 3300, and the second end of the input capacitor 3304 is coupled to a ramp signal (as a reference signal) VRMP[i], wherein i=1 to N, for N groups of comparator circuit 330. The auto-zero switch 3302 has a first end, a second end, and a control end. The first end of the auto-zero switch 3302 is coupled to the first input node of the amplifier 3300. The second end of the auto-zero switch 3302 is coupled to the first output node of the amplifier 3300. The auto-zero switch 3306 has a first end, a second end, and a control end. The first end of the auto-zero switch 3306 is coupled to the second input node of the amplifier 3300. The second end of the auto-zero switch 3306 is coupled to the second output node of the amplifier 3300.

In order to effectively read the pixel signals VPIX, the image readout device may further include a plurality of inverters 331 and a plurality of counters 332. The inverters 331 are respectively coupled to the first output nodes of the amplifiers 3300 of the comparator circuits 330. The counters 332 are respectively coupled to the inverters 331.

The operation of the eighteenth embodiment of the comparator circuit 330 is introduced as follows. The first input node and the second input node of the amplifier 3300 respectively receive a pixel signal VPIX from the image sensor array and a reference signal. The reference signal may be, but not limited to, a ramp signal VRMP[i]. i is a positive integer. The amplifier 3300 compares the pixel signal VPIX to the ramp signal VRMP[i] to generate a comparison signal VCMP[i] from the first output node. The second end of the input capacitor 3304 is coupled to the ramp signal VRMP[i]. The control end of the auto-zero switch 3302 is coupled to an auto-zero control signal VAZ. The control end of the auto-zero switch 3306 is coupled to the auto-zero control signal VAZ. The auto-zero control signal VAZ is configured to couple or decouple the first input node of the amplifier 3300 to the first output node of the amplifier 3300 and to couple or decouple the second input node of the amplifier 3300 to the second output node of the amplifier 3300. In addition, the input voltage of the negative input node of the amplifier 3300 is represented with VIN. The input voltage of the positive input node of the amplifier 3300 is represented with VIP[i]. The inverters 331 respectively convert the comparison signals VCMP[1]~VCMP[N] generated from the comparator circuits 330 into a plurality of output signals VOUT[1]~VOUT[N] which transition between a high level and a low level based on a predetermined voltage level. Each counter 332 counts one of the output signals VOUT[1]~ VOUT[N] to generate a digital counting value corresponding to the pixel signal VPIX.

As illustrated in FIG. 36, VRMP[N:1] includes VRMP[1]~VRMP[N]. One of the ramp signals VRMP[N:1], represented with a solid waveform, has the highest voltage level. One of the ramp signals VRMP[N:1], represented with a dashed waveform, has the lowest voltage level. At the same time point, the voltage difference between the ramp signal VRMP[i] and the ramp signal with the lowest voltage level is defined as ΔVRMP[i]. ΔVRMP[N:1] includes ΔVRMP[1]~ΔVRMP[N]. VIP[N:1] includes VIP[1]~VIP[N]. One of the ramp signals VIP[N:1], represented with a solid waveform, has the highest voltage level. One of the ramp signals VIP[N:1], represented with a dashed waveform, has the lowest voltage level. VCMP[N:1] includes VCMP[1]~VCMP[N]. The waveforms of the comparison signals VCMP[N:1] vary between the solid line and the dashed line. VOUT[N:1] includes VOUT[1]~VOUT[N]. The waveforms of the output signals VOUT[N:1] vary between the solid line and the dashed line. The transition time points of the output signals VOUT[1]~VOUT[N] are respectively represented with td[1]~td[N]. td[N:1] includes td[1]~td[N].

The input voltages VIN and VIP[i] respectively follow the voltage levels of the pixel signal VPIX and the ramp signal VRMP[i]. When the voltage level of the auto-zero control signal VAZ rises from a logic low level to a logic high level, the auto-zero switch 3302 is turned on to couple the first input node of the amplifier 3300 to the first output node of the amplifier 3300 and the auto-zero switch 3306 is turned on to couple the second input node of the amplifier 3300 to the second output node of the amplifier 3300, such that the input voltage VIN is equal to the input voltage VIP[i] and the voltage offset between the input voltages VIN and VIP[i] is cancelled. When the voltage level of the auto-zero control signal VAZ descends from the logic high level to the logic low level, the auto-zero switch 3302 is turned off to decouple the first input node of the amplifier 3300 to the first output node of the amplifier 3300 and the auto-zero switch 3306 is turned off to decouple the second input node of the amplifier 3300 to the second output node of the amplifier 3300. The voltage levels of all or parts of the ramp signals VRMP[1]~VRMP[N] are adjusted to be different, thereby changing the transition time points of voltages of the comparison signal VCMP[i] and the output signal VOUT[i]. The comparator circuits 330 are divided into a plurality of groups. The transition time points of the comparison signals VCMP[N:1] respectively corresponding to the groups differ from each other when the respective reference signals are respectively coupled to the groups have different level. The transition time points of the comparison signal VCMP[i] and the output signal VOUT[i] depend on ΔVRMP[i] and VRMP [i]. The transition time points corresponding to the groups are respectively set and partially or completely occurring at different times, thereby reducing the peak current and the IR drop. The transition time point of the output signal VOUT[i] is delayed by the time delay td[i]. Specifically, td[i] is represented by equation (22).

$$td[i] = \Delta VRMP[i] \frac{dt}{dV_{VRMP[i]}} \quad (22)$$

$V_{VRMP}$ represents the voltage of the ramp signal VRMP [i].

According to the embodiments provided above, the image readout device employs the control capacitor and the control switch or controls the levels of the reference signals to control the transition time points of output signals not to occur at the same time, thereby reducing the peak current and the IR drop.

The embodiments described above are only to exemplify the invention and not to limit the scope of the invention. Therefore, any equivalent modification or variation according to the shapes, structures, features, or spirit disclosed by the invention is to be also included within the scope of the invention.

What is claimed is:

1. An image readout device comprising:
   a plurality of comparator circuits, wherein each of the plurality of comparator circuits comprises:
   an amplifier, having a first input node, a second input node, a first output node, and a second output node, configured to compare a pixel signal received from an image sensor array to a reference signal to generate a comparison signal;
   a first input capacitor having a first end coupled to the first input node of the amplifier and a second end coupled to the pixel signal or the reference signal;
   a first auto-zero switch having a first end coupled to the first input node of the amplifier, a second end coupled to the first output node of the amplifier, and a control end coupled to an auto-zero control signal which is configured to couple or decouple the first input node of the amplifier to the first output node of the amplifier; and
   at least one first control capacitor, each of the at least one first control capacitor having a first end coupled to the first input node of the amplifier and a second end coupled to a respective first control signal.

2. The image readout device according to claim 1, wherein the respective first control signal is different from the auto-zero control signal.

3. The image readout device according to claim 2, wherein an active period of the respective first control signal is larger than an active period of the auto-zero control signal.

4. The image readout device according to claim 2, wherein a leading edge of the respective first control signal is at the same time as a leading edge of the auto-zero control signal and a trailing edge of the respective first control signal is later than a trailing edge of the auto-zero control signal.

5. The image readout device according to claim 1, wherein, the each of the plurality of comparator circuits further comprises a second auto-zero switch having a first end coupled to the second input node of the amplifier, a second end coupled to the second output node of the amplifier, and a control end coupled to the auto-zero control signal which is configured to couple or decouple the second input node of the amplifier and the second output node of the amplifier.

6. The image readout device according to claim 5, wherein the each of the plurality of comparator circuits further comprises a second input capacitor having a first end coupled to the second input node of the amplifier and a second end coupled to the reference signal or the pixel signal.

7. The image readout device according to claim 1, wherein the each of the plurality of comparator circuits further comprises a second control capacitor having a first end coupled to the second input node of the amplifier and a second end grounded.

8. The image readout device according to claim 6, wherein the each of the plurality of comparator circuits further comprises at least one second control capacitor, each of the at least one second control capacitor having a first end coupled to the second input node of the amplifier and a second end coupled to a respective second control signal.

9. The image readout device according to claim 8, wherein the plurality of comparator circuits are divided into a plurality of groups, voltage levels of the respective control signal and the respective second control signal transition to change transition time points of the comparison signal, and the transition time points corresponding to the plurality of groups are respectively set.

10. The image readout device according to claim 1, wherein the second end of the at least one first control capacitor is coupled to a voltage generation circuit, the voltage generation circuit comprises a voltage dividing resistor string configured to generate an adjustable voltage, the respective first control signal has an active period and an amplitude in the active period, and the amplitude depends on the adjustable voltage.

11. The image readout device according to claim 1, wherein the plurality of comparator circuits are divided into a plurality of groups, a voltage level transition of the respective first control signal causes transition time points of the comparison signal change, and the transition time points corresponding to the plurality of groups are respectively set.

12. The image readout device according to claim 1, further comprising:
   a plurality of inverters, respectively coupled to the first output nodes or the second output nodes of the amplifiers of the plurality of comparator circuits, and configured to convert the comparison signals generated from the plurality of comparator circuits into a plurality of output signals which transition between a high level and a low level based on a predetermined voltage level; and
   a plurality of counters respectively coupled to the plurality of inverters, and each of the counters is configured to count one of the plurality of output signals to generate a digital counting value corresponding to the pixel signal.

13. An image readout device comprising:
   a plurality of comparator circuits, wherein each of the plurality of comparator circuits comprises:

an amplifier, having a first input node, a second input node, a first output node and a second output node, configured to compare a pixel signal received from an image sensor array to a reference signal to generate a comparison signal;

a first input capacitor having a first end coupled to the first input node of the amplifier and a second end coupled to the pixel signal or the reference signal;

a first auto-zero switch having a first end coupled to the first input node of the amplifier, a second end coupled to the first output node of the amplifier, and a control end coupled to an auto-zero control signal which is configured to couple or decouple the first input node of the amplifier to the first output node of the amplifier; and at least one first control switch, each of the at least one first control switch having a first end coupled to the first input node of the amplifier, a second end coupled to the first output node of the amplifier, and a control end coupled to a respective first control signal.

14. The readout device according to claim 13, wherein the respective first control signal is identical to the auto-zero control signal.

15. The image readout device according to claim 13, wherein the each of the plurality of comparator circuits further comprises a second auto-zero switch having a first end coupled to the second input node of the amplifier, a second end coupled to the second output node of the amplifier, and a control end coupled to the auto-zero control signal which is configured to couple or decouple the second input node of the amplifier and the second output node of the amplifier.

16. The image readout device according to claim 15, wherein the each of the plurality of comparator circuits further comprises a second input capacitor having a first end coupled to the second input node of the amplifier and a second end coupled to the reference signal or the pixel signal.

17. The image readout device according to claim 16, wherein the each of the comparator circuit further comprises at least one second control switch, and each of the at least one second control switch having a first end coupled to the second input node of the amplifier, a second end coupled to the second output node of the amplifier, and a control end coupled to a respective second control signal.

18. The image readout device according to claim 17, wherein the plurality of comparator circuits are divided into a plurality of groups, voltage levels of the respective control signal and the respective second control signal transition to change transition time points of the comparison signal, and the transition time points corresponding to the plurality of groups are respectively set.

19. The image readout device according to claim 13, wherein the plurality of comparator circuits are divided into a plurality of groups, a voltage level transition of the respective first control signal causes transition time points of the comparison signal change, and the transition time points corresponding to the plurality of groups are respectively set.

20. The image readout device according to claim 13, further comprising:

a plurality of inverters, respectively coupled to the first output nodes or the second output nodes of the amplifiers of the plurality of comparator circuits, and configured to convert the comparison signals generated from the plurality of comparator circuits into a plurality of output signals which transition between a high level and a low level based on a predetermined voltage level; and a plurality of counters respectively coupled to the plurality of inverters, and each of the counters is configured to count one of the plurality of output signals to generate a digital counting value corresponding to the pixel signal.

21. An image readout device comprising:

a plurality of comparator circuits, wherein each of the plurality of comparator circuit comprises:

an amplifier, having a first input node, a second input node, a first output node, and a second output node, configured to compare a pixel signal received from an image sensor array to a respective reference signal to generate a comparison signal;

a first input capacitor having a first end coupled to the second input node of the amplifier and a second end coupled to the respective reference signal;

a first auto-zero switch having a first end coupled to the first input node of the amplifier, a second end coupled to the first output node of the amplifier, and a control end coupled to an auto-zero control signal which is configured to couple or decouple the first input node and the first output node of the amplifier;

a second auto-zero switch having a first end coupled to the second input node of the amplifier, a second end coupled to the second output node of the amplifier, and a control end coupled to the auto-zero control signal which is configured to couple or decouple the second input node and the second output node of the amplifier; and a second input capacitor having a first end coupled to the first input node of the amplifier and a second end coupled to the pixel signal;

wherein the plurality of comparator circuits are divided into a plurality of groups, and transition time points of the comparison signals respectively corresponding to the plurality of groups differ from each other when the respective reference signals are respectively coupled to the plurality of groups have different level.

22. The image readout device according to claim 21, further comprising:

a plurality of inverters, respectively coupled to the first output nodes of the amplifiers of the plurality of comparator circuits, and configured to convert the comparison signals generated from the plurality of comparator circuits into a plurality of output signals which transition between a high level and a low level based on a predetermined voltage level; and a plurality of counters respectively coupled to the plurality of inverters, and each of the counters is configured to count one of the plurality of output signals to generate a digital counting value corresponding to the pixel signal.

* * * * *